US012112201B2

(12) United States Patent
Doshi et al.

(10) Patent No.: US 12,112,201 B2
(45) Date of Patent: Oct. 8, 2024

(54) METHODS AND APPARATUS TO AGGREGATE TELEMETRY DATA IN AN EDGE ENVIRONMENT

(71) Applicant: Intel Corporation, Santa Clara, CA (US)

(72) Inventors: Kshitij Doshi, Tempe, AZ (US); Francesc Guim Bernat, Barcelona (ES); Timothy Verrall, Pleasant Hill, CA (US); Ned Smith, Beaverton, OR (US); Rajesh Gadiyar, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 78 days.

(21) Appl. No.: 17/568,567

(22) Filed: Jan. 4, 2022

(65) Prior Publication Data

US 2022/0209971 A1 Jun. 30, 2022

Related U.S. Application Data

(63) Continuation of application No. 16/723,195, filed on Dec. 20, 2019, now Pat. No. 11,245,538.

(Continued)

(51) Int. Cl.
*H04L 9/32* (2006.01)
*G06F 8/41* (2018.01)
(Continued)

(52) U.S. Cl.
CPC ............ *G06F 9/5016* (2013.01); *G06F 8/443* (2013.01); *G06F 9/44594* (2013.01);
(Continued)

(58) Field of Classification Search
CPC . H04L 63/0428; H04L 41/145; H04L 47/822; H04L 67/12; H04L 41/0896;
(Continued)

(56) References Cited

U.S. PATENT DOCUMENTS 3,226,675 A 12/1965 Edwards
5,826,239 A 10/1998 Du et al.
(Continued)

FOREIGN PATENT DOCUMENTS

WO 9859478 12/1998

OTHER PUBLICATIONS

Cheol-Ho Hong and Blesson Varghese, "Resource Management in Fog/Edge Computing: a Survey," Sep. 30, 2018, Available online: https://arxiv.org/pdf/1810.00305.pdf (22 pages).

(Continued)

*Primary Examiner* — Nicholas P Celani
*Assistant Examiner* — Wuji Chen
(74) *Attorney, Agent, or Firm* — Hanley, Flight & Zimmerman, LLC

(57) ABSTRACT

Methods, apparatus, systems, and articles of manufacture are disclosed to aggregate telemetry data in an edge environment. An example apparatus includes at least one processor, and memory including instructions that, when executed, cause the at least one processor to at least generate a composition for an edge service in the edge environment, the composition representative of a first interface to obtain the telemetry data, the telemetry data associated with resources of the edge service and including a performance metric, generate a resource object based on the performance metric, generate a telemetry object based on the performance metric, and generate a telemetry executable based on the composition, the composition including at least one of the resource object or the telemetry object, the telemetry execut- (Continued)

able to generate the telemetry data in response to the edge service executing a computing task distributed to the edge service based on the telemetry data.

24 Claims, 15 Drawing Sheets

Related U.S. Application Data

(60) Provisional application No. 62/939,303, filed on Nov. 22, 2019, provisional application No. 62/907,597, filed on Sep. 28, 2019.

(51) Int. Cl.

| | | |
|---|---|---|
| G06F 9/445 | (2018.01) | |
| G06F 9/50 | (2006.01) | |
| G06F 9/54 | (2006.01) | |
| G06F 11/34 | (2006.01) | |
| G06F 16/18 | (2019.01) | |
| G06F 21/60 | (2013.01) | |
| H04L 9/00 | (2022.01) | |
| H04L 9/06 | (2006.01) | |
| H04L 9/08 | (2006.01) | |
| H04L 9/40 | (2022.01) | |
| H04L 41/0893 | (2022.01) | |
| H04L 41/0896 | (2022.01) | |
| H04L 41/14 | (2022.01) | |
| H04L 41/142 | (2022.01) | |
| H04L 41/5009 | (2022.01) | |
| H04L 41/5025 | (2022.01) | |
| H04L 41/5051 | (2022.01) | |
| H04L 43/08 | (2022.01) | |
| H04L 47/70 | (2022.01) | |
| H04L 67/1008 | (2022.01) | |
| H04L 67/12 | (2022.01) | |
| H04L 67/141 | (2022.01) | |
| G06F 9/38 | (2018.01) | |
| G06F 9/455 | (2018.01) | |
| G06F 9/48 | (2006.01) | |
| G06F 11/10 | (2006.01) | |
| G06F 12/14 | (2006.01) | |
| G06F 16/23 | (2019.01) | |
| G16Y 40/10 | (2020.01) | |
| H04L 67/10 | (2022.01) | |

(52) U.S. Cl.
CPC ............ *G06F 9/505* (2013.01); *G06F 9/5072* (2013.01); *G06F 9/5077* (2013.01); *G06F 9/544* (2013.01); *G06F 11/3433* (2013.01); *G06F 16/1865* (2019.01); *G06F 21/602* (2013.01); *H04L 9/008* (2013.01); *H04L 9/0637* (2013.01); *H04L 9/0822* (2013.01); *H04L 9/0825* (2013.01); *H04L 9/0866* (2013.01); *H04L 41/0893* (2013.01); *H04L 41/0896* (2013.01); *H04L 41/142* (2013.01); *H04L 41/145* (2013.01); *H04L 41/5009* (2013.01); *H04L 41/5025* (2013.01); *H04L 41/5051* (2013.01); *H04L 43/08* (2013.01); *H04L 47/822* (2013.01); *H04L 63/0407* (2013.01); *H04L 63/0428* (2013.01); *H04L 63/1408* (2013.01); *H04L 63/20* (2013.01); *H04L 67/1008* (2013.01); *H04L 67/12* (2013.01); *H04L 67/141* (2013.01); *G06F 9/3836* (2013.01); *G06F 9/45533* (2013.01); *G06F 9/4881* (2013.01); *G06F 9/5038* (2013.01); *G06F 11/1004* (2013.01); *G06F 12/1408* (2013.01); *G06F 16/2322* (2019.01); *G06F 2209/509* (2013.01); *G16Y 40/10* (2020.01); *H04L 9/3297* (2013.01); *H04L 67/10* (2013.01)

(58) Field of Classification Search
CPC . H04L 41/142; H04L 41/5051; H04L 67/141; H04L 9/008; H04L 41/0893; H04L 41/5009; H04L 41/5025; H04L 43/08; H04L 63/1408; H04L 67/1008; H04L 9/0637; H04L 9/0825; H04L 9/0866; H04L 9/3297; H04L 63/0407; H04L 63/20; H04L 9/0822; H04L 67/10; H04L 2209/127; H04L 63/06; H04L 9/0894; H04L 67/322; H04L 67/1089; H04L 67/289; H04L 67/18; H04L 47/2425; G06F 8/443; G06F 9/3836; G06F 9/44594; G06F 9/4881; G06F 9/505; G06F 11/3433; G06F 9/544; G06F 21/602; G06F 16/1865; G06F 16/2322; G06F 11/1004; G06F 12/1408; G06F 9/45533; G06F 2209/509; G06F 9/5072; G06F 9/5038; G06F 11/3058; G06F 16/90339; G06F 21/6209; G06F 9/5077; G16Y 40/10; Y02D 10/00

See application file for complete search history.

(56) References Cited

U.S. PATENT DOCUMENTS

| | | | |
|---|---|---|---|
| 5,941,947 A | 8/1999 | Brown et al. | |
| 6,182,094 B1* | 1/2001 | Humpleman | H04L 67/01 |
| | | | 348/E5.006 |
| 6,185,491 B1 | 2/2001 | Gray et al. | |
| 6,253,338 B1* | 6/2001 | Smolders | G06F 11/3466 |
| | | | 714/39 |
| 6,363,417 B1 | 3/2002 | Howard et al. | |
| 6,377,860 B1 | 4/2002 | Gray et al. | |
| 6,437,692 B1 | 8/2002 | Petite et al. | |
| 6,460,082 B1 | 10/2002 | Lumelsky et al. | |
| 6,571,297 B1 | 5/2003 | Cline et al. | |
| 6,580,950 B1 | 6/2003 | Johnson et al. | |
| 6,636,505 B1 | 10/2003 | Wang et al. | |
| 6,735,630 B1 | 5/2004 | Gelvin et al. | |
| 6,826,607 B1 | 11/2004 | Gelvin et al. | |
| 6,832,251 B1 | 12/2004 | Gelvin et al. | |
| 6,859,831 B1 | 2/2005 | Gelvin et al. | |
| 6,889,188 B2 | 5/2005 | Metzler et al. | |
| 6,892,230 B1 | 5/2005 | Gu et al. | |
| 6,916,247 B2 | 7/2005 | Gatto et al. | |
| 6,948,168 B1 | 9/2005 | Kuprionas | |
| 6,963,784 B1 | 11/2005 | Gibbs | |
| 6,985,939 B2 | 1/2006 | Fletcher et al. | |
| 6,990,379 B2 | 1/2006 | Gonzales et al. | |
| 7,020,701 B1 | 3/2006 | Gelvin et al. | |
| 7,039,701 B2 | 5/2006 | Wesley | |
| 7,069,318 B2 | 6/2006 | Burbeck et al. | |
| 7,072,960 B2 | 7/2006 | Graupner et al. | |
| 7,143,139 B2 | 11/2006 | Burbeck et al. | |
| 7,159,007 B2 | 1/2007 | Stawikowski | |
| 7,167,920 B2 | 1/2007 | Traversat et al. | |
| 7,171,471 B1 | 1/2007 | Nair | |
| 7,177,929 B2 | 2/2007 | Burbeck et al. | |
| 7,181,536 B2 | 2/2007 | Burbeck et al. | |
| 7,185,342 B1 | 2/2007 | Carrer et al. | |
| 7,206,934 B2 | 4/2007 | Pabla et al. | |
| 7,207,041 B2 | 4/2007 | Elson et al. | |
| 7,251,689 B2 | 7/2007 | Wesley | |
| 7,263,560 B2 | 8/2007 | Abdelaziz et al. | |
| 7,283,811 B2 | 10/2007 | Gidron et al. | |
| 7,325,047 B2 | 1/2008 | Brittenham et al. | |
| 7,343,428 B2 | 3/2008 | Fletcher et al. | |
| 7,386,860 B2 | 6/2008 | Dani et al. | |

(56) References Cited

U.S. PATENT DOCUMENTS

| | | | |
|---|---|---|---|
| 7,426,730 B2 | 9/2008 | Mathews et al. | |
| 7,472,349 B1 | 12/2008 | Srivastava et al. | |
| 7,519,918 B2 | 4/2009 | Trantow | |
| 7,603,469 B2 | 10/2009 | Fletcher et al. | |
| 7,797,367 B1 | 9/2010 | Gelvin et al. | |
| 7,822,860 B2 | 10/2010 | Brown et al. | |
| 7,844,687 B1 | 11/2010 | Gelvin et al. | |
| 7,933,945 B2 | 4/2011 | Krzyzanowski et al. | |
| 8,140,658 B1 | 3/2012 | Gelvin et al. | |
| 8,356,067 B2 | 1/2013 | Trantow | |
| 8,893,093 B2* | 11/2014 | Hossain | G06F 11/3616 717/124 |
| 9,819,253 B2* | 11/2017 | Gamet | H02K 33/18 |
| 9,858,166 B1* | 1/2018 | Gong | G06F 8/443 |
| 10,244,071 B2* | 3/2019 | Moustafa | H04L 45/04 |
| 10,360,064 B1* | 7/2019 | Carl | G06F 9/4881 |
| 10,489,215 B1* | 11/2019 | Wen | G06F 9/50 |
| 10,547,527 B2* | 1/2020 | Guim Bernat | H04L 41/12 |
| 10,904,820 B1* | 1/2021 | Knas | H04W 4/029 |
| 11,139,991 B2* | 10/2021 | Doshi | G06F 9/5072 |
| 11,226,854 B2* | 1/2022 | Brown | G06F 16/245 |
| 11,245,538 B2* | 2/2022 | Doshi | G06F 9/44594 |
| 11,283,635 B2* | 3/2022 | Smith | G06F 8/443 |
| 11,374,776 B2 | 6/2022 | Guim Bernat et al. | |
| 11,520,501 B2* | 12/2022 | Haghighat | G06F 9/5044 |
| 11,556,382 B1* | 1/2023 | Byagowi | G06F 9/4881 |
| 2002/0143819 A1 | 4/2002 | Han | |
| 2002/0083143 A1 | 6/2002 | Cheng | |
| 2002/0112058 A1 | 8/2002 | Weisman et al. | |
| 2003/0005090 A1 | 1/2003 | Sullivan, Jr. et al. | |
| 2003/0036917 A1 | 2/2003 | Hite et al. | |
| 2003/0055624 A1 | 3/2003 | Fletcher et al. | |
| 2003/0061256 A1 | 3/2003 | Mathews et al. | |
| 2003/0065756 A1 | 4/2003 | Carrez | |
| 2003/0084156 A1 | 5/2003 | Graupner et al. | |
| 2003/0110334 A1 | 6/2003 | Lanigan et al. | |
| 2003/0163513 A1 | 8/2003 | Schaeck et al. | |
| 2003/0182394 A1 | 9/2003 | Ryngler et al. | |
| 2003/0191802 A1 | 10/2003 | Zhao et al. | |
| 2003/0217139 A1 | 11/2003 | Burbeck et al. | |
| 2004/0003033 A1 | 1/2004 | Kamen et al. | |
| 2004/0025172 A1* | 2/2004 | Bian | G06F 9/545 719/328 |
| 2004/0030740 A1 | 2/2004 | Stelting | |
| 2004/0153867 A1* | 8/2004 | McAlinden | G06F 11/3409 714/47.2 |
| 2004/0221001 A1 | 11/2004 | Anagol-Subbarao et al. | |
| 2005/0091482 A1* | 4/2005 | Gray | H04L 41/12 713/151 |
| 2005/0091485 A1 | 4/2005 | Imai | |
| 2005/0108354 A1 | 5/2005 | Lisitsa et al. | |
| 2005/0149927 A1* | 7/2005 | Abe | G06F 9/4887 718/100 |
| 2007/0083643 A1* | 4/2007 | Arndt | H04L 41/5009 709/224 |
| 2009/0307685 A1* | 12/2009 | Axnix | G06F 8/60 717/174 |
| 2010/0043009 A1* | 2/2010 | Marchand | G06F 9/4881 718/104 |
| 2011/0010721 A1* | 1/2011 | Gupta | G06F 9/5077 718/1 |
| 2011/0131580 A1* | 6/2011 | Krishnamurthy | G06F 9/5094 718/102 |
| 2012/0072578 A1* | 3/2012 | Alam | G06F 11/3495 709/224 |
| 2012/0136602 A1* | 5/2012 | Hossain | G06F 11/3616 702/85 |
| 2013/0067267 A1* | 3/2013 | Tamhane | G06F 15/161 709/224 |
| 2013/0166703 A1* | 6/2013 | Hammer | H04L 41/5054 709/220 |
| 2013/0212212 A1 | 8/2013 | Addepalli et al. | |
| 2014/0047081 A1* | 2/2014 | Edwards | H04L 61/5014 709/220 |
| 2014/0067940 A1* | 3/2014 | Li | H04L 51/52 709/204 |
| 2014/0068617 A1* | 3/2014 | Rachakonda | G06F 9/4843 718/101 |
| 2015/0089511 A1* | 3/2015 | Smith | G06F 9/485 718/104 |
| 2015/0127733 A1 | 5/2015 | Ding et al. | |
| 2015/0301572 A1* | 10/2015 | Zhou | G06F 1/3203 713/320 |
| 2015/0363233 A1* | 12/2015 | Magee | G06F 11/3082 718/104 |
| 2016/0050101 A1* | 2/2016 | Vaidya | H04L 41/0622 709/224 |
| 2016/0085594 A1 | 3/2016 | Wang et al. | |
| 2016/0187944 A1* | 6/2016 | Eastep | G06F 1/3203 713/300 |
| 2016/0232468 A1* | 8/2016 | Meiri | G06Q 10/06315 |
| 2016/0301427 A1* | 10/2016 | Sprouse | H03M 13/6513 |
| 2016/0357442 A1* | 12/2016 | Ninomiya | G06F 9/485 |
| 2016/0364674 A1* | 12/2016 | Macatangay | G06Q 10/04 |
| 2017/0353397 A1* | 12/2017 | Che | G06F 9/5088 |
| 2018/0027058 A1* | 1/2018 | Balle | H04B 10/25891 709/226 |
| 2018/0097743 A1 | 4/2018 | Guim Bernat et al. | |
| 2018/0150334 A1* | 5/2018 | Bernat | G06F 3/0608 |
| 2018/0181439 A1* | 6/2018 | Jackson | G06F 9/5083 |
| 2018/0241802 A1* | 8/2018 | Bernat | H04L 43/0894 |
| 2018/0287894 A1* | 10/2018 | Senarath | H04L 41/40 |
| 2018/0373568 A1* | 12/2018 | Frost | G06F 9/45533 |
| 2019/0014193 A1* | 1/2019 | Guim Bernat | H04L 67/34 |
| 2019/0026150 A1* | 1/2019 | Shimamura | G06F 9/5066 |
| 2019/0044483 A1* | 2/2019 | Jurski | G06F 9/5005 |
| 2019/0044886 A1* | 2/2019 | Bernat | H04L 12/66 |
| 2019/0104022 A1* | 4/2019 | Power | H04L 67/12 |
| 2019/0166032 A1 | 5/2019 | Inbaraj et al. | |
| 2019/0208009 A1* | 7/2019 | Prabhakaran | H04L 67/51 |
| 2019/0215235 A1* | 7/2019 | Chou | G06F 9/45558 |
| 2019/0222518 A1* | 7/2019 | Bernat | H04L 41/5009 |
| 2019/0243685 A1* | 8/2019 | Guim Bernat | G06F 9/5027 |
| 2019/0243691 A1* | 8/2019 | LaBute | G06N 3/045 |
| 2019/0253518 A1* | 8/2019 | Nachimuthu | G06F 11/0715 |
| 2019/0386925 A1* | 12/2019 | Ji | H04W 72/53 |
| 2020/0007414 A1* | 1/2020 | Smith | G06Q 30/08 |
| 2020/0026575 A1* | 1/2020 | Guim Bernat | G06F 9/5072 |
| 2020/0076885 A1* | 3/2020 | Marvin | G06F 9/5072 |
| 2020/0089589 A1* | 3/2020 | Chou | G06F 9/5077 |
| 2020/0127861 A1* | 4/2020 | Doshi | H04L 41/5009 |
| 2020/0127980 A1* | 4/2020 | Smith | H04L 41/5025 |
| 2020/0128067 A1* | 4/2020 | Guim Bernat | H04L 41/5009 |
| 2020/0134207 A1 | 4/2020 | Doshi et al. | |
| 2020/0136921 A1* | 4/2020 | Doshi | H04L 9/0894 |
| 2020/0136994 A1* | 4/2020 | Doshi | H04L 41/0895 |
| 2020/0142735 A1 | 5/2020 | Maciocco et al. | |
| 2020/0167190 A1* | 5/2020 | Bernat | G06F 9/505 |
| 2020/0184702 A1* | 6/2020 | Shah | G06F 9/5094 |
| 2020/0228626 A1* | 7/2020 | Bernat | H04L 67/10 |
| 2020/0241999 A1* | 7/2020 | Guim Bernat | G06F 11/3409 |
| 2020/0250062 A1* | 8/2020 | Arora | G06F 11/3006 |
| 2021/0263779 A1* | 8/2021 | Haghighat | G06F 9/5061 |
| 2021/0294667 A1* | 9/2021 | Chaganti | G06F 9/5083 |
| 2022/0114070 A1* | 4/2022 | Dalton | G06F 15/7807 |
| 2022/0179672 A1* | 6/2022 | Chawla | G06F 9/45541 |
| 2022/0209971 A1* | 6/2022 | Doshi | G06F 8/443 |
| 2022/0239507 A1* | 7/2022 | Smith | H04L 41/142 |
| 2023/0050698 A1* | 2/2023 | Bernat | H04L 69/22 |

OTHER PUBLICATIONS

United States Patent and Trademark Office, "Notice of Allowance", issued in connection with U.S. Appl. No. 16/723,195, Sep. 23, 2021, (31 pages).

Borycki, "Use Azure IIT Suite to Boost IoT Development," Internet of Things, vol. 32, No. 6, Jun. 2017, retrieved from the Internet at <https://learn.microsoft.com/en-us/archive/msdn-magazine/2017/june/internet-of-things-use-azure-iot-suite-to-boost-iot-development> on Jul. 19, 2023, 20 pages.

(56) References Cited

OTHER PUBLICATIONS

Ganglia Monitoring System, "Ganglia Monitoring System," retrieved from the Internet at <http://ganglia.sourceforge.net/> on Aug. 4, 2023, 8 pages.

Nagios Enterprises LLC., "What Can Nagios Help You Do?," retrieved from the Internet at <https://www.nagios.com/> on Aug. 4, 2023, 14 pages.

Panettieri, "Top 50 Cloud Monitoring, Management Tools: Which Are Best?," Jan. 21, 2016 retrieved from the Internet at <https://www.channele2e.com/software/apm/top-50-cloud-monitoring-and-management-tools-which-are-best/> on Aug. 4, 2023, 8 pages.

\* cited by examiner

METHODS AND APPARATUS TO AGGREGATE TELEMETRY DATA IN AN EDGE ENVIRONMENT

RELATED APPLICATION

This patent arises from a continuation of U.S. patent application Ser. No. 16/723,195, (now U.S. Pat. No. 11,245,538) which was filed on Dec. 20, 2019. This patent claims the benefit of U.S. Provisional Patent Application No. 62/939,303, titled "Multi-Entity Resource, Security, and Service Management in Edge Computing Deployments," which was filed on Nov. 22, 2019, and U.S. Provisional Patent Application No. 62/907,597, titled "Multi-Entity Resource, Security, and Service Management in Edge Computing Deployments," which was filed on Sep. 28, 2019. U.S. patent application Ser. No. 16/723,195, U.S. Provisional Patent Application No. 62/939,303, and U.S. Provisional Patent Application No. 62/907,597 are hereby incorporated herein by reference in their entireties. Priority to U.S. patent application Ser. No. 16/723,195, U.S. Provisional Patent Application No. 62/939,303, and U.S. Provisional Patent Application No. 62/907,597 is hereby claimed.

BACKGROUND

Edge environments (e.g., an Edge, Fog, multi-access edge computing (MEC), or Internet of Things (IoT) network) enable a workload execution (e.g., an execution of one or more computing tasks, an execution of a machine learning model using input data, etc.) near endpoint devices that request an execution of the workload. Edge environments may include infrastructure, such as an edge service, that is connected to cloud infrastructure, endpoint devices, or additional edge infrastructure via networks such as the Internet. Edge services may be closer in proximity to endpoint devices than cloud infrastructure, such as centralized servers.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
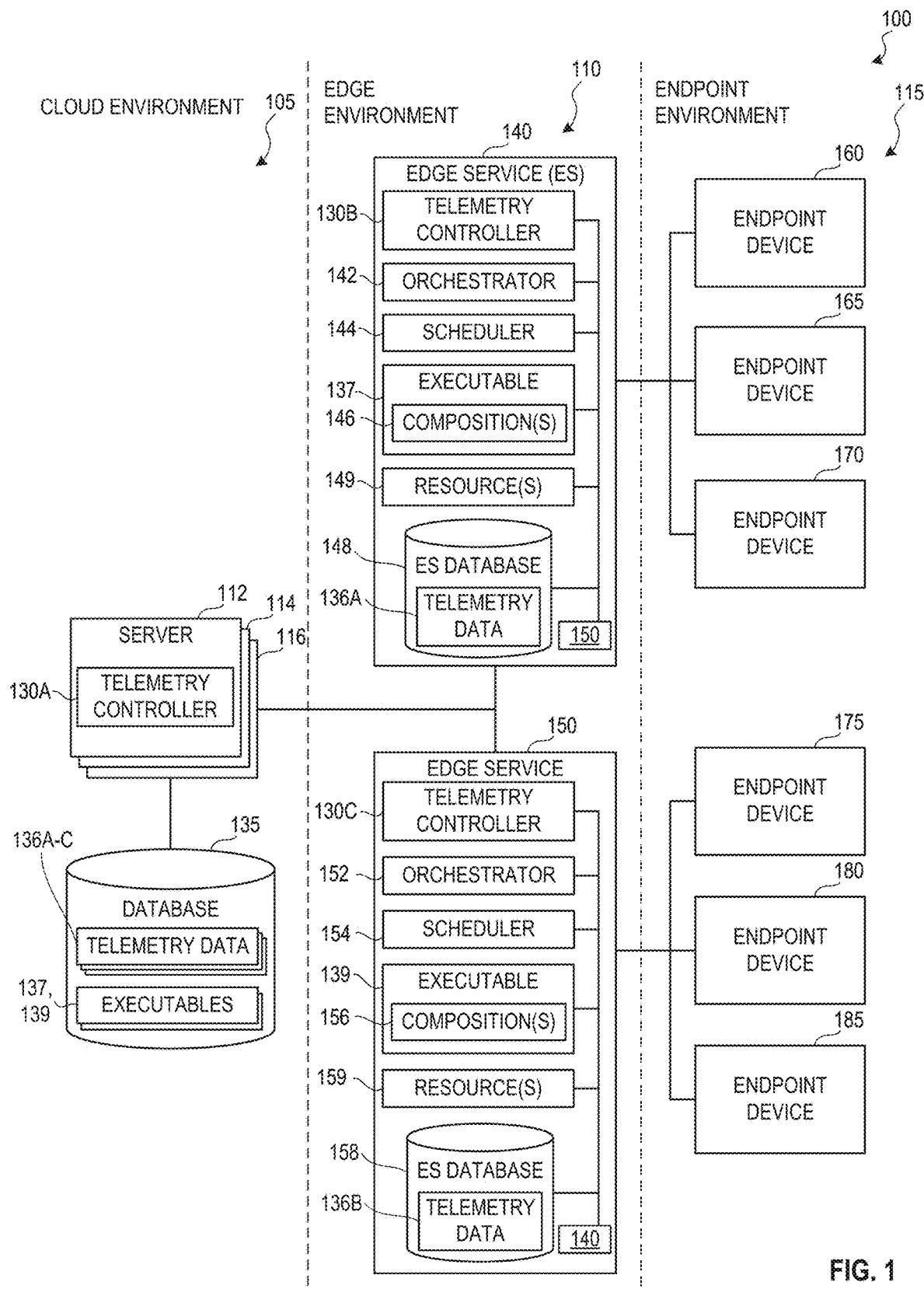
FIG. 1 depicts an example environment including an example cloud environment, an example edge environment, an example endpoint environment, and example telemetry controllers to aggregate telemetry data.

Descriptors "first," "second," "third," etc., are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

Edge computing, at a general level, refers to the transition of compute and storage resources closer to endpoint devices (e.g., consumer computing devices, user equipment, etc.) in order to optimize total cost of ownership, reduce application latency, improve service capabilities, and improve compliance with data privacy or security requirements. Edge computing may, in some scenarios, provide a cloud-like distributed service that offers orchestration and management for applications among many types of storage and compute resources. As a result, some implementations of edge computing have been referred to as the "edge cloud" or the "fog," as powerful computing resources previously available only in large remote data centers are moved closer to endpoints and made available for use by consumers at the "edge" of the network.

Edge computing use cases in mobile network settings have been developed for integration with multi-access edge computing (MEC) approaches, also known as "mobile edge computing." MEC approaches are designed to allow application developers and content providers to access computing capabilities and an information technology (IT) service environment in dynamic mobile network settings at the edge of the network. Limited standards have been developed by the European Telecommunications Standards Institute (ETSI) industry specification group (ISG) in an attempt to define common interfaces for operation of MEC systems, platforms, hosts, services, and applications.

Edge computing, MEC, and related technologies attempt to provide reduced latency, increased responsiveness, and more available computing power than offered in traditional cloud network services and wide area network connections. However, the integration of mobility and dynamically launched services to some mobile use and device processing use cases has led to limitations and concerns with orchestration, functional coordination, and resource management, especially in complex mobility settings where many participants (e.g., devices, hosts, tenants, service providers, operators, etc.) are involved.

In a similar manner, Internet of Things (IoT) networks and devices are designed to offer a distributed compute arrangement from a variety of endpoints. IoT devices can be physical or virtualized objects that may communicate on a network, and can include sensors, actuators, and other input/output components, which may be used to collect data or perform actions in a real-world environment. For example, IoT devices can include low-powered endpoint devices that are embedded or attached to everyday things, such as buildings, vehicles, packages, etc., to provide an additional level of artificial sensory perception of those things. In recent years, IoT devices have become more popular and thus applications using these devices have proliferated.

In some examples, an edge environment can include an enterprise edge in which communication with and/or communication within the enterprise edge can be facilitated via wireless and/or wired connectivity. The deployment of various Edge, Fog, MEC, and IoT networks, devices, and services have introduced a number of advanced use cases and scenarios occurring at and towards the edge of the network. However, these advanced use cases have also introduced a number of corresponding technical challenges relating to security, processing and network resources, service availability and efficiency, among many other issues. One such challenge is in relation to Edge, Fog, MEC, and IoT networks, devices, and services executing workloads on behalf of endpoint devices.

The present techniques and configurations may be utilized in connection with many aspects of current networking systems, but are provided with reference to Edge Cloud, IoT, Multi-access Edge Computing (MEC), and other distributed computing deployments. The following systems and techniques may be implemented in, or augment, a variety of distributed, virtualized, or managed edge computing systems. These include environments in which network services are implemented or managed using multi-access edge computing (MEC), fourth generation (4G) or fifth generation (5G) wireless network configurations; or in wired network configurations involving fiber, copper, and other connections. Further, aspects of processing by the respective computing components may involve computational elements which are in geographical proximity of user equipment or other endpoint locations, such as a smartphone, vehicular communication component, IoT device, etc. Further, the presently disclosed techniques may relate to other Edge/MEC/IoT network communication standards and configurations, and other intermediate processing entities and architectures.

Edge computing is a developing paradigm where computing is performed at or closer to the "edge" of a network, typically through the use of a computing platform implemented at base stations, gateways, network routers, or other devices which are much closer to end point devices producing and consuming the data. For example, edge gateway servers may be equipped with pools of memory and storage resources to perform computations in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with computing hardware that performs virtualized network functions and offers compute resources for the execution of services and consumer functions for connected devices.

Edge environments include networks and/or portions of networks that are located between a cloud environment and an endpoint environment. Edge environments enable computations of workloads at edges of a network. For example, an endpoint device may request a nearby base station to compute a workload rather than a central server in a cloud environment. Edge environments include edge services, which include pools of memory, storage resources, and processing resources. Edge services perform computations, such as an execution of a workload, on behalf of other edge services and/or edge nodes. Edge environments facilitate connections between producers (e.g., workload executors, edge services) and consumers (e.g., other edge services, endpoint devices).

Because edge services may be closer in proximity to endpoint devices than centralized servers in cloud environments, edge services enable computations of workloads with a lower latency (e.g., response time) than cloud environments. Edge services may also enable a localized execution of a workload based on geographic locations or network topographies. For example, an endpoint device may require a workload to be executed in a first geographic area, but a centralized server may be located in a second geographic area. The endpoint device can request a workload execution by an edge service located in the first geographic area to comply with corporate or regulatory restrictions.

Examples of workloads to be executed in an edge environment include autonomous driving computations, video surveillance monitoring, machine learning model executions, and real time data analytics. Additional examples of workloads include delivering and/or encoding media streams, measuring advertisement impression rates, object detection in media streams, speech analytics, asset and/or inventory management, and augmented reality processing.

Edge services enable both the execution of workloads and a return of a result of an executed workload to endpoint devices with a response time lower than the response time of a server in a cloud environment. For example, if an edge service is located closer to an endpoint device on a network than a cloud server, the edge service may respond to workload execution requests from the endpoint device faster than the cloud server. An endpoint device may request an execution of a time-constrained workload from an edge service rather than a cloud server.

In addition, edge services enable the distribution and decentralization of workload executions. For example, an endpoint device may request a first workload execution and a second workload execution. In some examples, a cloud server may respond to both workload execution requests. With an edge environment, however, a first edge service may execute the first workload execution request, and a second edge service may execute the second workload execution request.

To meet the low-latency and high-bandwidth demands of endpoint devices, orchestration in edge clouds has to be performed based on timely resource utilization information about the utilization of many resources (e.g., hardware resources, software resources, virtual hardware and/or software resources, etc.), and the efficiency with which those resources are able to meet the demands placed on them. In examples disclosed herein, such resource utilization information is generally referred to as telemetry (e.g., telemetry data, telemetry information, etc.).

Telemetry can be generated for a plurality of sources including individual hardware components and/or portions thereof, virtual machines (VMs), operating systems (OSes), applications, and/or orchestrators. Telemetry can be used by orchestrators, schedulers, etc., to determine a quantity and/or types of computation tasks to be scheduled for execution and at which resource or portion(s) thereof. Telemetry can also be used to determine expected times to completion of such computation tasks based on historical and/or current (e.g., instant or near-instant) telemetry. For example, a core of a multi-core central processing unit (CPU) can generate over a thousand different varieties of information every fraction of a second using a performance monitoring unit (PMU) sampling the core and/or, more generally, the multi-core CPU. Periodically aggregating and processing all such telemetry in a given edge platform, edge service, etc., can be an arduous and cumbersome process. Prioritizing salient features of interest and extracting such salient features from telemetry to identify current or future problems, stressors, etc., associated with a resource is difficult. Furthermore, identifying a different resource to offload workloads from the burdened resource is a complex undertaking.

Some edge environments desire to obtain telemetry data associated with resources executing a variety of functions or services, such as data processing or video analytics functions (e.g., machine vision, image processing for autonomous vehicles, facial recognition detection, visual object detection, etc.). However, many high-throughput workloads, including one or more video analytics functions, may execute for less than a millisecond (e.g., a fine granularity of time interval). Such edge environments do not have distributed monitoring software or hardware solutions or a combination thereof that are capable of monitoring such finely-granular stateless functions that are executed on a platform (e.g., a resource platform, a hardware platform, a software platform, a virtualized platform, etc.).

Examples disclosed herein improve distribution of computing tasks to edge services based on an aggregation of telemetry data in an edge environment. In some disclosed examples, a telemetry controller virtualizes hardware and/or software resources in the edge environment to collect telemetry data using resource-agnostic commands (e.g., machine-readable commands), directions (e.g., machine-readable directions), instructions (e.g., machine-readable instructions), etc. For example, the telemetry controller can generate models (e.g., machine-readable models) of hardware and/or software resources that can be aggregated into composition(s) of models. In such examples, a requesting or subscribing device or service (e.g., a software service) can request telemetry from a system of hardware and/or software resources by querying the corresponding model composition. Advantageously, the device or service can request the telemetry using machine-readable commands that can be generic rather than specific to the underlying hardware and/or virtual resources.

Examples disclosed herein improve distribution of computing tasks to edge services based on telemetry data. The telemetry data is generated by object(s) associated with resource(s) (e.g., hardware resource(s), software resource(s), etc., and/or a combination thereof). As used herein, the term "object" refers to a logical block of machine-readable definitions, data structures, instructions, etc., and/or a physical block (e.g., a block or portion of memory and/or storage) including the logical block. The logical block can implement a function, an interface, and/or otherwise a machine-readable model or representation of a resource. A logical block can refer to code (e.g., human-readable code, machine-readable code, etc.) that can be written so that the object can monitor a partition, a portion, a slice, etc., of the resource. For example, an object can be implemented using compiled object code, source code, etc., that, when executed, can expose one or more object interfaces to a software stack (e.g., a platform software stack, a system software stack, etc.). In such examples, the one or more object interfaces, when invoked, can provide and/or otherwise expose telemetry data generated by and/or otherwise associated with a resource. For example, the telemetry data can include a tracking of the execution of one or more processes, services, etc., of the resource.

Example objects disclosed herein can be organized as a resource object or a telemetry object. For example, the resource object can be an object based on a hardware and/or software resource. In other examples, the telemetry object can be an object based on an interface to the hardware and/or software resource.

In some disclosed examples, the telemetry controller virtualizes a hardware resource, such as a core (e.g., a computing core, a processor core, etc.) of a multi-core CPU, into a resource object. The resource object can include a resource information object (RIO) and a RIO interface. In such examples, the telemetry controller can generate the RIO by encapsulating descriptive or identifying information about capabilities or functions of the core, and/or, more generally, the core, into a virtual object-oriented data structure representative of the core. The example telemetry controller can generate the RIO interface by encapsulating commands, instructions, etc., that, when executed or invoked, can cause the core to perform a task (e.g., a computation task) such as determining, measuring, and/or otherwise generating telemetry data of interest.

In some disclosed examples, the telemetry controller virtualizes a telemetry resource, such as a data interface to the core of the multi-core CPU, into a telemetry object. The telemetry object can include a telemetry information object (TIO) and a TIO interface. In such examples, the telemetry controller can generate the TIO by encapsulating descriptive or identifying information about capabilities or functions of the data interface, and/or, more generally, the data interface, into a virtual object-oriented data structure representative of the data interface. The example telemetry controller can generate the TIO interface by encapsulating commands, instructions, etc., that, when executed or invoked, can cause the data interface to perform a task such as requesting telemetry data of interest from the core.

In some disclosed examples, the telemetry controller generates RIOs and corresponding RIO interfaces for one or more edge service resources. The example telemetry controller can generate an edge service composition, which can be representative of data sharing relationships, functional relationships, etc., between ones of the RIOs and/or RIO interfaces of the edge service(s). For example, the composition can be representative of one or more interfaces to obtain telemetry data associated with resources of an edge service. In some disclosed examples, the telemetry controller generates an edge environment composition, which can be representative of data sharing relationships, functional relationships, etc., between ones of the edge service compositions. In some disclosed examples, the telemetry controller can adaptively and dynamically adjust the different compositions in response to a resource connecting to or disconnecting from the edge environment.

In some disclosed examples, the telemetry controller orchestrates the generation and retrieval of telemetry data at various hierarchical layers of a computing environment (e.g., a first layer representative of a resource, a second layer representative of an edge service including a plurality of resources, a third layer representative of an edge environment including one or more edge services, etc.). Advantageously, the example telemetry controller can cause the generation and/or the obtaining of telemetry data in varying ranges of granularity, from a hardware counter, a software counter, etc., of a core of a multi-core CPU of an edge service to a throughput of a plurality of resources managed by the edge service. In some disclosed examples, the telemetry controller can improve the distribution and efficiency of computing tasks to be executed by resources of an edge environment based on a desired granularity of telemetry data.

FIG. 1 depicts an example environment (e.g., a computing environment) 100 including an example cloud environment 105, an example edge environment 110, and an example endpoint environment 115 to schedule, distribute, and/or execute a workload (e.g., one or more computing or processing tasks). In the example of FIG. 1, the cloud environment 105 includes a first example server 112, a second example server 114, a third example server 116, a first instance of an example telemetry controller 130A, and an example database (e.g., a cloud database, a cloud environment database, etc.) 135. Alternatively, the example cloud environment 105 may include fewer or more servers than the servers 112, 114, 116 depicted in FIG. 1. The example servers 112, 114, 116 can execute centralized applications (e.g., website hosting, data management, machine learning model applications, responding to requests from client devices, etc.).

In the illustrated example of FIG. 1, the telemetry controller 130A facilitates the generation and/or retrieval of example telemetry data 136A-C associated with at least one of the cloud environment 105, the edge environment 110, or the endpoint environment 115. In the example of FIG. 1, the database 135 stores the telemetry data 136A-C and example executables 137, 139 including at least a first example executable 137 and a second example executable 139. Alternatively, the database 135 may include fewer or more executables than the first executable 137 and the second executable 139. For example, the executables 137, 139 can be telemetry-generating executable programs that, when executed, can generate the telemetry data 136A-C.

In the illustrated example of FIG. 1, the telemetry data 136A-C includes first example telemetry data 136A, second example telemetry data 136B, and third example telemetry data 136C. In FIG. 1, the first telemetry data 136A and the second telemetry data 136B can be generated by the edge environment 110. In the example of FIG. 1, the third telemetry data 136C can be generated by one or more of the servers 112, 114, 116, the database 135, etc., and/or, more generally, the cloud environment 105.

In the illustrated example of FIG. 1, the cloud environment 105 includes the database 135 to record data (e.g., the telemetry data 136A-C, the executables 137, 139, etc.). In some examples, the database 135 stores information including database records, website requests, machine learning models, and results of executing machine learning models. The example database 135 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The database 135 can additionally or alternatively be implemented by one or more double data rate (DDR) memories, such as DDR, DDR2, DDR3, DDR4, mobile DDR (mDDR), etc. The example database 135 can additionally or alternatively be implemented by one or more mass storage devices such as hard disk drive(s), compact disk drive(s), digital versatile disk drive(s), solid-state disk drive(s), etc. While in the illustrated example the database 135 is illustrated as a single database, the database 135 can be implemented by any number and/or type(s) of databases. Furthermore, the data stored in the database 135 can be in any data format such as, for example, binary data, comma delimited data, tab delimited data, structured query language (SQL) structures, etc.

In the illustrated example of FIG. 1, the servers 112, 114, 116 communicate with devices in the edge environment 110 and/or the endpoint environment 115 via a network such as the Internet. Likewise, the example database 135 can provide and/or store data records in response to requests from devices in the cloud environment 105, the edge environment 110, and/or the endpoint environment 115.

In the illustrated example of FIG. 1, the edge environment 110 includes a first example edge service 140 and a second example edge service 150. In FIG. 1, the edge services 140, 150 are edge-computing platforms or platform services. For example, the edge services 140, 150 can include hardware and/or software resources, virtualizations of the hardware and/or software resources, etc., and/or a combination thereof. In such examples, the edge services 140, 150 can execute a workload obtained from an edge or endpoint device as illustrated in the example of FIG. 1.

In the illustrated example of FIG. 1, the first edge service 140 includes a second instance of the telemetry controller 130B, the first executable 137, a first example orchestrator 142, a first example scheduler 144, first example composition(s) 146, a first example edge service (ES) database 148, and first example resource(s) 149. In the example of FIG. 1, the first executable 137 includes and/or otherwise implements the first composition(s) 146. Alternatively, the first example composition(s) 146 may not be included in the first executable 137. For example, the first composition(s) 146 can be provided to and/or otherwise accessed by the first edge service 140 as a service (e.g., Function-as-a-Service (FaaS), Software-as-a-Service (SaaS), etc.). In such examples, the first composition(s) 146 can be hosted by one or more of the servers 112, 114, 116. In FIG. 1, the first ES database 148 includes the first telemetry data 136A.

In the illustrated example of FIG. 1, the second edge service 150 includes a third instance of the telemetry controller 130C, the second executable 139, a second example orchestrator 152, a second example scheduler 154, second example composition(s), a second example ES database 158, and second example resource(s) 159. In the example of FIG. 1, the second executable 139 includes and/or otherwise implements the second composition(s) 156. Alternatively, the second example composition(s) 156 may not be included in the second executable 139. For example, the second composition(s) 156 can be provided to and/or otherwise accessed by the second edge service 150 as a service (e.g., FaaS, SaaS, etc.). In such examples, the second composition(s) 156 can be hosted by one or more of the servers 112, 114, 116. In FIG. 1, the second ES database 158 includes the second telemetry data 136B.

In the illustrated example of FIG. 1, the edge services 140, 150 include the ES databases 148, 158 to record data (e.g., the first telemetry data 136A, the second telemetry data 136B, etc.). The example ES databases 148, 158 can be implemented by a volatile memory (e.g., a SDRAM, DRAM, RDRAM, etc.) and/or a non-volatile memory (e.g., flash memory). The example ES databases 148, 158 can additionally or alternatively be implemented by one or more DDR memories, such as DDR, DDR2, DDR3, DDR4, mDDR, etc. The example ES databases 148, 158 can additionally or alternatively be implemented by one or more mass storage devices such as hard disk drive(s), compact disk drive(s), digital versatile disk drive(s), solid-state disk drive(s), etc. While in the illustrated example the ES databases 148, 158 are illustrated as single databases, the ES databases 148, 158 can be implemented by any number and/or type(s) of databases. In addition, the data stored in the example ES databases 148, 158 can be in any data format such as, for example, binary data, comma delimited data, tab delimited data, SQL structures, etc.

In some examples, the first edge service 140 can be executed by and/or otherwise implemented by a single edge-computing platform (e.g., a single processor platform). In other examples, the first edge service 140 can be executed by and/or otherwise implemented by two or more edge-computing platforms. For example, the first edge service 140 and/or portion(s) thereof can be distributed among two or more example endpoint devices 160, 165, 170, 175, 180, 185 depicted in FIG. 1. In other examples, the first edge service 140 and/or portion(s) thereof can be distributed among two or more edge-computing platforms. For example, as depicted in FIG. 1, one or more portion(s) and/or, more generally, an entirety of the first edge service 140, can be executed by and/or otherwise implemented by the second edge service 150. In such examples, one or more of the second instance of the telemetry controller 130B, the first orchestrator 142, the first scheduler 144, the first executable 137, the first composition(s) 146, the first resource(s) 149, the first ES database 148, and/or the first telemetry data 136A can be distributed for execution, implementation, storage, etc., and/or a combination thereof by one or more different edge services such as the second edge service 150 of FIG. 1.

In some examples, the second edge service 150 can be executed by and/or otherwise implemented by a single edge-computing platform (e.g., a single processor platform). In other examples, the second edge service 150 can be executed by and/or otherwise implemented by two or more edge-computing platforms. For example, the second edge service 150 and/or portion(s) thereof can be distributed among two or more of the endpoint devices 160, 165, 170, 175, 180, 185 depicted in FIG. 1. In other examples, the second edge service 150 and/or portion(s) thereof can be distributed among two or more edge-computing platforms. For example, as depicted in FIG. 1, one or more portion(s) and/or, more generally, an entirety of the second edge service 150, can be executed by and/or otherwise implemented by the first edge service 150. In such examples, one or more of the third instance of the telemetry controller 130C, the second orchestrator 152, the second scheduler 154, the second executable 139, the second composition(s) 156, the second resource(s) 159, the second ES database 158, and/or the second telemetry data 136B can be distributed for execution, implementation, storage, etc., and/or a combination thereof by one or more different edge services such as the first edge service 140 of FIG. 1.

In the example illustrated in FIG. 1, the telemetry controller 130B, the first orchestrator 142, the first scheduler 144, the first composition(s) 146, and the first resource(s) 149 are included in, correspond to, and/or otherwise is/are representative of the first edge service 140. However, in some examples, one or more of the telemetry controller 130B, the first orchestrator, the first scheduler 144, the first composition(s) 146, and/or the first resource(s) 149 can be included in the edge environment 110 yet external of or outside of the first edge service 140. For example, the first orchestrator 142 can be connected to the cloud environment 105 and/or the endpoint environment 115 while being outside of the first edge service 140. In other examples, one or more of the telemetry controller 130B, the first orchestrator 142, the first scheduler 144, the first composition(s) 146, and/or the first resource(s) 149 is/are separate devices included in the edge environment 110. In some examples, one or more of the telemetry controller 130B, the first orchestrator 142, the first scheduler 144, the first composition(s) 146, and/or the first resource(s) 149 can be included in the cloud environment 105 or the endpoint environment 115. For example, the first orchestrator 142 can be included in the endpoint environment 115, or the first composition(s) 146 can be included in the first server 112 in the cloud environment 105. In some examples, the first scheduler 144 can be included in and/or otherwise integrated or combined with the first orchestrator 142.

In the example illustrated in FIG. 1, the telemetry controller 130C, the second orchestrator 152, the second scheduler 154, the second composition(s) 156, and the second resource(s) 159 are included in the second edge service 150. However, in some examples, one or more of the telemetry controller 130C, the second orchestrator 152, the second scheduler 154, the second composition(s) 156, and/or the second resource(s) 159 can be included in the edge environment 110 rather than be included in the second edge service 150. For example, the second orchestrator 152 can be connected to the cloud environment 105 and/or the endpoint environment 115 while being outside of the second edge service 150. In other examples, one or more of the telemetry controller 130C, the second orchestrator 152, the second scheduler 154, the second composition(s) 156, and/or the second resource(s) 159 is/are separate devices included in the edge environment 110. In some examples, one or more of the telemetry controller 130C, the second orchestrator 152, the second scheduler 154, the second edge service composition 156, and/or the second resource(s) 159 can be included in the cloud environment 105 or the endpoint environment 115. For example, the second orchestrator 152 can be included in the endpoint environment 115, or the second composition(s) 156 can be included in the second server 114 in the cloud environment 105. In some examples, the second scheduler 154 can be included in and/or otherwise integrated or combined with the second orchestrator 152.

In the illustrated example of FIG. 1, the resources 149, 159 are invoked to execute a workload (e.g., an edge computing workload) obtained from the endpoint environment 115. For example, the resources 149, 159 can correspond to and/or otherwise be representative of an edge node or portion(s) thereof. For example, the telemetry controller 130B-C, the executable 137, 139, the orchestrator 142, 152, the scheduler 144, 154, and/or, more generally, the edge service 140, 150 can invoke a respective one of the resources 149, 159 to execute one or more edge-computing workloads.

In some examples, the resources 149, 159 are representative of hardware resources, virtualizations of the hardware resources, software resources, virtualizations of the software resources, etc., and/or a combination thereof. For example, the resources 149, 159 can include, correspond to, and/or otherwise be representative of one or more CPUs (e.g., multi-core CPUs), one or more FPGAs, one or more GPUs, one or more network interface cards (NICs), one or more vision processing units (VPUs), etc., and/or any other type of hardware or hardware accelerator. In such examples, the resources 149, 159 can include, correspond to, and/or otherwise be representative of virtualization(s) of the one or more CPUs, the one or more FPGAs, the one or more GPUs, the one more NICs, etc. In other examples, the orchestrators 142, 152, the schedulers 144, 154, the resources 149, 159, and/or, more generally, the edge services 140, 150, can include, correspond to, and/or otherwise be representative of one or more software resources, virtualizations of the software resources, etc., such as hypervisors, load balancers, OSes, VMs, etc., and/or a combination thereof.

In the illustrated example of FIG. 1, the edge services 140, 150 are connected to and/or otherwise in communication with each other and to the servers 112, 114, 116 in the cloud environment 105. The example edge services 140, 150 can execute workloads on behalf of devices associated with the cloud environment 105, the edge environment 110, or the endpoint environment 115. The example edge services 140, 150 can be connected to and/or otherwise in communication with devices in the environments 105, 110, 115 (e.g., the first server 112, the database 135, etc.) via a network such as the Internet. Additionally or alternatively, the example edge services 140, 150 can communicate with devices in the environments 105, 110, 115 using any suitable wireless network including, for example, one or more wireless local area networks (WLANs) (e.g., Wireless Fidelity (Wi-Fi) networks, long-range wireless networks, etc.), one or more cellular or mobile carrier networks (e.g., Global System for Mobile Communications (GSM) networks, Long-Term Evolution (LTE) networks, 5G/6G networks, etc.), one or more peer-to-peer networks (e.g., a Bluetooth network, a Wi-Fi Direct network, a vehicles-to-everything (V2X) network, etc.), one or more private networks, one or more public networks, etc. For example, the edge services 140, 150 can be connected to one or more cell towers included in the cloud environment 105 and connected to the first server 112 via the one or more cell towers.

In the illustrated example of FIG. 1, the endpoint environment 115 includes the endpoint devices 160, 165, 170, 175, 180, 185 including a first example endpoint device 160, a second example endpoint device 165, a third example endpoint device 170, a fourth example endpoint device 175, a fifth example endpoint device 180, and a sixth example endpoint device 185. Alternatively, there may be fewer or more than the endpoint devices 160, 165, 170, 175, 180, 185 depicted in the endpoint environment 115 of FIG. 1.

In the illustrated example of FIG. 1, the endpoint devices 160, 165, 170, 175, 180, 185 are computing devices. For example, one or more of the endpoint devices 160, 165, 170, 175, 180, 185 can be an Internet-enabled tablet, a mobile handset (e.g., a smartphone), a watch (e.g., a smartwatch), a fitness tracker, a headset, a vehicle control unit (e.g., an engine control unit, an electronic control unit, etc.), an IoT device, etc. In other examples, one or more of the endpoint devices 160, 165, 170, 175, 180, 185 can be a physical server (e.g., a rack-mounted server, a blade server, etc.). In yet other examples, one or more of the endpoint devices 160, 165, 170, 175, 180, 185 can be a device (e.g., a device including one or more processors, a computing device, etc.) having one or more wired interfaces (e.g., a Local Area Network (LAN) interface, a fiber-optic interface, a High-Definition Multimedia Interface (HDMI), a Video Graphics Array (VGA) interface, a Digital Visual Interface (DVI), etc.). For example, one or more of the endpoint devices 160, 165, 170, 175, 180, 185 can be a desktop computer, an Internet appliance, a gaming console, a laptop computer, an online media player (e.g., a device that can provide an over-the-top media service), a set top box, a television, etc. In additional or alternative examples, one or more of the endpoint devices 160, 165, 170, 175, 180, 185 can include a camera, a sensor, etc.

In the illustrated example of FIG. 1, the first through third endpoint devices 160, 165, 170 are connected to the first edge service 140. Also, in the example of FIG. 1, the fourth through sixth endpoint devices 175, 180, 185 are connected to the second edge service 150. Additionally or alternatively, one or more of the example endpoint devices 160, 165, 170, 175, 180, 185 may be connected to any number of edge services (e.g., the edge services 140, 150), servers (e.g., the servers 112, 114, 116), or any other suitable devices included in and/or otherwise associated with the environments 105, 110, 115 of FIG. 1. For example, the first endpoint device 160 can be connected to the edge services 140, 150 and to the second server 114.

In the illustrated example of FIG. 1, one or more of the endpoint devices 160, 165, 170, 175, 180, 185 can connect to one or more devices in the environments 105, 110, 115 via a network such as the Internet. Additionally or alternatively, one or more of the endpoint devices 160, 165, 170, 175, 180, 185 can communicate with devices in the environments 105, 110, 115 using any suitable wireless network including, for example, one or more WLANs, one or more cellular networks, one or more peer-to-peer networks, one or more private networks, one or more public networks, etc. In some examples, the endpoint devices 160, 165, 170, 175, 180, 185 can be connected to one or more cell towers included in one or more of the environments 105, 110, 115. For example, the first endpoint device 160 can be connected to a cell tower included in the edge environment 110, and the cell tower can be connected to the first edge service 140.

In some examples, one or more of the endpoint devices 160, 165, 170, 175, 180, 185 can communicate with devices in the environments 105, 110, 115 using any suitable wired network including, for example, one or more LANs, one or more fiber-optic networks, one or more coaxial networks, etc. For example, the first computing device 160 can be a television that is connected to the first edge service 140 (e.g., an edge service executing on and/or otherwise implemented by a set-top box, an online streaming device, a gateway, etc.) via an HDMI interface, a fiber-optic interface, a LAN interface, etc., and/or a combination thereof. In other examples, the second computing device 165 can be a gaming console that is connected to the first edge service 140 (e.g., an edge service executing on and/or otherwise implemented by a television, a gateway, an Internet appliance, etc.) via an HDMI interface, a LAN interface, etc., and/or a combination thereof.

In some examples, in response to a request to execute a workload from an endpoint device (e.g., the first endpoint device 160), an orchestrator (e.g., the first orchestrator 142) can communicate with at least one resource (e.g., the first resource(s) 149) and an endpoint device (e.g., the second endpoint device 165) to create a contract (e.g., a workload contract) associated with a description of the workload to be executed. The first example endpoint device 160 can provide a task associated with the contract and the description of the workload to the first orchestrator 142, and the first orchestrator 142 can provide the task to a scheduler (e.g., the first scheduler 144). The task can include the contract and the description of the workload to be executed. In some examples, the task can include requests to acquire and/or otherwise allocate resources used to execute the workload.

In some examples, the orchestrators 142, 152 maintain records and/or logs of actions occurring in the environments 105, 110, 115. For example, the first resource(s) 149 can notify receipt of a workload description to the first orchestrator 142. One or more of the orchestrators 142, 152, the schedulers 144, 154, and/or the resource(s) 149, 159 can provide records of actions and/or allocations of resources to the orchestrators 142, 152. For example, the first orchestrator 142 can maintain or store a record of receiving a request to execute a workload (e.g., a contract request provided by the first endpoint device 160).

In some examples, the schedulers 144, 154 can access a task received and/or otherwise obtained by the orchestrators 142, 152 and provide the task to one or more of the resource(s) 149, 159 to execute or complete. The resource(s) 149, 159 can execute a workload based on a description of the workload included in the task. The example schedulers 144, 154 can access a result of the execution of the workload from one or more of the resource(s) 149, 159 that executed the workload. The schedulers 144, 154 can provide the result to the device that requested the workload to be executed, such as the first endpoint device 160.

Advantageously, an execution of a workload in the example edge environment 110 can reduce costs (e.g., compute or computation costs, network costs, storage costs, etc., and/or a combination thereof) and/or processing time used to execute the workload. For example, the first endpoint device 160 can request the first edge service 140 to execute a workload at a first cost lower than a second cost associated with executing the workload in the cloud environment 105. In other examples, an endpoint device, such as the first through third endpoint devices 160, 165, 170, can be nearer to (e.g., spatially or geographically closer) and/or otherwise proximate to an edge service, such as the first edge service 140, than a centralized server (e.g., the servers 112, 114, 116) in the cloud environment 105. For example, the first edge service 140 is spatially closer to the first endpoint device 160 than the first server 112. As a result, the first example endpoint device 160 can request the first edge service 140 to execute a workload, and the response time of the first edge service 140 to deliver the executed workload result is lower than that can be provided by the first server 112 in the cloud environment 105.

In the illustrated example of FIG. 1, the telemetry controller 130A-C improves the distribution and execution of edge computing workloads (e.g., among the edge services 140, 150) based on the telemetry data 136A-C associated with at least one of the cloud environment 105, the edge environment 110, or the endpoint environment 115. For example, the telemetry controller 130A-C can determine that the first edge service 140 and/or the second edge service 150 has available one(s) of the resource(s) 149, 159, such as hardware resources (e.g., compute resources, network resources, security resources, storage resources, etc.), software resources (e.g., a firewall, a load balancer, a virtual machine (VM), a guest operating system (OS), an application, the orchestrators 142, 152, a hypervisor, etc.), etc., and/or a combination thereof, based on the telemetry data 136A-C, from which edge computing workloads can be executed. In such examples, the telemetry data 136A-C can include a utilization (e.g., a percentage of a resource that is utilized or not utilized), a delay (e.g., an average delay) in receiving a service (e.g., latency), a rate (e.g., an average rate) at which a resource is available (e.g., bandwidth, throughput, etc.), power expenditure, etc., associated with one(s) of the resource(s) 149, 159 of at least one of the first edge service 140 or the second edge service 150.

In some examples, the first telemetry executable 137, when executed, generates the first telemetry data 136A. In some examples, the second telemetry executable 139, when executed, generates the second telemetry data 136B. In some examples, the telemetry executables 137, 139, when executed, can generate the telemetry data 136A-B by invoking a corresponding one of the composition(s) 146, 156.

In some examples, the composition(s) 146, 156 associated with a software resource (e.g., one(s) of the resource(s) 149, 159) can be described, generally, by a manifest structure corresponding to one or more tags, such as one or more software identification (SWID) tags, one or more concise SWID (CoSWID) tags, etc., and/or a combination thereof. SWID tags, CoSWID tags, etc., can provide an extensible XML-based structure to identify and describe individual software components, patches, and installation bundles. For example, a SWID and/or a CoSWID tag can include a software name, edition, version, etc., of the corresponding software resource. In some examples, a SWID and/or a CoSWID tag can indicate available resource(s) of the edge service(s) 140, 150 and membership of a subscribing device to the edge service(s) 140, 150. For example, a subscribing device can be one(s) of the server(s) 112, 114, 116, one(s) of the endpoint device(s) 160, 165, 170, 175, 180, 185, etc., that can access, poll, query, etc., telemetry data from the edge service(s) 140, 150. Different software components, and even different releases of a particular software component, can each have a different SWID tag record associated with them. SWID tags, CoSWID tags, etc., are flexible data structures that can define and/or otherwise represent a broad set of metadata associated with a software component, an executable, a set of machine-readable instructions, etc. In some examples, the composition(s) 146, 156 are described by SWID tags as defined in International Organization for Standardization (ISO) Standard ISO-19770-2 (e.g., Information technology—Software asset management—Part 2: Software identification tag, ISO-19770-2:2015; 2015).

In some examples, the composition(s) 146, 156 associated with a hardware resource (e.g., one(s) of the resource(s) 149, 159) can be described, generally, by an ontology (e.g., a hardware resource ontology), a taxonomy (e.g., a hardware resource taxonomy), a manifest (e.g., a hardware resource manifest), or a platform attribute certificate (e.g., a hardware resource platform attribute certificate, a Trusted Computing Group (TCG) platform attribute certificate or credential, etc.).

In some examples, a composition of hardware or software (e.g., a hardware composition, a software composition, one(s) of the composition(s) 146, 156, etc.) can be managed or tracked using and/or otherwise based on reference integrity measurements (RIMs). In some examples, the composition(s) 146, 156 can be managed or tracked by logging changes to a central logging service or a decentralized logging service such as a blockchain-based logging system. For example, the composition(s) 146, 156 can update one(s) of the server(s) 112, 114, 116, the database 135, etc., in response to detecting a change in a current or last known state of the composition(s) 146, 156. In such examples, the database 135 can store last known state(s) of the composition(s) 146, 156. In response to a change in state of the composition(s) 146, 156, the changed one(s) of the composition(s) 146, 156 can invoke the server(s) 112, 114, 116 to update the last known state(s) stored in the database 135. In other examples, the telemetry controller 130B-C, the orchestrator 152, 162, the scheduler 154, 164, etc., and/or, more generally, the edge service(s) 140, 150 can trigger the server(s) 112, 114, 116 to update the last known state(s) to current known state(s) of the composition(s) 146, 156.

In the illustrated example of FIG. 1, the composition(s) 146, 156 can be resource composition(s) associated with one or more of the resource(s) 149, 159, edge service composition(s) associated with the edge services 140, 150, etc. In example FIG. 1, the composition(s) 146, 156 include(s), correspond(s) to, and/or otherwise is/are representative of data models, information models, machine readable resource models, etc., representative of virtualizations of hardware resources, software resources, etc., of the resource(s) 149, 159, and/or, more generally, the edge services 140, 150, that can facilitate the aggregation of edge computing telemetry. For example, the composition(s) 146, 156 can be representative of one or more interfaces to generate and/or otherwise obtain the telemetry data 136A-C associated with the resource(s) 149, 159 of the edge services 140, 150. In some examples, the composition(s) 146, 156 include(s) one or more resource compositions that each may include one or more resource models. For example, a resource model can include, correspond to, and/or otherwise be representative of a virtualization of a hardware resource or a software resource.

In some examples, the first composition(s) 146 include(s) at least a first resource model corresponding to a virtualization of a compute resource (e.g., a CPU, an FPGA, a GPU, a NIC, etc.). In such examples, the first resource model can include a resource object and a telemetry object. The resource object can be and/or otherwise correspond to a capability and/or function of a core of a multi-core CPU, one or more hardware portions of an FPGA, one or more threads of a GPU, etc. The telemetry object can be and/or otherwise correspond to an interface (e.g., a telemetry interface) to the core of the multi-core CPU, the one or more hardware portions of the FPGA, the one or more threads of the GPU, etc. In some examples, the telemetry object can include, correspond to, and/or otherwise be representative of one or more application programming interfaces (APIs), calls (e.g., hardware calls, system calls, etc.), hooks, etc., that, when executed, can obtain telemetry data from the compute resource.

In example operation, the first edge service 140 can invoke the first composition(s) 146, and/or, more generally, the first telemetry executable 137, to determine, generate, and/or obtain the first telemetry data 136A. For example, the first resource(s) 149 can include hardware resources that can be used for edge computing tasks by the endpoint devices 160, 165, 170, 175, 180, 185, where the hardware resources can include at least a multi-core CPU and a solid-state disc (SSD) drive. In such examples, the first compositions 146 can include at least a first resource model corresponding to a core of the multi-core CPU and a second resource model corresponding to a partition of the SSD drive. The first compositions 146 can determine the first telemetry data 136A, such as a quantity of gigahertz (GHz) at which the core can execute, a utilization of the core (e.g., the core is 25% utilized, 50% utilized, 75% utilized, etc.), a quantity of gigabytes (GB) of the SSD partition, a utilization of the SSD partition, etc., and/or a combination thereof.

In example operation, in response to the first composition(s) 146 determining and/or otherwise obtaining the telemetry data 136, the first edge service 140 can transmit the first telemetry data 136A to one or more of the servers 112, 114, 116. The example server(s) 112, 114, 116 can store the first telemetry data 136A in the database 135. In some examples, the server(s) 112, 114, 116 can invoke one or both orchestrators 142, 152 to adjust distribution of workloads obtained from the endpoint devices 160, 165, 170, 175, 180, 185 to the edge services 140, 150. Advantageously, the example orchestrators 142, 152, and/or, more generally, the example edge services 140, 150, can improve efficiency and utilization of the edge services 140, 150 by allocating or assigning edge computing workloads to the resource(s) 149, 159 of the edge services 140, 150 identified as available based on the telemetry data 136A-C. Advantageously, by allocating edge computing workloads to available one(s) of the resource(s) 149, 159, the edge example services 140, 150 can increase throughput and reduce latency of workloads executed by the edge environment 110.

Figure 2:
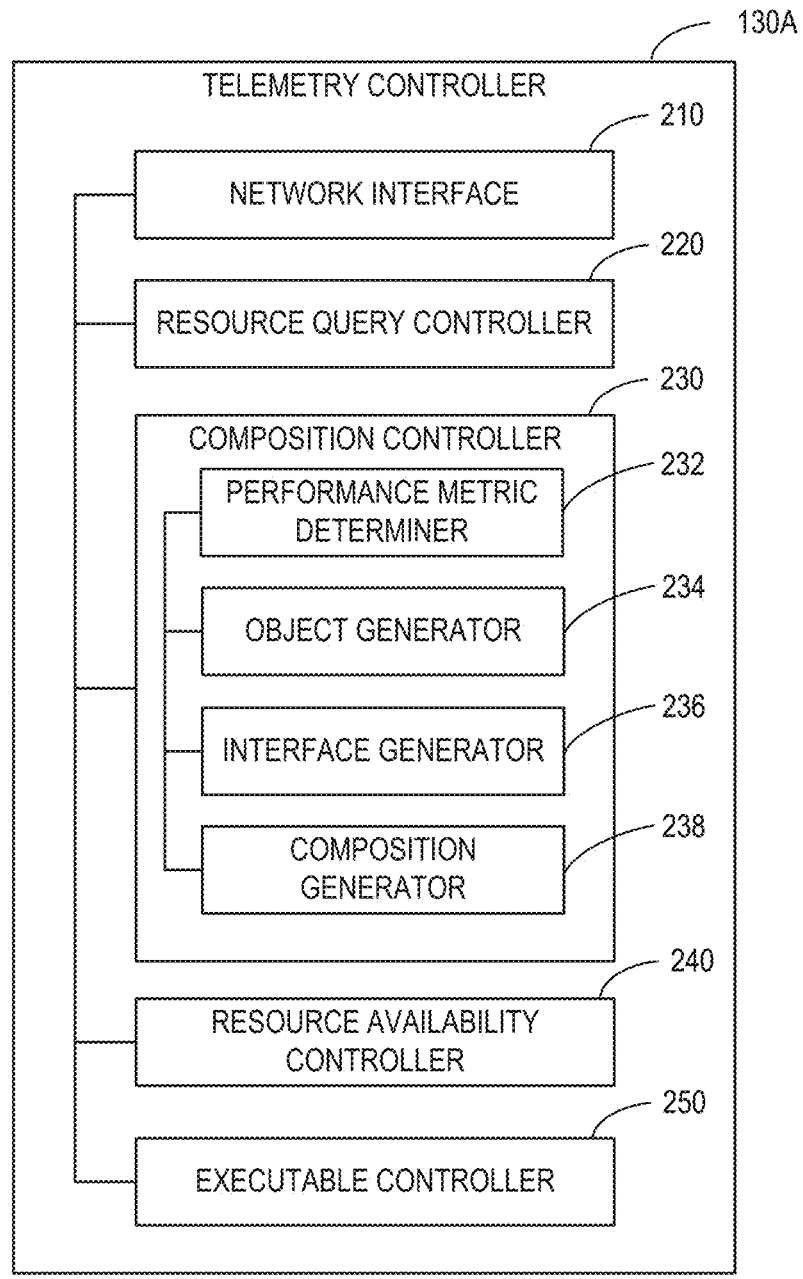
FIG. 2 depicts a block diagram of the example telemetry controllers of FIG. 1.

FIG. 2 depicts an example block diagram of the telemetry controller 130A-C of FIG. 1. In example FIG. 2, the telemetry controller 130A includes an example network interface 210, an example resource query controller 220, an example composition controller 230, an example performance metric determiner 232, an example object generator 234, an example interface generator 236, an example composition generator 238, an example resource availability controller 240, and an example executable controller 250. Although the block diagram of FIG. 2 represents a single telemetry controller, multiple instances of the block diagram of FIG. 2 may be used to implement multiple telemetry controllers such as the telemetry controllers 130A-C of FIG. 1.

In the illustrated example of FIG. 2, the telemetry controller 130A-C includes the network interface 210 to obtain information from and/or transmit information to a network (e.g., the Internet, a cellular network, an edge network, a V2X network, etc.), an environment (e.g., the cloud environment 105, the edge environment 110, the endpoint environment 115, etc. of FIG. 1), etc., and/or a combination thereof. In some examples, the network interface 210 implements a web server that (1) receives workloads from the endpoint devices 160, 165, 170, 175, 180, 185, (2) transmits the telemetry data 136A-C to the servers 112, 114, 116, etc. In some examples, the workloads, the telemetry data 136A-C, etc., are formatted as one or more HyperText Transfer Protocol (HTTP) messages. However, any other message format and/or protocol may additionally or alternatively be used such as, for example, file transfer protocol (FTP), a simple message transfer protocol (SMTP), an HTTP secure (HTTPS) protocol, a V2X protocol, a cellular communication protocol, etc.

In the illustrated example of FIG. 2, the telemetry controller 130A-C includes the resource query controller 220 to poll and/or query an environment (e.g., the cloud environment 105, the edge environment 110, the endpoint environment 115, etc., of FIG. 1) for resources associated with the environment. In some examples, the resource query controller 220 can generate a discovery or query data packet (e.g., an address resolution protocol (ARP) packet, an HTTP packet, an HTTPS packet, etc.) to an environment of interest. For example, the resource query controller 220 can transmit one or more discovery data packets to one or more of the servers 112, 114, 116 of FIG. 1, one or more of the edge services 140, 150 of FIG. 1, one or more of the endpoint devices 160, 165, 170, 175, 180, 185 of FIG. 1, etc., and/or a combination thereof.

In some examples, the resource query controller 220 obtains one or more response data packets in response to one or more transmitted discovery data packets. For example, the resource query controller 220 can transmit a discovery data packet to the first edge service 140. In such examples, the first edge service 140 can transmit one or more response data packets to the resource query controller 220. The example resource query controller 220 can determine that the first edge service 140 includes one or more of the resource(s) 149 by extracting resource data or information from the one or more response data packets. For example, the resource query controller 220 can determine that the resource(s) 149 include(s) one or more CPUs, one or more GPUs, one or more FPGAs, one or more VMs, one or more hypervisors, etc., based on the extracted resource data. In such examples, the resource query controller 220 can determine that the one or more CPUs, the one or more GPUs, the one or more FPGAs, etc., are of a particular manufacturer make, model, version, etc., or any other type of identifying information. In other examples, the resource query controller 220 can determine that the one or more VMs, the one or more hypervisors, etc., are of a particular software vendor, a software version, etc.

In the illustrated example of FIG. 2, the telemetry controller 130A-C includes the composition controller 230 to adaptively and/or dynamically generate a machine-readable model (e.g., a resource model, a telemetry model, etc.) for a resource of interest. In example FIG. 2, the composition controller 230 includes the performance metric determiner 232, the object generator 234, the interface generator 236, and the composition generator 238.

In the illustrated example of FIG. 2, the composition controller 230 includes the performance metric determiner 232 to determine, identify, and/or select a performance metric of interest to process. In some examples, the performance metric determiner 232 determines that a resource, such as a core of a multi-core CPU, has one or more performance metrics of interest that can be used to generate the telemetry data 136A-C of FIG. 1. For example, the core of the multi-core CPU can have a first performance metric representative of a quantity of threads available, a second performance metric representative of an accelerator that the core supports, a third performance metric representative of core latency, etc. In some examples, the performance metric determiner 232 selects a performance metric of interest to process. For example, the performance metric determiner 232 can select the first, second, third, etc., performance metric to generate an object (e.g., a resource object, a telemetry object, etc.) and/or an interface (e.g., a RIO interface, a TIO interface, etc.).

In the illustrated example of FIG. 2, the composition controller 230 includes the object generator 234 to generate, compile, and/or otherwise instantiate an object (e.g., a resource object, a telemetry object, etc.) based on a resource. In some examples, the object generator 234 generates a resource object by virtualizing a hardware resource or a software resource. In some examples, the object generator 234 generates a resource object based on a hardware resource. For example, the object generator 234 can generate a resource object for a hardware resource, such as a partition of storage. In such examples, the object generator 234 can generate a RIO based on the storage partition, where the RIO corresponds to a performance metric associated with the storage partition. For example, the RIO can be representative of a performance metric of the storage partition, such as a quantity of read/write cycles executed by the storage partition, a latency of the storage partition, a percentage or portion of the storage partition that is available to execute an edge computing workload, etc.

In some examples, the object generator 234 generates a telemetry object based on the hardware resource. For example, the object generator 234 can generate a telemetry object for the storage partition. In such examples, the object generator 234 can generate a TIO based on the storage partition, where the TIO corresponds to a performance metric associated with the storage partition. For example, the TIO can be representative of a performance metric of the storage partition, such as a quantity of read/write cycles executed by the storage partition, latency of the storage partition, a quantity of the storage partition that is available to execute an edge computing workload, etc.

In some examples, the object generator 234 generates a resource object based on a software resource. For example, the object generator 234 can generate a resource object for a software resource, such as a virtualized load balancer. In such examples, the object generator 234 can generate a resource information object based on the load balancer, where the resource information object corresponds to a performance metric associated with the load balancer. For example, the resource information object can be representative of a performance metric of the load balancer, such as a current or historical throughput of the load balancer, a latency of the load balancer, whether the load balancer is available to execute an edge computing workload, etc.

In some examples, the object generator 234 generates a telemetry object based on the software resource. For example, the object generator 234 can generate a telemetry object for the load balancer. In such examples, the object generator 234 can generate a TIO based on the load balancer, where the TIO corresponds to a performance metric associated with the load balancer. For example, the TIO can be representative of a performance metric of the load balancer, such as a current or historical throughput of the load balancer, a latency of the load balancer, whether the load balancer is available to execute an edge computing workload, etc.

In the illustrated example of FIG. 2, the composition controller 230 includes the interface generator 236 to generate, compile, and/or otherwise instantiate an interface (e.g., a RIO interface, a TIO interface, etc.) based on a RIO, a TIO, etc. In some examples, the interface generator 236 generates a RIO interface based on a RIO. For example, the interface generator 236 can generate a RIO interface for a RIO corresponding to a storage partition. In such examples, the interface generator 236 can generate a RIO interface based on the storage partition, where the RIO interface is representative of and/or otherwise corresponds to machine readable instructions (e.g., a hardware call, a system call, etc.) that, when executed, invokes the storage partition to obtain and/or generate telemetry data associated with a performance metric associated with the storage partition. For example, the RIO interface can be a telemetry interface and, thus, be representative of a command, an instruction, etc., that, when executed, can query the storage partition for telemetry data of interest associated with the storage partition.

In some examples, the interface generator 236 generates a TIO interface based on a TIO. For example, the interface generator 236 can generate a TIO interface for a TIO corresponding to a storage partition. In such examples, the interface generator 236 can generate a TIO interface based on the storage partition, where the TIO interface is representative of and/or otherwise corresponds to machine readable instructions (e.g., an API, a call, a hook, etc.) that, when executed, invokes the RIO to obtain and/or generate telemetry data associated with a performance metric associated with the storage partition. For example, the TIO interface can be representative of a command, an instruction, etc., that, when executed, can invoke the RIO to invoke the RIO object to query the storage partition for telemetry data of interest associated with the storage partition.

In the illustrated example of FIG. 2, the composition controller 230 includes the composition generator 238 to generate, compile, and/or otherwise instantiate a composition (e.g., a resource composition, a telemetry composition, etc.) associated with the resource(s) 149, 159 of FIG. 1, and/or, more generally, the edge service 140, 150 of FIG. 1. For example, the composition controller 230 can generate the composition(s) 146, 156 of FIG. 1. In such examples, the composition controller 230 can generate the composition(s) 146, 156 by composing isomorphic graphs based on relationship(s) between different resource objects, telemetry objects, etc. Advantageously, in some examples, the composition controller 230 can generate the composition(s) 146, 156 to generate telemetry data associated with one(s) of the resource(s) 149, 159 as a whole (e.g., a hardware platform including a multi-core CPU and an FPGA) rather than telemetry data associated with a portion of the resource(s) 149, 159 (e.g., a core of the multi-core CPU, a hardware portion of the FPGA, etc.).

In some examples, the composition generator 238 generates a resource composition including one or more resource objects or systems of objects. In such examples, the composition generator 238 can aggregate a plurality of resource objects, link one(s) of the plurality of the resource objects using an acyclic and/or a cyclic graph or subgraph, and determine whether one(s) of the plurality of the resource objects are subordinate objects, peer-to-peer coupled objects, etc., based on the link(s). Additional description in connection with the resource composition is described below in connection with FIGS. 6A-6C.

In some examples, the composition generator 238 generates a telemetry composition including one or more telemetry objects. In such examples, the composition generator 238 can aggregate a plurality of telemetry objects, link one(s) of the plurality of the telemetry objects using an acyclic and/or a cyclic graph or subgraph, and determine whether one(s) of the plurality of the telemetry objects are subordinate objects, peer-to-peer coupled objects, etc., based on the link(s). Additional description in connection with the telemetry composition is described below in connection with FIGS. 7A-7C.

In the illustrated example of FIG. 2, the telemetry controller 130A-C includes the resource availability controller 240 to determine and/or otherwise identify whether one(s) of the resource(s) 149, 159 is/are available to execute an edge computing workload based on the telemetry data 136A-C. In some examples, the resource availability controller 240 can determine that the first resource(s) 149 of FIG. 1 is available to execute a workload from the first endpoint device 160 based on the first telemetry data 136A. For example, the workload can require an FPGA for completion. In such examples, the resource availability controller 240 can determine that the first resource(s) 149 of the first edge service 140 include(s) an FPGA based on the first composition(s) 146 including a resource composition, a telemetry composition, etc., corresponding to an FPGA. Advantageously, the resource availability controller 240 can determine that the FPGA associated with the first edge service 140 is available based on the first telemetry data 136A. For example, the first telemetry data 136A is indicative of the FPGA having one or more hardware portions that are idle, underutilized, and/or otherwise available to execute a workload. In such examples, the resource availability controller 240 can distribute and/or otherwise allocate the workload to the first resource(s) 149 for execution.

In the illustrated example of FIG. 2, the telemetry controller 130A-C includes the executable controller 250 to compile and/or otherwise generate the executables 137, 139 of FIG. 1 based on the composition(s) 146, 156 of FIG. 1. In some examples, in response to the composition generator 238, and/or, more generally, the composition controller 230, generating one or more resource compositions (e.g., hardware resource compositions, software resource compositions, etc.) the executable controller 250 can compile the one or more resource compositions into one or more machine readable executables.

In some examples, in response to the executable controller 250 of the first telemetry controller 130A compiling the executables 137, 139, the one or more servers 112, 114, 116 can distribute the executables 137, 139 to a corresponding one of the edge services 140, 150. For example, the executable controller 250 can transmit and/or otherwise distribute (1) the first executable 137 to the first edge service 140, (2) the second executable 139 to the second edge service 150, etc. In some examples, in response to the executable controller 250 of one of the edge services 140, 150 compiling a corresponding one of the executables 137, 139, the executable controller 250 can transmit the corresponding one of the executables 137, 139 to one or more of the servers 112, 114, 116 for storage in the database 135.

While an example manner of implementing the telemetry controller 130A-C of FIG. 1 is illustrated in FIG. 2, one or more of the elements, processes, and/or devices illustrated in FIG. 2 may be combined, divided, re-arranged, omitted, eliminated, and/or implemented in any other way. Further, the example network interface 210, the example resource query controller 220, the example composition controller 230, the example performance metric determiner 232, the example object generator 234, the example interface generator 236, the example composition generator 238, the example resource availability controller 240, the example executable controller 250, and/or, more generally, the example telemetry controller 130A-C of FIG. 1 may be implemented by hardware, software, firmware and/or any combination of hardware, software, and/or firmware. Thus, for example, any of the example network interface 210, the example resource query controller 220, the example composition controller 230, the example performance metric determiner 232, the example object generator 234, the example interface generator 236, the example composition generator 238, the example resource availability controller 240, the example executable controller 250, and/or, more generally, the example telemetry controller 130A-C could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example network interface 210, the example resource query controller 220, the example composition controller 230, the example performance metric determiner 232, the example object generator 234, the example interface generator 236, the example composition generator 238, the example resource availability controller 240, and/or the example executable controller 250 is/are hereby expressly defined to include a non-transitory computer readable storage device or storage disk such as a memory, a digital versatile disk (DVD), a compact disk (CD), a Blu-ray disk, etc. including the software and/or firmware. Further still, the example telemetry controller 130A-C of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

In the illustrated example of FIG. 2, the telemetry controller 130A-C includes means for composing a composition (e.g., the composition(s) 146, 156) for an edge service (e.g., the edge service(s) 140, 150) in an edge environment (e.g., the edge environment 110), where the composition can be representative of a first interface to obtain telemetry data (e.g., the telemetry data 136A-C) associated with resources (e.g., the resource(s) 149, 159) of the edge service, and where the telemetry data includes a performance metric.

In some examples, the means for composing can determine that a second resource object (e.g., a second one of the resource objects 302) is dependent on a first resource object (e.g., a first one of the resource objects 302), and, in response to the determination, assign a second telemetry object (e.g., a second one of the telemetry objects 304) as dependent on a first telemetry object (e.g., a first one of the telemetry objects 304), where the second telemetry object corresponds to the second resource object.

In some examples, in response to determining that the second resource object is dependent on the first resource object, the means for composing can generate a new composition (e.g., the composition(s) 146, 156 of FIG. 1) by assigning the second resource object as dependent on the first resource object, and assigning the second telemetry object as dependent on the first telemetry object. In some examples, the composition generator 238 implements the means for composing.

In the illustrated example of FIG. 2, the telemetry controller 130A-C includes means for generating a resource object (e.g., the resource object 302) based on a performance metric, where the resource object is representative of a first interface, where the first interface can obtain the performance metric from a resource (e.g., one(s) of the resource(s) 149, 159 of FIG. 1). In some examples, the means for generating generates a telemetry object based on the performance metric, where the telemetry object is representative of a second interface, where the second interface can obtain the performance metric from the resource object.

Figure 3:
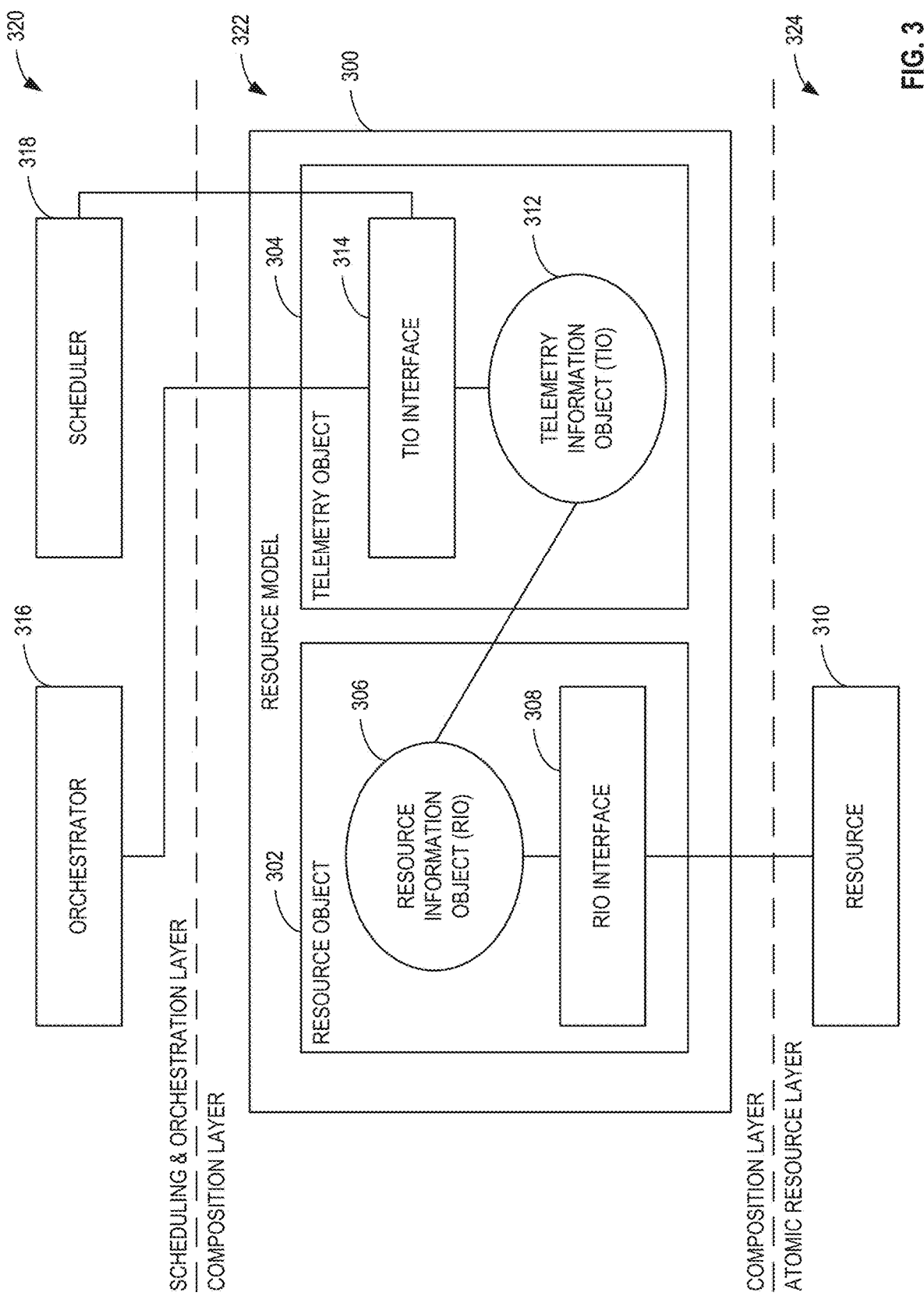
FIG. 3 depicts an example resource model including a resource information object and a telemetry information object.

In some examples, the means for generating generates a RIO interface (e.g., the RIO interface 308 of FIG. 3) based on an event (e.g., a hardware event, a resource event, etc.), where the RIO interface can be representative of a first instruction to obtain the performance metric from a resource (e.g., the resource 310 of FIG. 3). In some examples, the means for generating generates a RIO (e.g., the RIO 306 of FIG. 3) based on a function of the resource, where the RIO can be representative of a second instruction to obtain the performance metric from the RIO interface.

In some examples, the means for generating generates a TIO interface (e.g., the TIO interface 314 of FIG. 3) based on a telemetry call (e.g., an API), where the TIO interface can be representative of a first instruction to obtain a request for the telemetry data (e.g., the telemetry data 136A-C of FIG. 1) from an endpoint environment (e.g., the endpoint environment 115 of FIG. 1). In some examples, the means for generating generates a TIO (e.g., the TIO 312 of FIG. 3) based on the first instruction, where the TIO can be representative of a second instruction to obtain the performance metric from the resource object.

In some examples, the means for generating generates a first resource object (e.g., a first one of the resource objects 302 of FIG. 3) by virtualizing a hardware resource or a software resource (e.g., the resource(s) 149, 159 of FIG. 1). In some examples, the means for generating generates a first telemetry object (e.g., a first one of the telemetry objects 304 of FIG. 3) representative of one or more instructions to invoke the first resource object to obtain a performance metric associated with the hardware resource or the software resource. In some examples, the means for generating generates a second resource object and a second telemetry object based on a second resource, where the second resource can be different from the first resource. In such examples, the second resource object can be dependent on the first resource object and the second telemetry object can be dependent on the first telemetry object. In some examples, the object generator 234 and/or the interface generator 236 implement the means for generating.

In the illustrated example of FIG. 2, the telemetry controller 130A-C includes first means for mapping a performance metric to a function of a resource (e.g., the resource(s) 149, 159 of FIG. 1), where the performance metric can be determined based on the resource executing the function.

In some examples, the first means for mapping maps the performance metric to a function of a telemetry resource, where the telemetry resource can be representative of an instruction to obtain telemetry data (e.g., the telemetry data 136A-C of FIG. 1) from a resource object (e.g., the resource object 302 of FIG. 3), where the performance metric can be determined based on the resource executing a computing task. In some examples, the object generator 234 implements the first means for mapping.

In the illustrated example of FIG. 2, the telemetry controller 130A-C includes second means for mapping a performance metric to an event generated by a resource (e.g., the resource(s) 149, 159), where the event can correspond to at least one of a hardware counter or a software counter associated with the resource. In some examples, the second means for mapping maps the performance metric to a telemetry call (e.g., an API). In some examples, the interface generator 236 implements the second means for mapping.

In the illustrated example of FIG. 2, the telemetry controller 130A-C includes means for compiling a telemetry executable (e.g., the executable(s) 137, 147 of FIG. 1) based on a composition (e.g., the composition(s) 146, 156 of FIG. 1), where the composition can include at least one of a resource object (e.g., the resource object 302 of FIG. 3) or a telemetry object (e.g., the telemetry object 304 of FIG. 3). In such examples, the telemetry executable can generate telemetry data (e.g., the telemetry data 136A-C of FIG. 1) in response to an edge service (e.g., the edge service 140, 150 of FIG. 1) executing a computing task, where the computing task can be distributed to the edge service based on the telemetry data. In some examples, the executable controller 250 implements the means for compiling.

In the illustrated example of FIG. 2, the edge service(s) 140, 150 of FIG. 1 include(s) first means for invoking, where in response to obtaining a first instruction to obtain telemetry data (e.g., the telemetry data 136A-C of FIG. 1) from a composition (e.g., the composition(s) 146, 156 of FIG. 1), the first means for invoking invokes a first telemetry object (e.g., a first one of the telemetry objects 304 of FIG. 3) to generate a second instruction to obtain the telemetry data from a first resource object (e.g., a first one of the resource objects 302 of FIG. 3). In FIG. 2, the telemetry controller 130A-C includes second means for invoking, where in response to obtaining a third instruction, the second means for invoking invokes the first resource object to obtain the telemetry data from the hardware resource or the software resource. In some examples, the composition(s) 146, 156 of FIG. 1, and/or, more generally, the telemetry executable 137, 147 of FIG. 1, implements the first means for invoking and/or the second means for invoking.

In the illustrated example of FIG. 2, the edge service(s) 140, 150 include(s) second means for generating second telemetry data (e.g., the telemetry data 136A-C of FIG. 1) by invoking a second telemetry object (e.g., a second one of the telemetry objects 304 of FIG. 3) that is dependent on a first telemetry object. In some examples, the second means for generating, in response to generating the second telemetry data, generates first telemetry data by invoking the first telemetry object (e.g., a first one of the telemetry objects 304 of FIG. 3), and determines third telemetry data (e.g., the telemetry data 136A-C of FIG. 1) based on the first telemetry data and the second telemetry data.

In some examples, the second means for generating determines a first performance metric code based on a first performance metric, a second performance metric code based on a second performance metric, and a third performance metric code based on a third performance metric. In some examples, in response to invoking a trigger indicative of the first performance metric and the second performance metric being generated, the second means for generating is to map the first performance metric code to a first memory location storing the first performance metric, map the second performance metric code to a second memory location storing the second performance metric, determine the third performance metric based on the first performance metric and the second performance metric, and in response to mapping the third performance metric code to a third memory location, store the third performance metric at the third memory location. In some examples, the composition(s) 146, 156 of FIG. 1, and/or, more generally, the telemetry executable(s) 137, 147 of FIG. 1, implement the second means for generating.

In some examples, one or more of the means for composing, the means for generating (e.g., the first means for generating), the second means for generating, the means for compiling, the first means for mapping, the second means for mapping, the first means for invoking, and/or the second means for invoking is/are implemented by any processor structured to perform the corresponding operation by executing software or firmware, or hardware circuit (e.g., discrete and/or integrated analog and/or digital circuitry, an FPGA, a PLD, a FPLD, an ASIC, a comparator, an operational-amplifier (op-amp), a logic circuit, etc.) structured to perform the corresponding operation without executing software or firmware, but other structures are likewise appropriate.

FIG. 3 depicts an example resource model 300 including an example resource object 302 and an example telemetry object 304. In FIG. 3, the resource model 300 can be a telemetry model that, when executed, can generate telemetry data based on partition(s), portion(s), slice(s), etc., of resource(s) executing one or more computing tasks. For example, the resource model 300 of FIG. 3 can be used to implement the composition(s) 146, 156 of FIG. 1. In example FIG. 3, the resource model 300 can be a machine-executable model or representation of one of the resource(s) 149, 159 that, when executed, can generate and/or otherwise make available telemetry data for consumption by a data consumer. In example FIG. 3, the resource model 300 can correspond to virtualization(s) of one(s) of the resource(s) 149, 159 of FIG. 1. For example, the resource model 300 can be implemented using machine-readable instructions that, when executed, obtain and/or generate telemetry data for a performance metric of interest associated with the one(s) of the resource(s) 149, 159.

In some examples, the resource model 300 of FIG. 3 corresponds to a performance metric of a hardware resource, such as a core of a multi-core CPU. For example, the performance metric can be core usage (e.g., utilization for the entire core or a specific process executed by the core), a number of private bytes (e.g., committed process memory (both managed and native)), a number of virtual bytes (e.g., virtual memory allocated for a process), a number of input/output (I/O) data bytes per second (e.g., a number of bytes a process sends or receives), a number of exceptions generated per second, etc. For example, the resource model 300 can correspond to at least a utilization of the core of the multi-core CPU.

In the illustrated example of FIG. 3, the resource model 300 includes the resource object 302 to generate, access, and/or otherwise obtain values for a performance metric of interest. In FIG. 3, the resource object 302 can be representative of an interface to obtain a performance metric, a value of a performance metric, etc., from an example resource 310 (e.g., one(s) of the resource(s) 149, 159 of FIG. 1). In FIG. 3, the resource object 302 includes an example resource information object (RIO) 306 and an example RIO interface 308.

In the illustrated example of FIG. 3, the resource object 302 includes the RIO 306 to define and/or otherwise specify a performance metric and/or instructions to obtain the performance metric. For example, the RIO 306 can be a data structure, a data definition, etc., including an identifier (e.g., a variable, an alphanumeric identifier, etc.) for the performance metric, a data type of the performance metric (e.g., an array data type, a float data type, an integer data type, a string data type, etc.), data precision information (e.g., a number of digit places, a number of significant figures, etc.), etc., and/or a combination thereof.

In some examples, the object generator 234 of FIG. 2, and/or, more generally, the telemetry controller 130A-C (FIGS. 1 and 2), generates the RIO 306 by mapping a performance metric of interest associated with the resource 310 to a function of the resource 310. For example, the resource 310 can be a core of a multi-core CPU and the function can be executing or retiring an instruction, executing a logical cycle, executing a reference cycle, executing a call, executing a direct call, etc. In such examples, the object generator 234 can map a performance metric corresponding to a quantity of executed instructions to the function of executing an instruction. The example object generator 234 can generate the RIO 306 based on the function, where the RIO 306 can be representative of one or more instructions to obtain the performance metric from the RIO interface 308.

In the illustrated example of FIG. 3, the resource object 302 includes the RIO interface 308 to define and/or otherwise specify one or more commands, instructions, etc., to invoke the resource 310 to obtain a value for the performance metric corresponding to the RIO 306, and/or, more generally, the resource model 300. For example, the RIO interface 308 can include, correspond to, and/or otherwise be representative of one or more hardware or system calls (e.g., a Linux performance (PERF) command or instruction, a Nigel's Monitor (NMON) command or instruction, a System Activity Report (SAR) tool command or instruction, etc.), etc. In example FIG. 3, the resource 310 can be a hardware resource, a software resource, etc. For example, the resource 310 can be a core of a multi-core CPU, a load balancer (e.g., a virtualized load balancer), etc. In such examples, the RIO interface 308, when invoked, can transmit a command to the resource 310, which, in turn, can obtain and/or generate a performance metric value corresponding to the command.

In some examples, the interface generator 236 of FIG. 2, and/or, more generally, the telemetry controller 130A-C, generates the RIO interface 308 by mapping a performance metric of interest associated with the resource 310 to event(s) (e.g., resource event(s)) generated by the resource 310. For example, the resource 310 can be a core of a multi-core CPU and the event can be an update to at least one of a hardware counter (e.g., a hardware performance counter) or a software counter (e.g., a software performance counter) included in the multi-core CPU that monitors a function of the core. For example, the function can correspond to the core executing an instruction. In such examples, the interface generator 236 can map a performance metric corresponding to a quantity of executed instructions to the function of executing an instruction. The example interface generator 236 can generate the RIO interface 308 based on the event, where the RIO interface 308 can be representative of one or more instructions to obtain the performance metric from at least one of the hardware counter or the software counter of the resource 310.

In the illustrated example of FIG. 3, the resource model 300 includes the telemetry object 304 to generate, access, and/or otherwise obtain values for a performance metric of interest from the resource object 302. In example FIG. 3, the telemetry object 304 can be representative of an interface to obtain a performance metric, a value of the performance metric, etc., from the resource object 302. In example FIG. 3, the telemetry object 304 includes an example telemetry information object (TIO) 312 and an example TIO interface 314. In FIG. 3, the TIO 312, and/or, more generally, the telemetry object 304, is communicatively and/or functionally coupled to the RIO 306, and/or, more generally, the resource object 302.

In the illustrated example of FIG. 3, the telemetry object 304 includes the TIO 312 to define and/or otherwise specify a performance metric and/or instructions to obtain the performance metric from the resource 310 via the resource object 302. For example, the TIO 312 can be a data structure or definition including instructions to invoke the RIO 306, an identifier (e.g., a variable, an alphanumeric identifier, etc.) for the performance metric, a data type of the performance metric (e.g., an array data type, a float data type, an integer data type, a string data type, etc.), data precision information (e.g., a number of digit places, a number of significant figures, etc.), etc., and/or a combination thereof.

In some examples, the object generator 234 of FIG. 2, and/or, more generally, the telemetry controller 130A-C, generates the TIO 312 by mapping a performance metric of interest associated with the resource 310 to a function of a telemetry resource. For example, the function can be obtaining telemetry data from the RIO 306, and the telemetry resource can be a call instruction, a jump instruction, a machine readable instruction, etc., that, when executed, triggers the RIO 306 to obtain telemetry data from the resource 310. The example object generator 234 can generate the TIO 312 based on the function, where the TIO 312 can be representative of one or more instructions to obtain the performance metric from the RIO 306.

In the illustrated example of FIG. 3, the telemetry object 304 includes the TIO interface 314 to define and/or otherwise specify one or more commands, instructions, etc., to invoke the resource object 302 to obtain a value for the performance metric corresponding to the resource model 300. For example, the TIO interface 314 can include, correspond to, and/or otherwise be representative of one or more network interfaces, one or more web servers, one or more APIs (e.g., a Representational State Transfer (REST) API, a Simple Object Access Protocol (SOAP) API, etc.), etc.

In some examples, the interface generator 236 of FIG. 2, and/or, more generally, the telemetry controller 130A-C, generates the TIO interface 314 by mapping a performance metric of interest associated with the resource 310 to a telemetry call. For example, the telemetry call can be a call or an invocation of a network interface, a web server, an API, etc., that, when executed, triggers the TIO 312 to obtain telemetry data from the RIO 306. The example interface generator 236 can generate the TIO interface 314 based on the telemetry call, where the TIO interface 314 can be representative of one or more instructions to obtain the performance metric from the resource 310 via the RIO 306.

In the illustrated example of FIG. 3, the TIO interface 314, and/or, more generally, the telemetry object 304, and/or, more generally, the resource model 300, is in communication with an example orchestrator 316 and an example scheduler 318. In example FIG. 3, the orchestrator 316 can be implemented by and/or otherwise correspond to at least one of the first orchestrator 142 or the second orchestrator 152 of FIG. 1. In example FIG. 3, the scheduler 318 can be implemented by and/or otherwise correspond to at least one of the first scheduler 144 or the second scheduler 154 of FIG. 1.

In the illustrated example of FIG. 3, the resource model 300 executes in connection with a plurality of example logical layers 320, 322, 324. In example FIG. 3, the logical layers 320, 322, 324 include an example scheduling and orchestration layer 320, an example composition layer 322, and an example atomic resource layer 324. In example FIG. 3, the scheduling and orchestration layer 320 includes the orchestrator 316 and the scheduler 318 to facilitate the aggregation of telemetry data and the scheduling and/or execution of workloads. In example FIG. 3, the composition layer 322 includes the resource model 300 to generate and/or otherwise aggregate telemetry data of interest associated with the resource 310. In example FIG. 3, the atomic resource layer 324 includes hardware resources, software resources, etc., such as the resource 310. For example, the resource 310 can correspond to and/or otherwise implement the first resource(s) 149 and/or the second resource(s) 159 of FIG. 1.

In example operation, the orchestrator 316 and/or the scheduler 318 can transmit a request to and/or otherwise invoke an API of the TIO interface 314. For example, the request can correspond to obtaining a performance metric, a performance metric value, etc., associated with the resource 310. In such examples, in response to the request and/or the API being invoked, the TIO interface 314 can trigger and/or otherwise command the TIO 312 to execute the request. For example, the TIO interface 314 can map the performance metric included in the request to a definition of the performance metric in the TIO 312. In response to the example TIO 312 obtaining the request from the TIO interface 314, the TIO 312 can trigger and/or otherwise instruct the RIO 306 to execute the request. In response to the example RIO 306 obtaining the request from the TIO 312, the RIO 306 can invoke the RIO interface 308 to request the performance metric from the resource 310. For example, the RIO interface 308 can transmit a command to the resource 310 to generate telemetry data of interest.

Advantageously, the example resource model 300 can translate a resource-agnostic API command, hook, call, etc., from the orchestrator 316 and/or the scheduler 318 to a hardware and/or software system call tailored to and/or otherwise corresponding to the resource 310. For example, the request from the orchestrator 316 and/or the scheduler 318 can be a request for telemetry data of interest and the request does not need to correspond to any specific manufacturer, model number, type, version, etc., of the resource 310. In such examples, the hardware or software system call can correspond to and/or otherwise be compliant with a specific manufacturer, model number, type, version, etc., of the resource 310. Advantageously, a requesting device or service (e.g., a server, an edge service, etc.) can request telemetry data of interest for the resource 310 without being aware of and/or otherwise knowing particular details about the resource 310.

Figure 4:
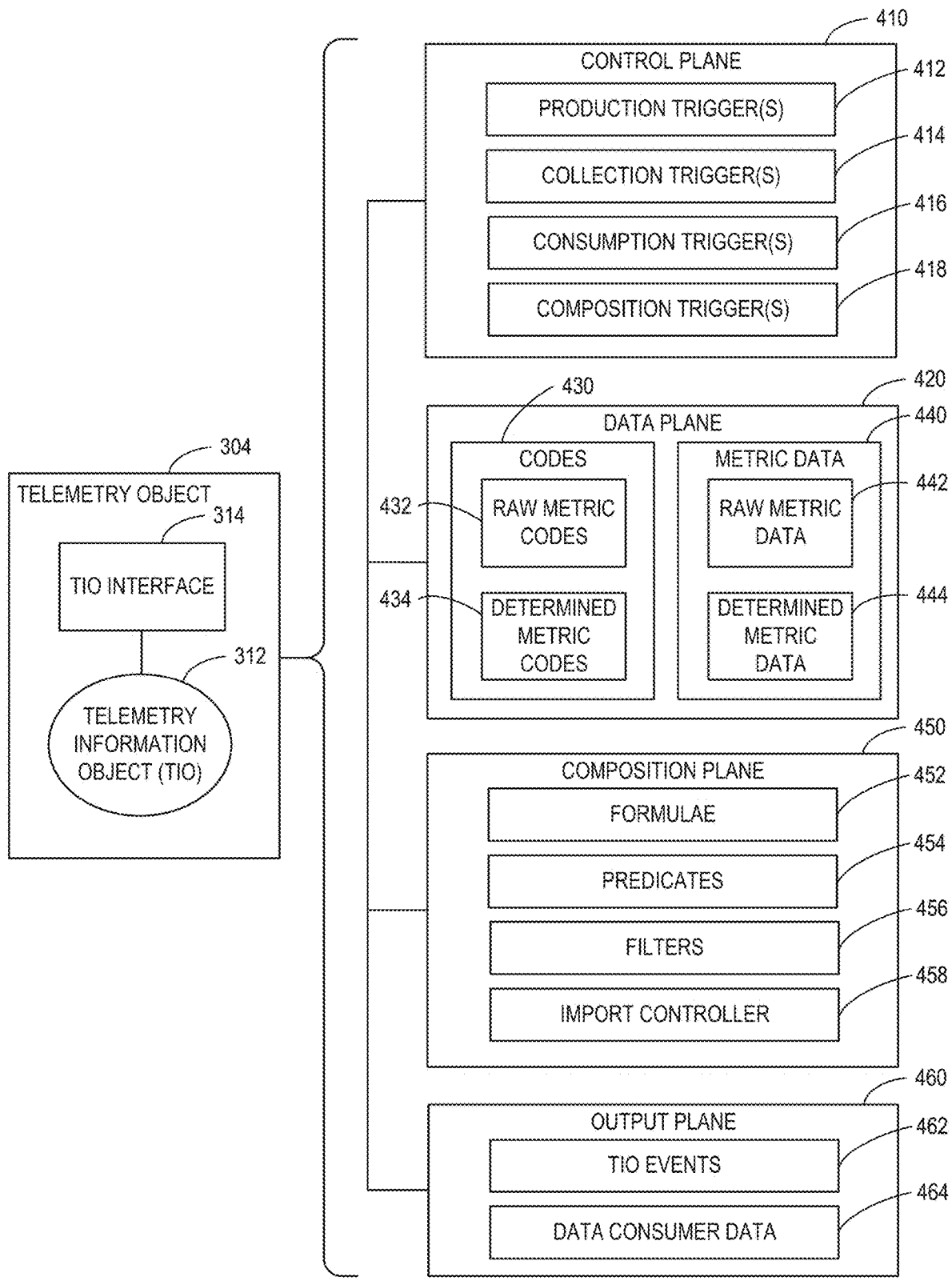
FIG. 4 depicts a block diagram of the telemetry information object of FIG. 3.

FIG. 4 depicts a block diagram of the example telemetry object 304 of FIG. 3. In the illustrated example of FIG. 4, the telemetry object 304 is implemented by an example control plane 410, an example data plane 420, an example composition plane 450, and an example output plane 460. For example, the executable controller 250 of FIG. 2, and/or, more generally, the telemetry controller 130A-C (FIGS. 1 and 2), can generate the telemetry object 304 by generating the control plane 410, the data plane 420, the composition plane 450, and the output plane 460. In such examples, the executable controller 250 can generate the executable(s) 137, 147 of FIG. 1 by compiling machine-readable instructions that, when executed, implement the control plane 410, the data plane 420, the composition plane 450, and the output plane 460, and/or, more generally, the telemetry object 304, which is included in the composition(s) 146, 156 of FIG. 1.

In the illustrated example of FIG. 4, the telemetry object 304 includes the control plane 410 to control scheduling of telemetry aggregation and/or collection operations. For example, the control plane 410 of the telemetry object 304 can obtain telemetry data of interest in response to one or more example triggers 412, 414, 416, 418. For example, the triggers 412, 414, 416, 418 can control a type of telemetry data to be collected and/or a time period during which to collect the telemetry data. In FIG. 4, the triggers 412, 414, 416, 418 include example production trigger(s) 412, example collection trigger(s) 414, example consumption trigger(s) 416, and example composition trigger(s) 418.

In the illustrated example of FIG. 4, the control plane 410 includes the production trigger(s) 412 to instruct the telemetry object 304 to transmit and/or otherwise make available telemetry data for a data consumer, such as one or more of the endpoint devices 160, 165, 170, 175, 180, 185 of FIG. 1, one or more of the servers 112, 114, 116 of FIG. 1, etc. The example production trigger(s) 412 can be asynchronous or synchronous. For example, the production trigger(s) 412 can include a first production trigger that, when invoked, can transmit telemetry data upon the invoking. In other examples, the production trigger(s) 412 can include a second production trigger that, when invoked, can transmit telemetry data every minute, hour, day, etc. For example, the second production trigger can correspond to a timer. In such examples, in response to executing a first one of the production triggers 412, the telemetry object 304 can transmit telemetry data every minute to the first endpoint device 160 of FIG. 1.

In the illustrated example of FIG. 4, the control plane 410 includes the collection trigger(s) 414 to aggregate and/or collect telemetry data. The example collection trigger(s) 414 can be asynchronous or synchronous. For example, the collection trigger(s) 414 can include a first collection trigger that, when invoked, can invoke the TIO 312 to obtain telemetry data from the resource 310 of FIG. 3 via the resource object 302 of FIG. 3. In other examples, the collection trigger(s) 414 can include a second collection trigger that, when invoked, can collect telemetry data every minute, hour, day, etc. For example, in response to executing a first one of the collection triggers 414, the telemetry object 304 can obtain telemetry data every minute from the resource 310 via the RIO 306 of FIG. 3.

In the illustrated example of FIG. 4, the control plane 410 includes the consumption trigger(s) 416 to collect a class or type of telemetry data based on a temporal parameter. In some examples, the consumption trigger(s) 416, when invoked, collect telemetry data in response to one or more conditions being satisfied. For example, in response to invoking a first one of the consumption triggers 416, the TIO 312 can query the RIO 306 for data stored in a first memory register after the TIO 312 has been notified that the data has been stored in the first memory register. In such examples, the TIO 312 can obtain the data after the data has been computed by a different resource (e.g., a different resource than the resource 310).

In the illustrated example of FIG. 4, the control plane 410 includes the composition trigger(s) 418 to collect derived, calculated, and/or otherwise determined telemetry data. In some examples, the telemetry object 304 obtains measured telemetry data representative of data (e.g., raw or unprocessed data) obtained (e.g., directly obtained) from a hardware counter, a software counter, a memory register, etc. In some examples, the telemetry object 304 obtains calculated or determined telemetry data representative of data that is calculated based on the measured telemetry data. For example, the determined telemetry data can be generated by executing an algorithm on first data obtained from a hardware counter to generate second data, where the second data is determined based on the first data. For example, the measured telemetry data can be raw counts, and the determined telemetry data can be an average or a moving average of those counts. In such examples, the determined telemetry data is not directly observable and/or measurable from the resource 310 of FIG. 3. Accordingly, the example composition trigger(s) 418, when invoked, can instruct the telemetry object 304 to obtain the calculated or determined telemetry data of interest.

In the illustrated example of FIG. 4, the telemetry object 304 includes the data plane 420 to control and/or otherwise facilitate the storage of telemetry data for access by a data consumer. In example FIG. 4, the data plane 420 includes example codes 430 corresponding to identifiers of performance metrics. In example FIG. 4, the data plane 420 includes example performance metric data (METRIC DATA) 440 corresponding to values of the performance metrics. For example, the codes 430 can identify each performance metric by a specific code, identifier, etc., and the performance metric data 440 can include the performance metric data, values of the performance metric, etc. In such examples, the codes 430 can include a first code that identifies a first performance metric for the resource 310 of FIG. 3, and the performance metric data 440 can include a value for the first performance metric, where the first performance metric is identified by the first code. In other examples, the performance metric data 440 can be register or memory locations to store the values of the corresponding performance metrics. For example, the performance metric data 440 can include pointers (e.g., data pointers, performance metric pointers, etc.), data locations (e.g., performance metric locations, performance metric data locations, etc.), etc.

In the illustrated example of FIG. 4, the codes 430 include example raw performance metric codes (RAW METRIC CODES) 432 and example determined performance metric codes (DETERMINED METRIC CODES) 434. In example FIG. 4, the raw performance metric codes 432 include one or more codes, identifiers, values, etc., representative of performance metrics that are measured, retrieved, and/or otherwise obtained from a hardware counter, a software counter, a memory location, a register location, etc., associated with the resource 310 of FIG. 3. In example FIG. 4, the determined performance metric codes 434 include one or more codes, identifiers, values, etc., representative of performance metrics that are determined based on one or more of the measured performance metrics.

In the illustrated example of FIG. 4, the performance metric data 440 includes example raw performance metric data (RAW METRIC DATA) 442 and determined performance metric data (DETERMINED METRIC DATA) 444. For example, the raw performance metric data 442, the determined performance metric data 444, and/or, more generally, the performance metric data 440, can correspond to the first, second, and/or third telemetry data 136A-C of FIG. 1 and/or portion(s) thereof.

In the illustrated example of FIG. 4, the raw performance metric data 442 includes data or values of one or more performance metrics that are measured, retrieved, and/or otherwise obtained from a hardware counter, a software counter, a memory location, a register location, etc., associated with the resource 310 of FIG. 3. For example, a first data or memory location in the raw performance metric data 442 can correspond to and/or otherwise be identified by a first code of the raw performance metric codes 432. In such examples, a second data or memory location in the determined performance metric data 444 can correspond to and/or otherwise be identified by a second code of the determined performance metric codes 434.

In the illustrated example of FIG. 4, the determined performance metric data 444 includes data or values of performance metrics that are determined based on one or more measured performance metric values included in the raw performance metric data 442. In example operation, the data plane 420 can identify one or more performance metrics of interest to obtain and/or determine based on information included in the TIO 312 of FIG. 3. In such examples, the data plane 420 can generate the raw performance metric codes 432 and/or the determined performance metric codes 434 based on a definition, an online or publicly available telemetry dictionary, a product design document, a specification (e.g., a formal specification), a requirement, etc., used to generate and/or otherwise instantiate the telemetry object 304.

In the illustrated example of FIG. 4, the telemetry object 304 includes the composition plane 450 to generate, calculate, and/or otherwise determine the determined performance metric data 444 for access by a data consumer. In FIG. 4, the composition plane 450 includes example formulae 452, example predicates 454, example filters 456, and an example import controller 458.

In the illustrated example of FIG. 4, the formulae 452 include, correspond to, and/or otherwise are representative of algorithms, formulas, mathematical operations, etc., that may be executed, performed, and/or otherwise applied to the raw performance metric data 442. In example FIG. 4, the predicates 454 include, correspond to, and/or otherwise is representative of conditional operations that can be executed on the raw performance metric data 442 prior to and/or after invoking the formulae 452. For example, the predicates 454 can include a condition, such as a saturation operation, a thresholding operation, an event condition, etc., that, when met or satisfied, invokes the formulae 452. In such examples, in response to a first condition of the predicates 454 being satisfied, a first value of the raw performance metric data 442 can be fed into a first algorithm of the formulae 452 to generate a value of the determined performance metric data 444.

In the illustrated example of FIG. 4, the filters 456 include, correspond to, and/or otherwise are representative of one or more filters that can be used to determine when to store new performance metric values in the determined performance metric data 444. For example, a first one of the filters 456 can exclude and/or otherwise prevent a new determined performance metric data value from being stored because the new value is below a filter threshold, above a filter threshold, does not equal a filter threshold, etc. In such examples, the filters 456 can be representative of additional conditional operations that, when invoked, can reduce and/or otherwise prevent extraneous or redundant performance metric data from being stored and/or transmitted to a data consumer.

In the illustrated example of FIG. 4, the composition plane 450 includes the import controller 458 to access performance metric data from a different telemetry object 304. In some examples, the import controller 458 of the telemetry object 304 can transmit a request to a different TIO interface 314 of a different telemetry object 304 corresponding to a different one of the resources 310 to access performance metric data of interest. In such examples, the import controller 458 can transmit the accessed performance metric data to at least one of the formulae 452, the predicates 454, or the filters 456 to generate the determined performance metric data 444. In some examples, the import controller 458 of the telemetry object 304 corresponding to the resource 310 can transmit a request to a different TIO interface 314 of a different telemetry object 304 corresponding to the same resource 310 to access a different performance metric data of interest.

In the illustrated example of FIG. 4, the telemetry object 304 includes the output plane 460 to aggregate, compile, and/or otherwise prepare telemetry data, such as the performance metric data 440, for access or retrieval by a data consumer. In some examples, the output plane 460 transmits one or more portions of the performance metric data 440 to a data consumer. In some examples, the output plane 460 can enable a data consumer can retrieve the one or more portions of the performance metric data 440 by invoking an API, accessing a web server, etc., instantiated and/or otherwise managed by the output plane 460. In FIG. 4, the output plane 460 includes example TIO events 462 and example data consumer data 464.

In the illustrated example of FIG. 4, the TIO events 462 include, correspond to, and/or otherwise are representative of alerts, indications, etc., generated by a data consumer or the telemetry object 304 that the data consumer data 464 is ready or available for access. In some examples, in response to generating a first one of the TIO events 462, a data message (e.g., an HTTP message, a V2X message, etc.) can be transmitted to a data consumer to alert the data consumer that the data consumer data 464 requested by the data consumer is ready for access, retrieval, etc. In some examples, the data consumer can transmit a request for the data consumer data 464. In such examples, the output plane 460 can generate a second one of the TIO events 462 based on the request. In response to the second one of the TIO events 462 being generated, the example telemetry object 304 can generate telemetry data requested by the data consumer for storage in the data consumer data 464. In example FIG. 4, the data consumer data 464 includes, corresponds to, and/or otherwise is representative of telemetry data generated by the resource model 300 of FIG. 3 that can be transmitted to and/or otherwise accessed by a data consumer. The example data consumer data 464 can include one or more portions of the raw performance metric data 442, the determined performance metric data 444, and/or, more generally, the performance metric data 440.

In some examples, at least one of the control plane 410, the data plane 420, the composition plane 450, or the output plane 460 can implement and/or otherwise correspond to cache or memory logic of the resource(s) 149, 159, and/or, more generally, the edge services 140, 150, that, when executed, can facilitate the collection and transmission of telemetry data. For example, at least one of the control plane 410, the data plane 420, the composition plane 450, or the output plane 460 can be in circuit with cache or memory (e.g., cache or memory included in the resource(s) 149, 159, the edge service(s) 140, 150, etc.). For example, the telemetry object 304 can expose or instantiate a new interface (e.g., the TIO interface 314) to a software stack of the resource 310 that can be used to notify the TIO 312 that a performance metric represented by a particular Process Address Space ID (PASID). The new PASID can be tracked by the cache logic. For example, the resource 310 can query the TIO interface 314 to determine how long the data associated with the performance metric has to be stored in cache. In such examples, after a time specified by the TIO interface 314 has expired, all the data related to the performance metric can be evicted or removed from the cache. Advantageously, the software stack can invoke the TIO interface 314 to (1) discover and enumerate how many objects (e.g., TIO 312 and/or, more generally, the telemetry object 304) have been stored in the cache, where each of the objects can be represented with a unique PASID, and/or (2) access an object of interest by providing the PASID and an identifier of the object.

In example operation, the first telemetry data 136A of FIG. 1 can include a first portion (e.g., a first telemetry data portion, a first portion of the first telemetry data 136A, etc.) that includes a first performance metric, a second portion that includes a second performance metric, and a third portion that includes a third performance metric. The example data plane 420, and/or, more generally, the telemetry object 304, can determine a first performance metric code based on the first performance metric, a second performance metric code based on the second performance metric, and a third performance metric code based on the third performance metric. The first performance code and the second performance metric code can be stored in the raw performance metric codes 432 and the third performance metric code can be stored in the determined performance metric codes 434.

In example operation, in response to invoking a trigger (e.g., one of the production trigger(s) 412, one of the collection trigger(s) 414, one of the consumption trigger(s) 416, one of the composition trigger(s) 418, etc.) indicative of the first performance metric and the second performance metric being generated (e.g., being stored in the raw performance metric data 442), the data plane 420 can (1) map the first performance metric code to a first memory location in the raw performance metric data 442 storing the first performance metric and (2) map the second performance metric code to a second memory location in the raw performance metric data 442 storing the second performance metric. In example operation, the data plane 420 can determine the third performance metric based on the first performance metric and the second performance metric. In example operation, in response to mapping the third performance metric code to a third memory location located in the determined performance metric data 444, the data plane 420 can store the third performance metric at the third memory location. In example operation, the output plane 460 can generate one of the TIO events 462 indicative of the third performance metric being determined. In example operation, the output plane 460 can obtain the third performance metric from the third memory location and identify the third performance metric as the data consumer data 464 and/or store the third performance metric as the data consumer data 464.

Figure 5A:
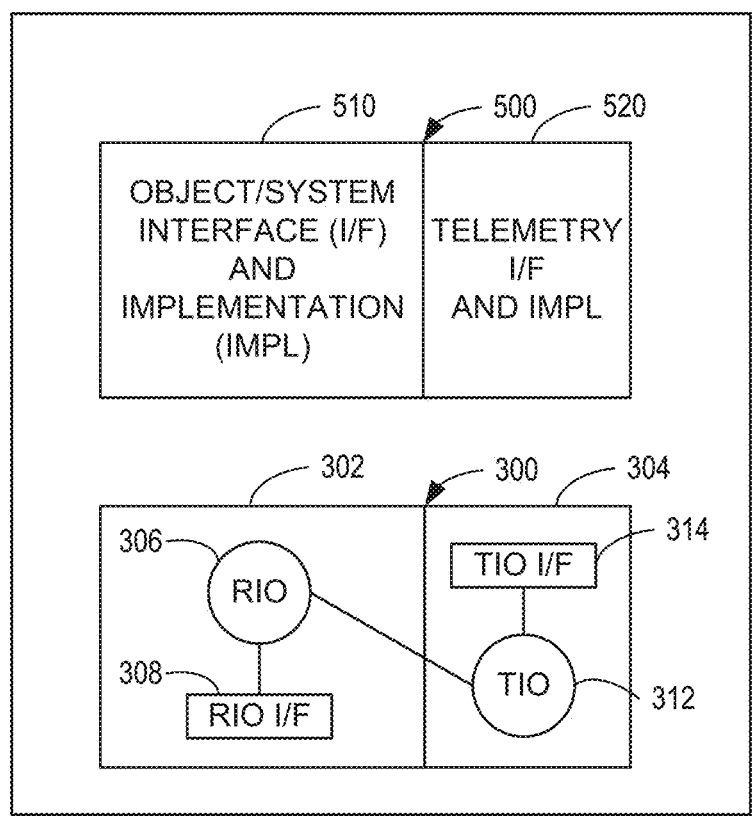
FIGS. 5A-5E depict example relationships of the resource object of FIG. 3 and the telemetry object of FIGS. 3 and/or 4.

FIG. 5A depicts another example implementation of the resource model 300 of FIG. 3. In FIG. 5A, an example resource model 500 includes an example resource object/system 510 corresponding to an object/system interface (I/F) and implementation (IMPL) of the resource 310 of FIG. 3, the resource(s) 149, 159 of FIG. 1, etc., and an example telemetry object/system 520 corresponding to a telemetry interface and implementation of an interface of the resource 310, the resource(s) 149, 159, etc. In FIG. 5A, the resource object/system 510 can correspond to an object, such as the resource object 302 of FIG. 3, or a system of objects including the resource object 302. In example FIG. 5A, the object/system implementation portion of the resource object/system 510 can correspond to the RIO 306 of FIG. 3, and the object/system interface portion of the resource object/system 510 can correspond to the RIO interface 308 of FIG. 5A.

In the illustrated example of FIG. 5A, the telemetry object/system 520 can correspond to an object, such as the TIO 312 of FIG. 3, or a system of objects including the TIO 312. In FIG. 5A, the telemetry implementation portion of the telemetry object/system 520 can correspond to the TIO 312 of FIG. 3 and the telemetry interface portion of the telemetry object/system 520 can correspond to the TIO interface 314 of FIG. 3.

Figure 5B:
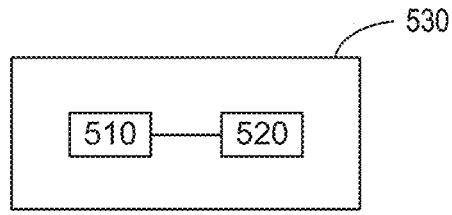

In the illustrated example of FIG. 5A, the relationship between the resource object/system 510 and the telemetry object/system 520 is not depicted as being equal and/or otherwise not strictly one-to-one. For example, the resource object/system 510 can correspond to a virtualization of two or more performance metrics and corresponding interfaces to obtain and/or otherwise invoke the generation of the two or more performance metrics. In such examples, the telemetry object/system 520 can correspond to a virtualization of an interface to obtain the two or more performance metrics from the resource object/system 510. Alternatively, as depicted in the illustrated example of FIG. 5B, a first example relationship 530 between the resource object/system 510 and the telemetry object/system 520 can be one-to-one. For example, the resource object/system 510 can be representative of one performance metric and the telemetry object/system 520 can be representative of one interface to obtain the one performance metric.

Figure 5C:
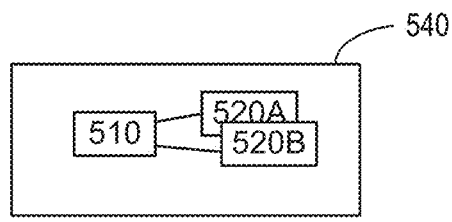

In some examples, the resource model 500 of FIG. 5A can be a computer-readable model of and/or otherwise representative of a complex object or an object including a plurality of functions or having a plurality of performance metrics, such as a CPU, which can have many different performance metrics available to the CPU. Advantageously, the resource object/system 510 can be representative of the different performance metrics available to the CPU while the telemetry object/system 520 can be representative of an interface to obtain the different performance metrics. For example, it can be advantageous to group the different performance metrics into multiple different groups or multiple different TIOs and corresponding TIO interfaces as depicted in a second example relationship 540 illustrated in the example of FIG. 5C. In FIG. 5C, a single object (e.g., one of the resource object/system 510), such as a CPU, can include a RIO 306 defining multiple performance metrics where each of the performance metrics can have a different TIO and corresponding TIO interface (e.g., multiple ones of the telemetry object/system 520).

Figure 5D:
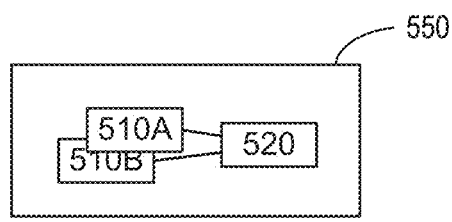
Figure 5E:
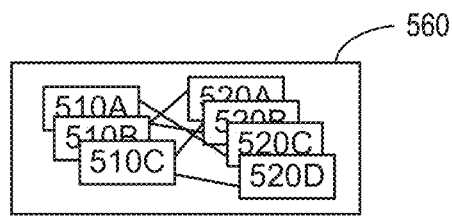

In some examples, a single resource, such as a multi-core CPU, can have a particular TIO group (e.g., a group that describes available PCI-e bandwidth from the multi-core CPU) that can be applied to all cores of the multi-core CPU when taken together. A third example relationship 550 as depicted in the illustrated example of FIG. 5D can correspond to such examples. For example, in FIG. 5D, a first performance metric associated with a first core of the multi-core CPU can correspond to a first one 510A of the resource object/system 510 and a second performance metric associated with a second core of the multi-core CPU can correspond to a second one 510B of the resource object/system 510. In example FIG. 5D, the telemetry object/system 520 can be representative of a TIO object and correspond interface to obtain the first and second performance metrics and determine a third performance metric based on the first and second performance metrics. In some examples, as depicted by a fourth example relationship 560 in the illustrated example of FIG. 5E, a performance metric can have a relationship with one or more telemetry objects and corresponding interfaces.

Figure 6A:
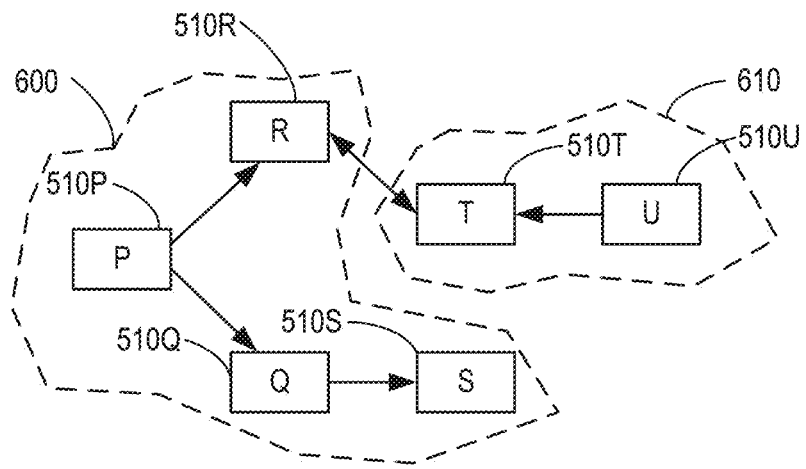
FIGS. 6A-6C are schematic illustrations of example resource compositions.
Figure 6B:
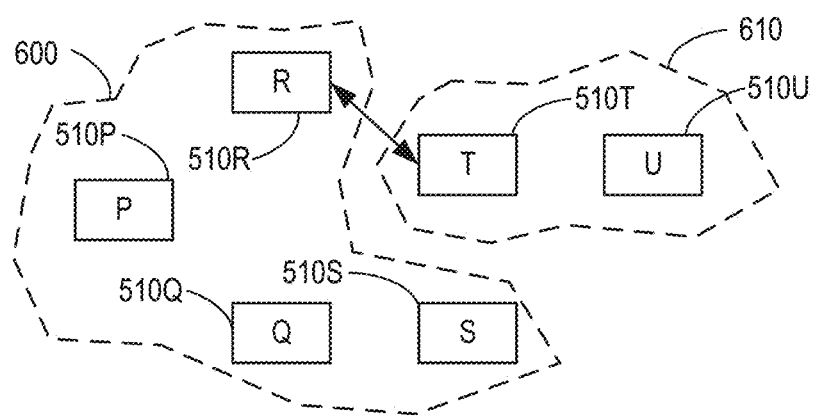
Figure 6C:
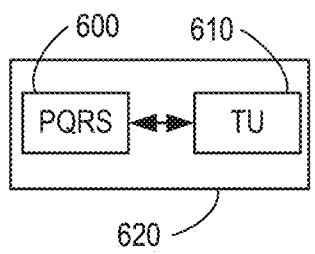

FIGS. 6A-6C are schematic illustrations of example resource compositions 600, 610, 620 including a first example resource composition 600, a second example resource composition 610, and a third example resource composition 620. For example, the composition generator 238, and/or, more generally, the composition controller 230 of FIG. 2, can generate at least one of the first resource composition 600, the second resource composition 610, or the third resource composition 620. In such examples, the composition generator 238 can generate the resource compositions 600, 610, 620 by linking and/or otherwise assigning resource objects/systems based on dependencies (e.g., internal dependencies) with each other. In FIGS. 6A-6C, the resource compositions 600, 610, 620 can be telemetry models that, when executed, can generate telemetry data based on underlying one(s) of resource(s) executing one or more computing tasks.

In the illustrated example of FIG. 6A, the resource compositions 600, 610, 620 include a mix of acyclic and cyclic subgraphs. In FIG. 6A, the first resource composition 600 includes first example resource objects/systems 510P, 510Q, 510R, 510S corresponding to implementations of the resource object/system 510 of FIG. 5A. In FIG. 6A, the second resource composition 610 includes second example resource objects/systems 510T, 510U corresponding to implementations of the resource object/system 510 of FIG. 5A.

In the illustrated example of FIG. 6A, the first resource objects/systems 510P, 510Q, 510R, 510S include a first example resource object/system 510P that is representative of a resource object or a system of resource objects. For example, the composition generator 238 can determine that the first resource object/system 510P is not dependent on a different resource object/system. In FIG. 6A, the first resource object/system 510P has two subordinate resource objects/systems including a second example resource object/system 510Q and a third example resource object/system 510R. In FIG. 6A, the first resource composition 600 includes a fourth example resource object/system 510S, which is a subordinate of the second resource object/system 510Q.

In the illustrated example of FIG. 6A, the composition generator 238 can generate the first resource composition 600 by linking and/or otherwise assigning resource object/systems to different one(s) of the resource object/systems based on dependencies with each other. For example, the composition generator 238 can link and/or otherwise assign the second resource object/system 510Q and the third resource object/system 510R to the first resource object/system 510P based on the dependencies of the second and third resource object/systems 510Q, 510R on the first object/system 510P.

As used herein, a subordinate resource object/system (e.g., a subordinate resource object, a subordinate resource system, etc.) refers to a resource object and/or system that operates under the control, direction, or tight coupling with another resource object and/or system of which it is subordinate. For example, to requestors or subscribers of service from the first resource object/system 510P, the overall performance of the first resource composition 600 is dependent to varying degrees on the performance of subcomponents (e.g., the second through fourth resource objects/systems 510Q, 510R, 510S) of the first resource object/system 510P.

In the illustrated example of FIG. 6A, the second resource objects/systems 510T, 510U of the second resource composition 610 includes a fifth example resource object/system 510T, which is a subordinate of a sixth example resource object/system 510U. For example, the composition generator 238 can link and/or otherwise assign the fifth resource object/system 510T to the sixth resource object/system 510U in response to determining that the fifth resource object/system 510T depends on the sixth resource object/system 510U.

In the illustrated example of FIG. 6A, the first resource composition 600 is coupled to the second resource composition 610. For example, the third resource object/system 510R of the first resource composition 600 can be peer-to-peer coupled to the fifth resource object/system 510T of the second resource composition 610. In such examples, the peer-to-peer coupling of the third resource object/system 510R and the fifth resource object/system 510T causes resource composite objects/systems (e.g., a resource object, a system, etc., of the resource compositions 600, 610) subordinate under the first resource object/system 510P and the sixth resource object/system 510U to be peer-to-peer coupled, as illustrated in the example of FIG. 6B.

In the illustrated example of FIG. 6B, the internal relationships of each resource composite object/system (as depicted in FIG. 6A) are not shown, and a requester or subscriber to service of the first and second resource compositions 600, 610 can rely upon the functioning of each of the resource compositions 600, 610 rather than the functioning of underlying resource composite objects/systems.

For example, FIGS. 6A and/or 6B can be representative of a computer-readable model of an inter-socket link, or an ultra-path interconnect (UPI) in a multi-socket CPU. In such examples, the first resource composition 600 can be a computer-readable model and/or otherwise representative of a first core of a multi-core CPU and the second resource composition 610 can be a computer-readable model and/or otherwise representative of a second core of the multi-core CPU. The third resource object/system 510R can correspond to a first socket of the first core and the sixth resource object/system 510T can correspond to a second socket of the second core. In such examples, the peer-to-peer coupling between the third resource object/system 510R and the sixth resource object/system 510T can correspond to the UPI link between the first and the second socket of the multi-core CPU. Advantageously, a requesting or subscribing service can obtain telemetry data from the different cores of the multi-core CPU by querying one or both resource compositions 600, 610 instead of querying an underlying resource object/system.

FIG. 6C is an example schematic illustration of the third resource composition 620, which includes the first resource composition 600 and the second resource composition 610. The third example resource composition 620 is a simplified view of the underlying resource compositions 600, 610. For example, the underlying combination of acyclic and cyclic subgraphs of the first resource composition 600 and the second resource composition 620 are replaced with a first resource composition "PQRS" corresponding to the first resource composition 600 and a second resource composition of "TU" corresponding to the second resource composition 610, where the first resource composition and the second resource composition are peer-to-peer coupled. Advantageously, a requester or subscriber of service can obtain telemetry data at the example composition layer 322 of FIG. 3 instead of the atomic resource layer 324 of FIG. 3 by requesting telemetry data from the third resource composition 620 instead of underlying resource object(s) and/or system(s).

Figure 7A:
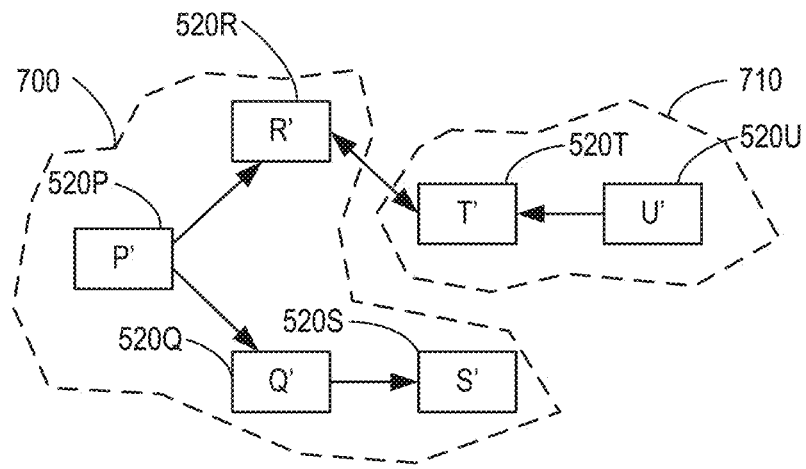
FIGS. 7A-7C are schematic illustrations of example telemetry compositions.
Figure 7B:
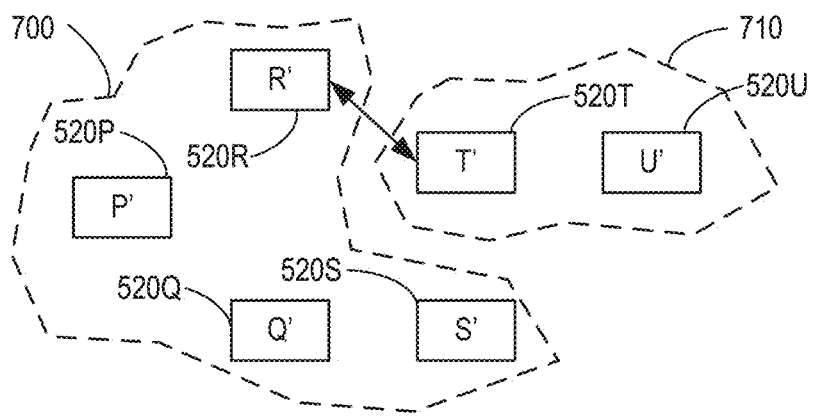
Figure 7C:
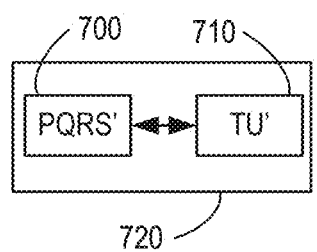

FIGS. 7A-7C are schematic illustrations of example telemetry compositions 700, 710, 720 including a first example telemetry composition 700, a second example telemetry composition 710, and a third example telemetry composition 720. For example, the composition generator 238, and/or, more generally, the composition controller 230 of FIG. 2, can generate at least one of the first telemetry composition 700, the second telemetry composition 710, or the third telemetry composition 720. In such examples, the composition generator 238 can generate the telemetry compositions 700, 710, 720 by linking and/or otherwise assigning telemetry objects/systems based on dependencies (e.g., internal dependencies) with each other.

In the illustrated example of FIG. 7A, the telemetry compositions 700, 710, 720 include a mix of acyclic and cyclic subgraphs. In FIG. 7A, the first telemetry composition 700 includes first example telemetry objects/systems 520P, 520Q, 520R, 520S corresponding to implementations of the telemetry object/system 520 of FIG. 5A. In FIG. 7A, the second telemetry composition 610 includes second example telemetry object/systems 520T, 520U corresponding to implementations of the telemetry object/system 520 of FIG. 5A.

In the illustrated example of FIG. 7A, the telemetry compositions 700, 710, 720 are composed based on the resource compositions 600, 610, 620 of FIGS. 6A-6C. For example, the telemetry compositions 700, 710, 720 can be adjusted, altered, etc., in response to a change of the resource compositions 600, 610, 620. In such examples, in response to one(s) of the resource(s) 149, 159 of FIG. 1 going offline or coming online, the composition generator 238 can generate updated one(s) of the resource compositions 600, 610, 620. Advantageously, the example composition generator 238 can generate updated one(s) of the telemetry compositions 700, 710, 720 to scale up or scale down telemetry aggregation operations in connection with change(s) in the resource(s) 149, 159.

In the illustrated example of FIG. 7A, the first telemetry objects/systems 520P, 520Q, 520R, 520S include a first example telemetry object/system 520P that is representative of a telemetry object or a system of telemetry objects. For example, the composition generator 238 can determine that the first telemetry object/system 520P is not dependent on a different telemetry object/system based on the first resource object/system 510P not being dependent on a different resource object/system as illustrated in FIGS. 6A-6B. In FIG. 7A, the first telemetry object/system 520P has two subordinate telemetry objects/systems including a second example telemetry object/system 520Q and a third example telemetry object/system 520R. In FIG. 7A, the first telemetry composition 700 includes a fourth example telemetry object/system 520S, which is a subordinate of the second telemetry object/system 520Q.

In the illustrated example of FIG. 7A, the composition generator 238 can generate the first telemetry composition 700 by linking and/or otherwise assigning telemetry object/systems to different one(s) of the telemetry object/systems based on dependencies with each other. For example, the composition generator 238 can link and/or otherwise assign the second telemetry object/system 520Q and the third telemetry object/system 520R to the first telemetry object/system 520P based on the dependencies of the second and third resource object/systems 510Q, 510R on the first object/system 510P as illustrated in FIGS. 6A-6B.

As used herein, a subordinate telemetry object/system (e.g., a subordinate telemetry object, a subordinate telemetry system, etc.) can refer to a telemetry object and/or system that operates under the control, direction, or tight coupling with another telemetry object and/or system to which it is subordinate. For example, to requestors or subscribers of service from the first telemetry object/system 520P, telemetry data associated with the overall performance of the first resource composition 600 of FIGS. 6A-6C is dependent to varying degrees on the performance of subcomponents (e.g., the second through fourth resource objects/systems 510Q, 510R, 510S) of the first resource object/system 510P and can be obtained from the first telemetry composition 700.

In the illustrated example of FIG. 7A, the second telemetry objects/systems 520T, 520U of the second telemetry composition 710 includes a fifth example telemetry object/system 520T, which is a subordinate of a sixth example telemetry object/system 520U. For example, the composition generator 238 can link and/or otherwise assign the fifth telemetry object/system 520T to the sixth telemetry object/system 520U in response to determining that the fifth resource object/system 510T depends on the sixth resource object/system 510U as illustrated in FIGS. 6A-6B.

In the illustrated example of FIG. 7A, the first telemetry composition 700 is coupled to the second telemetry composition 710 based on the first resource composition 600 of FIGS. 6A-6C being coupled to the second resource composition 610 of FIGS. 6A-6C. For example, the third telemetry object/system 520R of the first telemetry composition 700 can be peer-to-peer coupled to the fifth telemetry object/system 520T of the second telemetry composition 710. In such examples, the peer-to-peer coupling of the third telemetry object/system 520R and the fifth telemetry object/system 520T causes telemetry composite objects/systems (e.g., an object, a system, etc., of the telemetry compositions 700, 710) subordinate under the first telemetry object/system 520P and the sixth telemetry object/system 520U to be peer-to-peer coupled, as illustrated in the example of FIG. 7B.

In the illustrated example of FIG. 7B, the internal relationships of each telemetry composite object/system (as depicted in FIG. 7A) are not shown, and a requester or subscriber to service of the first and second telemetry compositions 700, 710 can rely upon the functioning of each of the telemetry compositions 700, 710 rather than the functioning of underlying telemetry composite objects/systems.

FIG. 7C is a schematic illustration of the third telemetry composition 720, which includes the first telemetry composition 700 and the second telemetry composition 710. The third example telemetry composition 720 is a simplified view of the underlying telemetry compositions 700, 710. For example, the underlying combination of acyclic and cyclic subgraphs of the first telemetry composition 700 and the second telemetry composition 720 are replaced with a first telemetry composition "PQRS" corresponding to the first telemetry composition 700 and a second telemetry composition of "TU" corresponding to the second telemetry composition 710, where the first telemetry composition and the second telemetry composition are peer-to-peer coupled. Advantageously, a requester or subscriber of service can obtain telemetry data at the example composition layer 322 of FIG. 3 instead of the atomic resource layer 324 of FIG. 3 by requesting telemetry data from the third telemetry composition 720 instead of underlying telemetry object(s) and/or system(s).

Flowcharts representative of example hardware logic, machine readable instructions, hardware implemented state machines, and/or any combination thereof for implementing the example composition(s) 146, 156, and/or, more generally, the example executables 137, 149 of FIG. 1, and/or the example telemetry controller 130A-C of FIGS. 1-2 is shown in FIGS. 8-12. The machine readable instructions may be one or more executable programs or portion(s) of an executable program for execution by a computer processor such as the processor 1312 shown in the example processor platform 1300 discussed below in connection with FIG. 13 and/or the processor 1412 shown in the example processor platform 1400 discussed below in connection with FIG. 14. The program may be embodied in software stored on a non-transitory computer readable storage medium such as a CD-ROM, a floppy disk, a hard drive, a DVD, a Blu-ray disk, or a memory associated with the processor 1312 of FIG. 13 and/or the processor 1412 of FIG. 14, but the entire program and/or parts thereof could alternatively be executed by a device other than the processor 1312 of FIG. 13 and/or the processor 1412 of FIG. 14 and/or embodied in firmware or dedicated hardware. Further, although the example program is described with reference to the flowcharts illustrated in FIGS. 8-12, many other methods of implementing the example composition(s) 146, 156, and/or, more generally, the example executables 137, 149, and/or the example telemetry controller 130A-C may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc., in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 8-12 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 8:
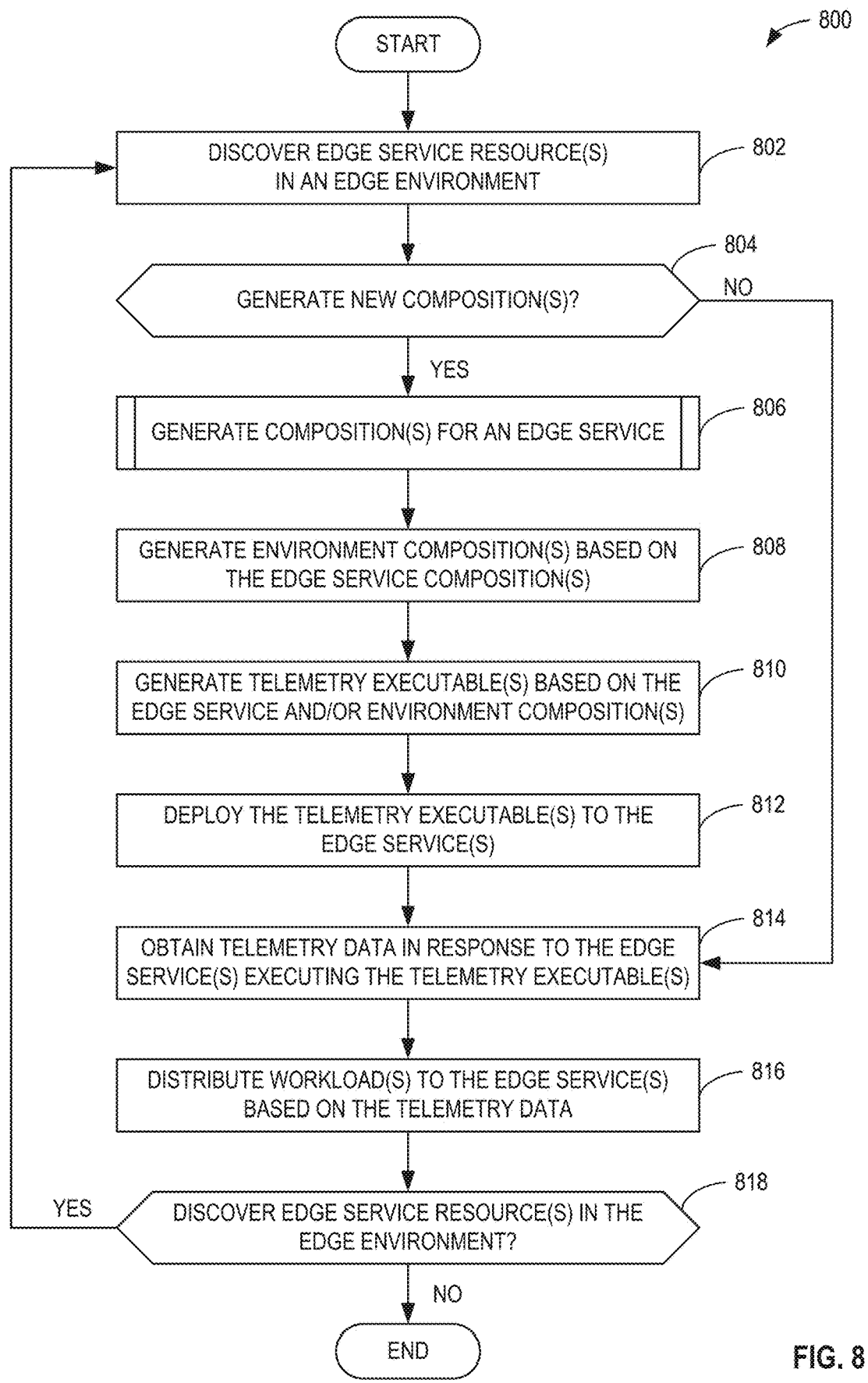
FIG. 8 is a flowchart representative of example machine readable instructions that may be executed to implement the example telemetry controller of FIGS. 1 and/or 2 to distribute computing tasks to example edge service(s) based on telemetry data.

FIG. 8 is a flowchart representative of example machine readable instructions 800 that may be executed to implement the example telemetry controller 130A-C of FIGS. 1 and/or 2 to distribute computing tasks to the first edge service 140 and/or the second edge service 150 based on the telemetry data 136A-C of FIG. 1. The example machine readable instructions 800 of FIG. 8 begin at block 802, at which the telemetry controller 130A-C discovers edge service resource(s) in an edge environment. For example, the resource query controller 220 (FIG. 2) can query the first edge service 140 of FIG. 1. In such examples, the resource query controller 220 can identify the resource(s) 149 (FIG. 1) of the first edge service 140 based on the query.

At block 804, the example telemetry controller 130A-C determines whether to generate new composition(s). For example, the composition controller 230 (FIG. 2) can determine that one of the resource(s) 149 came online and is not included in the first resource composition 600. In such examples, the composition controller 230 can determine that a new composition is to be generated based on the discovered one of the resource(s) 149.

If, at block 804, the example telemetry controller 130A-C determines not to generate new composition(s), control proceeds to block 814 to obtain telemetry data in response to the edge service(s) executing the telemetry executable(s). If, at block 804, the example telemetry controller 130A-C determines to generate new composition(s), then, at block 806, the telemetry controller 130A-C generates composition(s) for an edge service. For example, the composition controller 230 can generate the first composition(s) 146 (FIG. 1) by generating a resource object, a telemetry object, etc., based on the discovered one of the resource(s) 149. Example instructions that may be executed to implement block 806 are described below in connection with FIG. 9.

At block 808, the example telemetry controller 130A-C generates environment composition(s) based on the edge service composition(s). For example, the composition controller 230 can generate a composition including, corresponding to, and/or otherwise associated with the composition(s) 146, 156 of the edge environment 110 of FIG. 1.

At block 810, the example telemetry controller 130A-C generates telemetry executable(s) based on the edge service and/or environment composition(s). For example, the executable controller 250 (FIG. 2) can compile the first executable 137 (FIG. 1) based on at least one of the first composition(s) 146 or the second composition(s) 156.

At block 812, the example telemetry controller 130A-C deploys the telemetry executable(s) to the edge service(s). For example, in response to the first telemetry controller 130A of the first server 112 (FIG. 1) generating the first executable 137, the first server 112 can transmit the first executable 137 to the first edge service 140. In other examples, in response to the second telemetry controller 130B of the first edge service 140 generating the first executable 137, the first edge service 140 can deploy the first executable 137 at the first edge service 140. For example, the first edge service 140 can load the first executable 137 into memory (e.g., volatile or non-volatile memory included in the resource(s) 149), the first ES database 148 of FIG. 1, etc., for execution by the first edge service 140.

At block 814, the example telemetry controller 130A-C obtains telemetry data in response to the edge service(s) executing the telemetry executable(s). For example, the second telemetry controller 130B of the first edge service 140 can obtain the first telemetry data 136A from the first composition(s) 146 and store the first telemetry data 136A in the first ES database 148. In other examples, the first telemetry controller 130A of one or more of the servers 110, 112, 114 can obtain the first telemetry data 136A from the first edge service 140 in response to the first edge service 140 executing the first composition(s) 146, and/or, more generally, the first executable 137.

At block 816, the example telemetry controller 130A-C distributes workload(s) to the edge service(s) based on the telemetry data. For example, the network interface 210 (FIG. 2) can obtain a workload from the first endpoint device 160. The example resource availability controller 240 (FIG. 2) can determine that one(s) of the resource(s) 149 of the first edge service 140 are available to execute the workload based on the first telemetry data 136A. The example resource availability controller 240 can distribute the workload to the first edge service 140 for execution. In response to the first example edge service 140 executing the workload, the first edge service 140 can transmit processed data, a result of the workload, etc., to the first endpoint device 160. In response to distributing the workload(s) to the edge service(s) based on the telemetry data at block 816, control proceeds to block 818 to determine whether to discover edge service resource(s) in the edge environment. For example, the resource query controller 220 can determine to execute another query operation to determine whether a new resource has become available, come online, etc., or whether a previously discovered resource is no longer available, went offline, etc. If, at block 818, the example telemetry controller 130A-C determines to discover edge service resource(s) in the edge environment, control returns to block 802, otherwise the example machine readable instructions 800 of FIG. 8 conclude.

Figure 9:
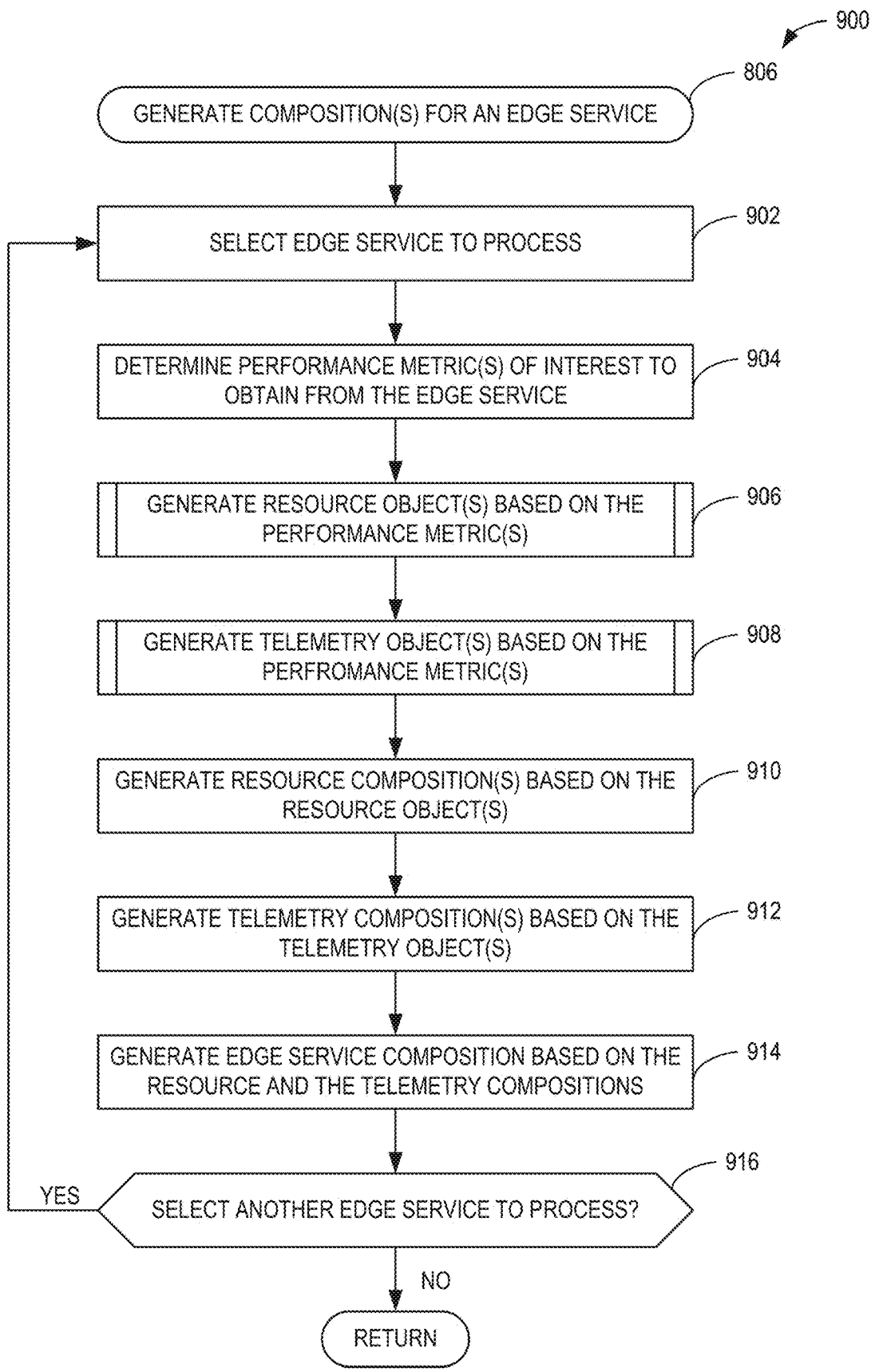
FIG. 9 is a flowchart representative of example machine readable instructions that may be executed to implement the example telemetry controller of FIGS. 1 and/or 2 to generate example composition(s) of an example edge service.

FIG. 9 is a flowchart representative of example machine readable instructions 900 that may be executed to implement the telemetry controller 130A-C of FIGS. 1 and/or 2 to generate composition(s) (e.g., the composition(s) 146, 156 of FIG. 1) for an edge service (e.g., the edge service(s) 140, 150 of FIG. 1). The example machine readable instructions 900 of FIG. 9 can be executed to implement block 806 of FIG. 8. The machine readable instructions 900 of FIG. 9 begin at block 902, at which the example telemetry controller 130A-C selects an edge service to process. For example, the composition controller 230 (FIG. 2) can select the first edge service 140 of FIG. 1 to process.

At block 904, the example telemetry controller 130A-C determines performance metric(s) of interest to obtain from the edge service. For example, the performance metric determiner 232 (FIG. 2) can determine that a first resource of the resource(s) 149 is a multi-core CPU. In such examples, the performance metric determiner 232 can map the multi-core CPU to a first performance metric, a second performance metric, a third performance metric, etc. For example, the first performance metric can be a measure of a quantity of instructions that a core of the multi-core CPU has executed.

At block 906, the example telemetry controller 130A-C generates resource object(s) based on the performance metric(s). For example, the object generator 234 (FIG. 2) can generate the resource object 302 of FIG. 3 based on the first performance metric. Example instructions that may be executed to implement block 906 are described below in connection with FIG. 10.

At block 908, the example telemetry controller 130A-C generates telemetry object(s) based on the performance metric(s). For example, the interface generator 236 (FIG. 2) can generate the telemetry object 304 of FIG. 3 based on the first performance metric. Example instructions that may be executed to implement block 908 are described below in connection with FIG. 11.

At block 910, the example telemetry controller 130A-C generates resource composition(s) based on the resource object(s). For example, the composition generator 238 (FIG. 2) can generate the first resource composition 600 of FIGS. 6A-6C based on the first resource object/systems 510P, 510Q, 510R, 510S of FIGS. 6A-6B. In such examples, the resource object 302 can correspond to one of the first resource object/systems 510P, 510Q, 510R, 510S of FIGS. 6A-6B.

At block 912, the example telemetry controller 130A-C generates telemetry composition(s) based on the telemetry object(s). For example, the composition generator 238 can generate the first telemetry composition 700 of FIGS. 7A-7C based on the first telemetry object/systems 520P, 520Q, 520R, 520S of FIGS. 7A-7B. In such examples, the telemetry object 304 can correspond to one of the first telemetry object/systems 520P, 520Q, 520R, 520S of FIGS. 7A-7B.

At block 914, the example telemetry controller 130A-C generates an edge service composition based on the resource and the telemetry compositions. For example, the composition generator 238 can generate the third resource composition 620 of FIG. 6C and the third telemetry composition 720 of FIG. 7C. In such examples, the composition generator 238 can generate the first composition(s) 146 of FIG. 1 based on at least one of the third resource composition 620 or the third telemetry composition 720. For example, the first composition(s) 146 can correspond to an edge service composition of the first edge service 140.

At block 916, the example telemetry controller 130A-C determines whether to select another edge service to process. For example, the composition controller 230 can determine whether to select the second edge service 150 of FIG. 2 to process. If, at block 916, the example telemetry controller 130A-C determines to select another edge service to process, control returns to block 902 to select another edge service to process. If, at block 916, the example telemetry controller 130A-C determines not to select another edge service to process, control returns to block 808 of the example machine readable instructions 800 of FIG. 8 to generate environment composition(s) based on the edge service composition(s).

Figure 10:
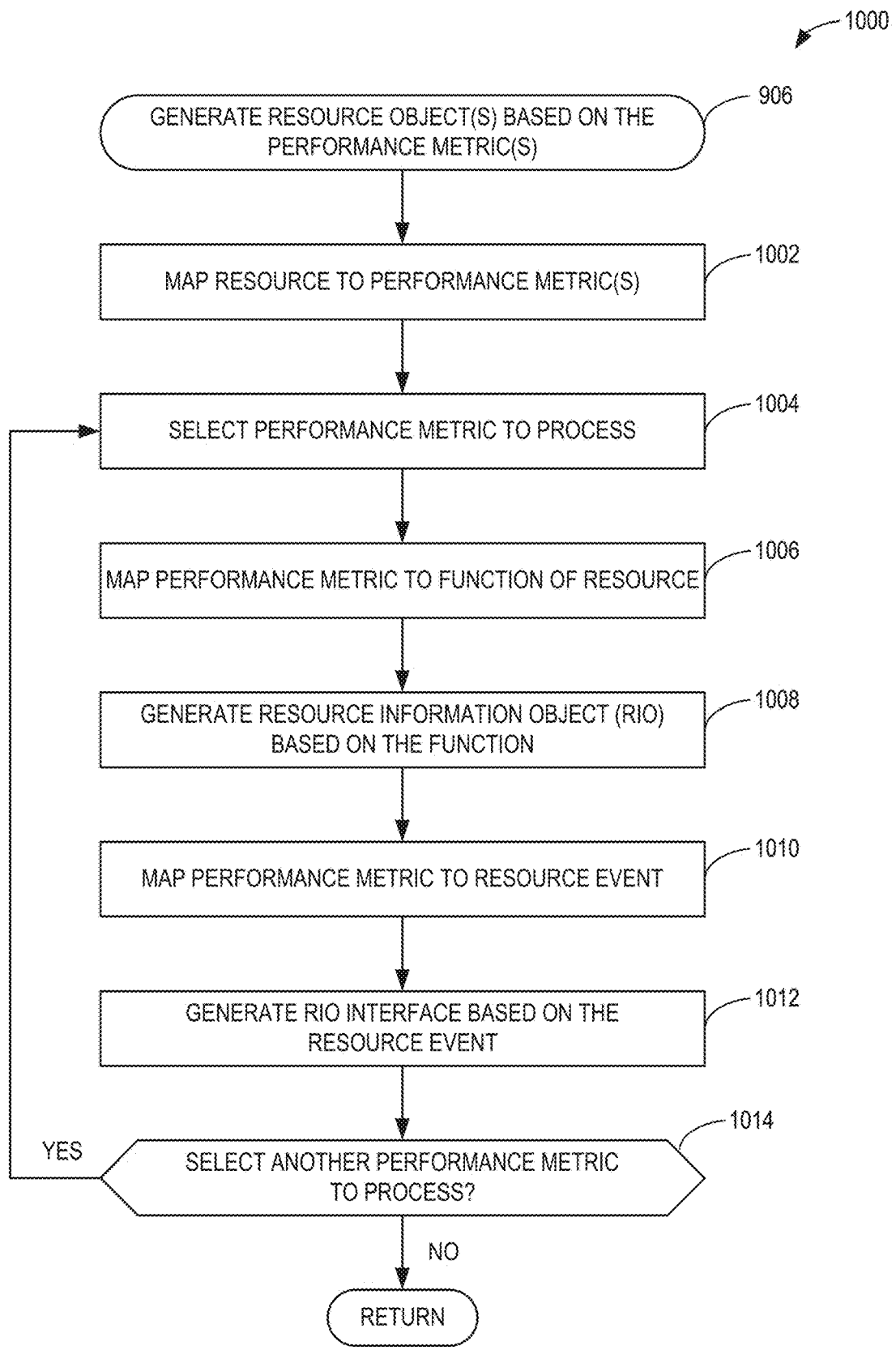
FIG. 10 is a flowchart representative of example machine readable instructions that may be executed to implement the example telemetry controller of FIGS. 1 and/or 2 to generate example resource object(s).

FIG. 10 is a flowchart representative of example machine readable instructions 1000 that may be executed to implement the telemetry controller 130A-C of FIGS. 1 and/or 2 to generate resource object(s) based on performance metric(s). The example machine readable instructions 1000 of FIG. 10 may be executed to implement block 906 of the example machine readable instructions 900 of FIG. 9. The example machine readable instructions 1000 of FIG. 10 begin at block 1002, at which the example telemetry controller 130A-C maps a resource to performance metric(s). For example, the performance metric determiner 232 (FIG. 2) can map an FPGA included in the resource(s) 149 of FIG. 1 to one or more performance metrics including a first performance metric representative of a quantity of threads (e.g., processing threads), a quantity of kernels, etc., being utilized.

At block 1004, the example telemetry controller 130A-C selects a performance metric to process. For example, the performance metric determiner 232 can select the first performance metric of the FPGA to process.

At block 1006, the example telemetry controller 130A-C maps the performance metric to a function of the resource. For example, the object generator 234 (FIG. 2) can map the quantity of threads being utilized to a thread execution function that, when invoked or executed by the FPGA, utilizes one or more threads of the FPGA for executing a workload.

At block 1008, the example telemetry controller 130A-C generates a resource information object (RIO) based on the function. For example, the object generator 234 can generate the RIO 306 of FIG. 3 based on the thread execution function. In such examples, the object generator 234 can generate the RIO 306 by generating a data structure based on the thread execution function, where the data structure can include instructions to invoke the RIO interface 308 to obtain the first performance metric, an identifier of the first performance metric, a data type of the first performance metric, data precision information of the first performance metric, etc., and/or a combination thereof.

At block 1010, the example telemetry controller 130A-C maps the performance metric to a resource event. For example, the interface generator 236 (FIG. 2) can map the first performance metric to an event corresponding to a counter (e.g., a hardware counter, a software counter) of the FPGA.

At block 1012, the example telemetry controller 130A-C generates a RIO interface based on the resource event. For example, the interface generator 236 can generate the RIO interface 308 of FIG. 3 based on the counter. In such examples, the interface generator 236 can generate the RIO interface 308 by encapsulating instructions (e.g., NMON instructions, PERF instructions, SAR instructions, etc.) to retrieve a value from the counter.

At block 1014, the example telemetry controller 130A-C determines whether to select another performance metric to process. For example, the performance metric determiner 232 can select a second performance metric of the FPGA to process. If, at block 1012, the telemetry controller 130A-C determines to select another performance metric to process, control returns to block 1004 to select another performance metric to process. If, at block 1012, the telemetry controller 130A-C determines not to select another performance metric to process, control returns to block 908 of the example machine readable instructions 900 of FIG. 9 to generate telemetry object(s) based on the performance metric(s).

Figure 11:
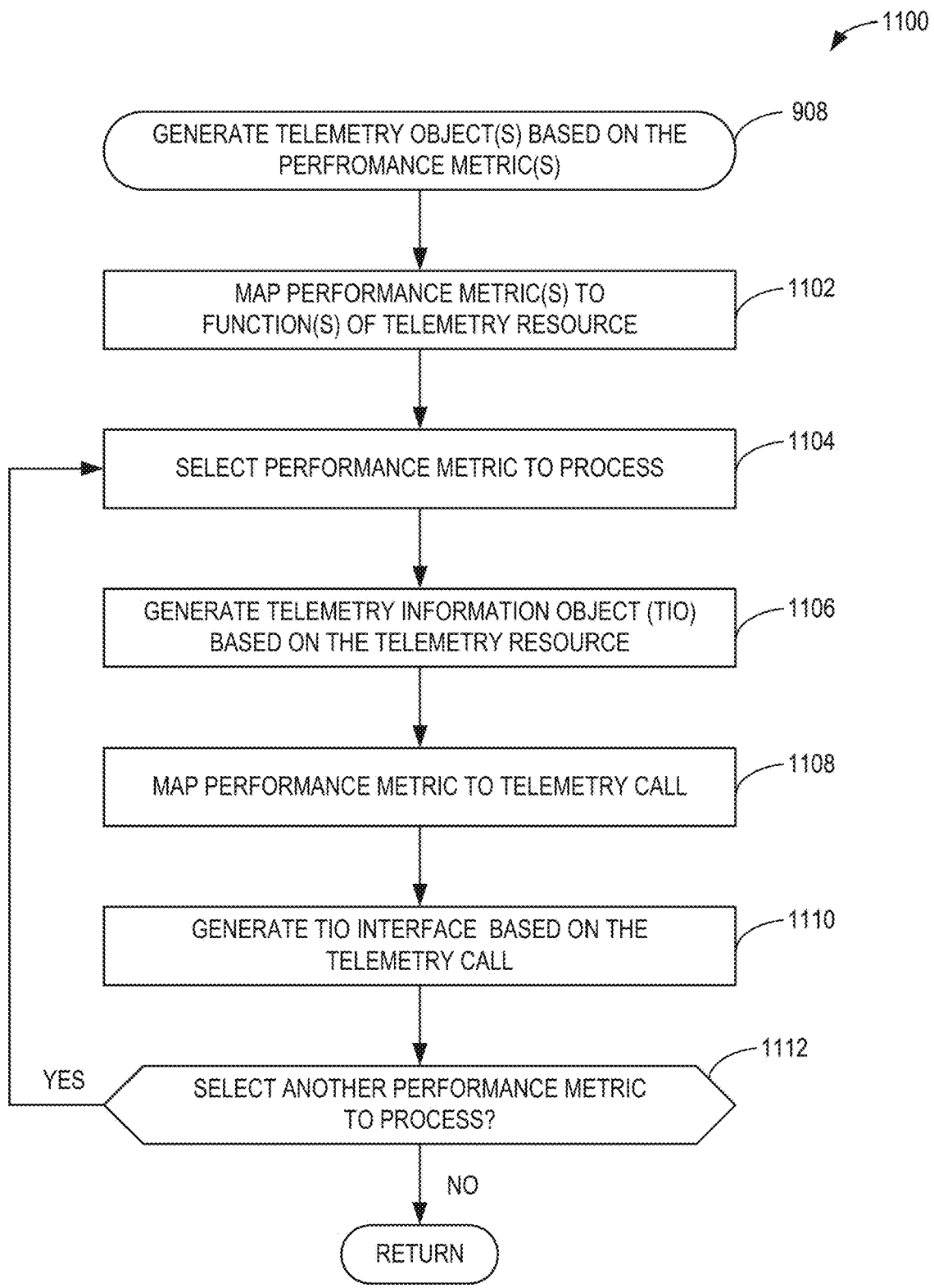
FIG. 11 is a flowchart representative of example machine readable instructions that may be executed to implement the example telemetry controller of FIGS. 1 and/or 2 to generate example telemetry information object(s).

FIG. 11 is a flowchart representative of example machine readable instructions 1100 that may be executed to implement the telemetry controller 130A-C of FIGS. 1 and/or 2 to generate telemetry object(s) based on performance metric(s). The example machine readable instructions 1100 of FIG. 11 may be executed to implement block 908 of the example machine readable instructions 900 of FIG. 9. The example machine readable instructions 1100 of FIG. 11 begin at block 1102, at which the example telemetry controller 130A-C maps performance metric(s) to function(s) of a telemetry resource. For example, the performance metric determiner 232 (FIG. 2) can map a first performance metric of a GPU to a function of a telemetry resource. In such examples, the telemetry resource can be a machine readable instruction to invoke the RIO 306 of FIG. 3 to obtain telemetry data from the resource 310 of FIG. 3.

At block 1104, the example telemetry controller 130A-C selects a performance metric to process. For example, the performance metric determiner 232 can select the first performance metric of the GPU to process.

At block 1106, the example telemetry controller 130A-C generates a telemetry information object (TIO) based on the telemetry resource. For example, the object generator 234 (FIG. 2) can generate the TIO 312 of FIG. 3 based on the first performance metric. In such examples, the object generator 234 can generate the TIO 312 by generating a data structure based on the first performance metric, where the data structure can include instructions to invoke the RIO 306, an identifier of the first performance metric, a data type of the first performance metric, data precision information of the first performance metric, etc., and/or a combination thereof.

At block 1108, the example telemetry controller 130A-C maps the performance metric to a telemetry call. For example, the interface generator 236 (FIG. 2) can map the first performance metric to a call to a network interface, a web server, an API, etc.

At block 1110, the example telemetry controller 130A-C generates a telemetry information object interface (TIO) based on the telemetry call. For example, the interface generator 236 can generate the TIO interface 314 of FIG. 3 based on the network interface, the web server, the API, etc., and/or a combination thereof. In such examples, the interface generator 236 can generate the TIO interface 314 by encapsulating machine readable instructions that, when executed or invoked, can invoke the TIO 312 to obtain telemetry data from the RIO 306.

At block 1112, the example telemetry controller 130A-C determines whether to select another performance metric to process. For example, the performance metric determiner 232 can select a second performance metric of the GPU to process. If, at block 1112, the telemetry controller 130A-C determines to select another performance metric to process, control returns to block 1104 to select another performance metric to process. If, at block 1112, the example telemetry controller 130A-C determines not to select another performance metric to process, control returns to block 910 of the example machine readable instructions 900 of FIG. 9 to generate resource composition(s) based on the resource object(s).

Figure 12:
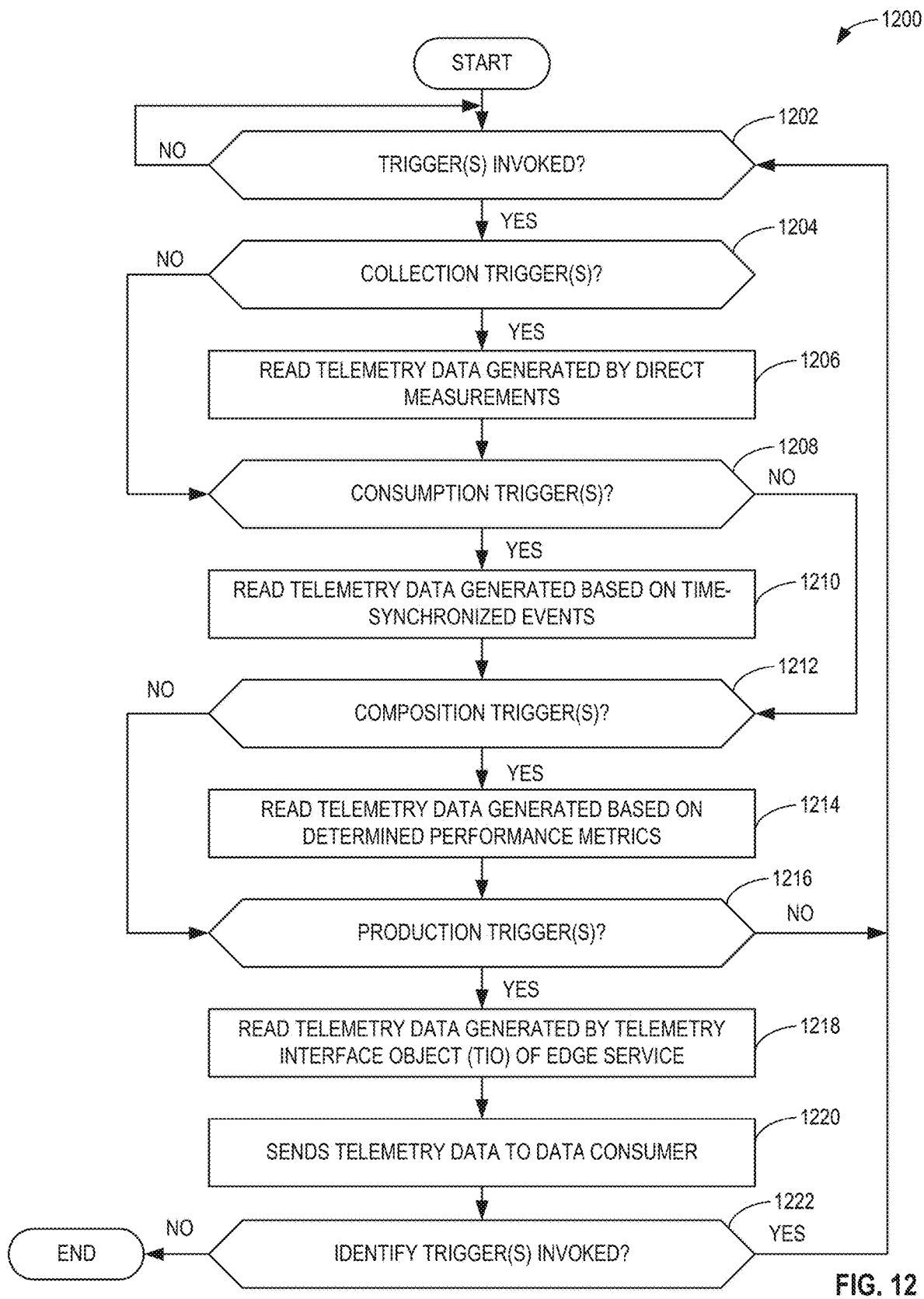
FIG. 12 is a flowchart representative of example machine readable instructions that may be executed to implement the example telemetry information object of FIGS. 3, 4, and/or 5A to generate telemetry data.

FIG. 12 is a flowchart representative of example machine readable instructions 1200 that may be executed to implement the telemetry object 304 of FIGS. 3, 4, and/or 5, and/or, more generally, the executable(s) 137, 147 of FIG. 1, to generate the telemetry data 136A-C of FIG. 1. The example machine readable instructions 1200 of FIG. 12 begin at block 1202, at which the example telemetry object 304 determines whether one or more triggers have been invoked. For example, the control plane 410 (FIG. 4) can determine whether at least one of the production trigger(s) 412, the collection trigger(s) 414, the consumption trigger(s) 416, or the composition trigger(s) 418 has been invoked and/or otherwise triggered.

If, at block 1202, the example telemetry object 304 determines that a trigger has not been invoked, control waits at block 1202 (e.g., until a trigger is invoked). If, at block 1202, the example telemetry object 304 determines that one or more triggers have been invoked, then, at block 1204, the telemetry object 304 determines whether the invoked trigger(s) is/are collection trigger(s). For example, the control plane 410 can determine that one of the collection trigger(s) 414 of FIG. 4 has been triggered.

If, at block 1204, the example telemetry object 304 determines that the invoked trigger(s) is/are not collection trigger(s), control proceeds to block 1208 to determine whether the invoked trigger(s) is/are consumption trigger(s). If, at block 1204, the example telemetry object 304 determines that the invoked trigger(s) is/are collection trigger(s), then, at block 1206, the telemetry object 304 reads telemetry data generated by direct measurements. For example, the data plane 420 can obtain raw performance metric data from a counter of the resource 310 via the resource object 302 of FIG. 3. In such examples, the data plane 420 can store the raw performance metric data in the raw performance metric data 442 of the performance metric data 440 of FIG. 4.

At block 1208, the example telemetry object 304 determines whether the invoked trigger(s) is/are consumption trigger(s). For example, the control plane 410 can determine that one of the consumption trigger(s) 416 of FIG. 4 has been triggered.

If, at block 1208, the example telemetry object 304 determines that the invoked trigger(s) is/are not consumption trigger(s), control proceeds to block 1212 to determine whether the invoked trigger(s) is/are composition trigger(s). If, at block 1208, the example telemetry object 304 determines that the invoked trigger(s) is/not consumption trigger(s), then, at block 1210, the telemetry object 304 reads telemetry data generated based on time-synchronized events. For example, the data plane 420 can obtain first raw performance metric data from the fourth resource object/system 510S of FIGS. 6A-6B at a first time, second raw performance metric data from the second resource object/system 510Q of FIGS. 6A-6B at a second time after the first time, and/or third raw performance metric data from the first resource object/system 510P of FIGS. 6A-6B at a third time after the second time. In such examples, the data plane 420 can store the first through third raw performance metric data in the raw performance metric data 442 of the performance metric data 440 of FIG. 4.

At block 1212, the example telemetry object 304 determines whether the invoked trigger(s) is/are composition trigger(s). For example, the control plane 410 can determine that one of the composition trigger(s) 418 of FIG. 4 has been triggered.

If, at block 1212, the example telemetry object 304 determines that the invoked trigger(s) is/are not composition trigger(s), control proceeds to block 1216 to determine whether the invoked trigger(s) is/are production trigger(s). If, at block 1212, the example telemetry object 304 determines that the invoked trigger(s) is/are composition trigger(s), then, at block 1214, the telemetry object 304 reads telemetry data generated based on determined performance metrics. For example, the composition plane 450 can generate a portion of the determined performance metric data 444 based on a portion of the raw performance metric data 442 by executing and/or otherwise applying one(s) of the formulae 452, the predicates 454, and/or the filters 456 on the portion of the raw performance metric data 442.

At block 1216, the example telemetry object 304 determines whether the invoked trigger(s) is/are production trigger(s). For example, the control plane 410 can determine that one of the production trigger(s) 412 of FIG. 4 has been triggered.

If, at block 1216, the example telemetry object 304 determines that the invoked trigger(s) is/are not production trigger(s), control returns to block 1202 to determine whether a trigger has been invoked. If, at block 1216, the example telemetry object 304 determines that the invoked trigger(s) is/are production trigger(s), then, at block 1218, the telemetry object 304 reads telemetry data generated by the TIO of an edge service. For example, the output plane 460 (FIG. 4) can generate one or more of the TIO events 462 of FIG. 4 indicative of portion(s) of the raw performance metric data 442, portion(s) of the determined performance metric data 444, etc., being available for access, retrieval, etc., by a data consumer.

At block 1220, the example telemetry object 304 sends telemetry data to data consumer. For example, the output plane 460 can transmit the data consumer data 464 to one or more of the servers 112, 114, 116 of the cloud environment 105 of FIG. 1, one or more of the endpoint devices 160, 165, 170, 175, 180, 185 of the endpoint environment 115 of FIG. 1, etc., and/or a combination thereof. In other examples, the output plane 460 can provide the data consumer data 464 to the first edge service 140 for storage in the first ES database 148 of FIG. 1. In response to transmitting the telemetry data to the data consumer at block 1220, the example telemetry object 304 determines whether to identify that trigger(s) have been invoked. For example, the control plane 410 can determine to re-execute a determination or analysis of whether at least one of the production trigger(s) 412, the collection trigger(s) 414, the consumption trigger(s) 416, or the composition trigger(s) 418 have been invoked.

If, at block 1222, the telemetry object 304 determines to identify whether trigger(s) have been invoked, control returns to block 1202 to determine whether one or more triggers have been invoked, otherwise the example machine readable instructions 1200 of FIG. 12 conclude.

Figure 13:
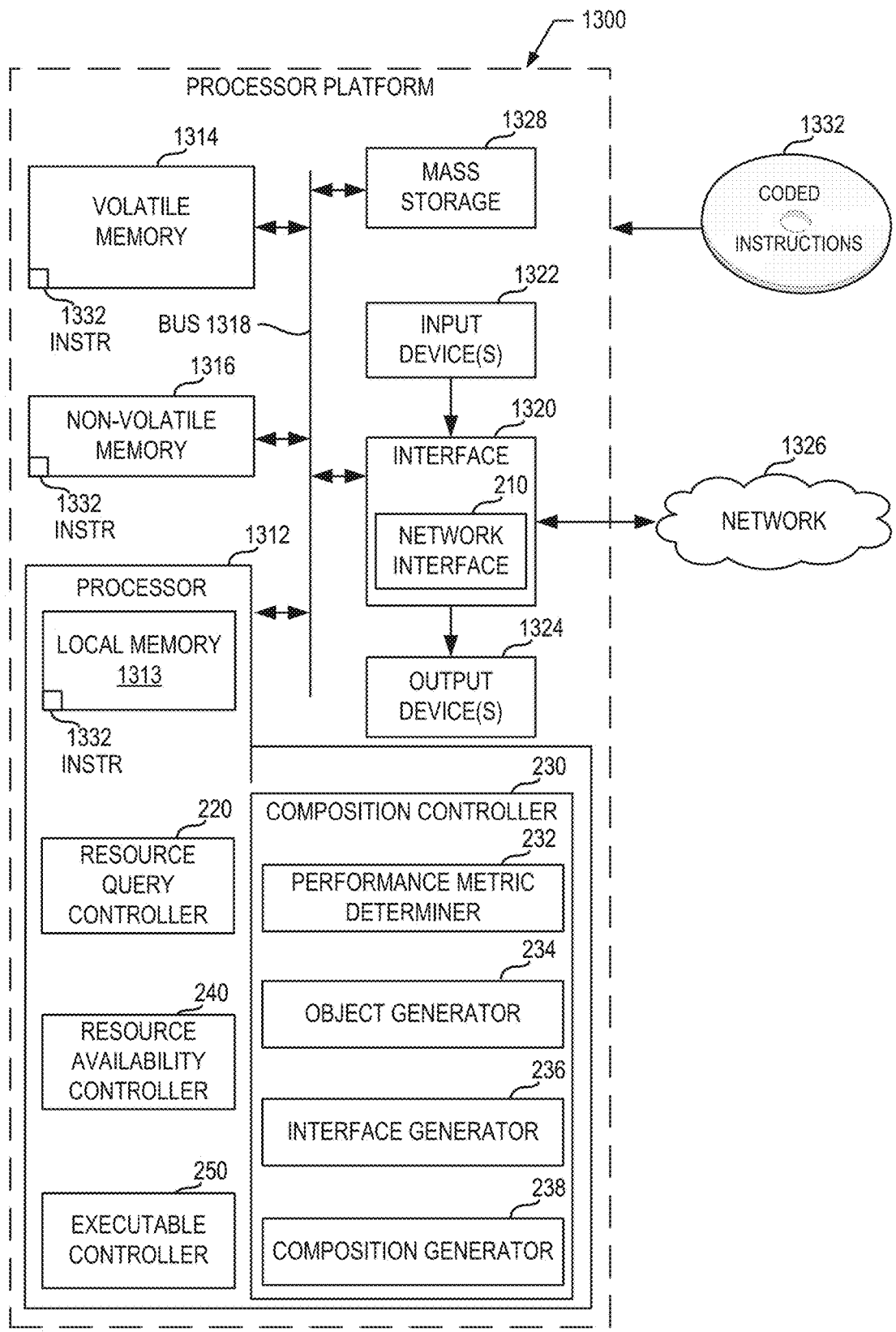
FIG. 13 is a block diagram of an example processing platform structured to execute the example machine readable instructions of FIGS. 8-12 to implement the example telemetry controller(s) of FIGS. 1 and/or 2.

FIG. 13 is a block diagram of an example processor platform 1300 structured to execute the instructions of FIGS. 8-12 to implement the example telemetry controller 130A-C of FIGS. 1 and/or 2. The processor platform 1300 can be, for example, a server, a personal computer, a workstation, a self-learning machine (e.g., a neural network), a mobile device (e.g., a cell phone, a smart phone, a tablet such as an iPad™), an Internet appliance, a gaming console, a set top box, a headset or other wearable device, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1312 implements the example resource query controller 220, the example composition controller 230, the example performance metric determiner 232, the example object generator 234, the example interface generator 236, the example composition generator 238, the example resource availability controller 240, and the example executable controller 250 of FIG. 2.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), a Bluetooth® interface, a near field communication (NFC) interface, and/or a PCI express interface. In this example, the interface circuit 1320 implements the example network interface 210 of FIG. 2.

In the illustrated example, one or more input devices 1322 are connected to the interface circuit 1320. The input device(s) 1322 permit(s) a user to enter data and/or commands into the processor 1312. The input device(s) 1322 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1320 of the illustrated example, thus, typically includes a graphics driver card, a graphics driver chip and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, redundant array of independent disks (RAID) systems, and digital versatile disk (DVD) drives.

Example machine executable instructions 1332 represented in FIGS. 8-12 may be stored in the mass storage device 1328, in the volatile memory 1314, in the non-volatile memory 1316, and/or on a removable non-transitory computer readable storage medium such as a CD or DVD.

Figure 14:
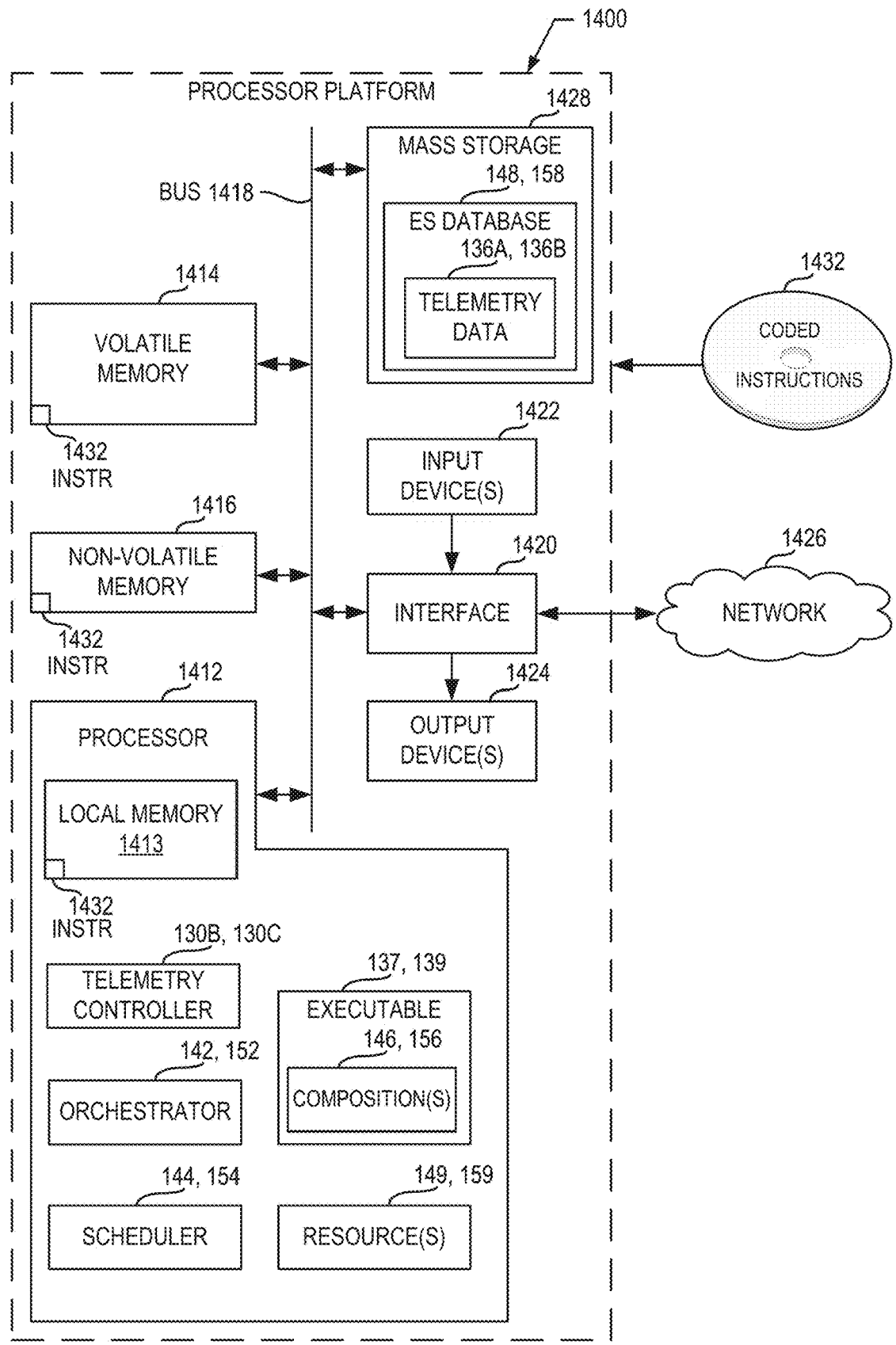
FIG. 14 is a block diagram of an example processing platform structured to execute the example machine readable instructions of FIGS. 8-12 to implement the example edge service(s) of FIG. 1.

FIG. 14 is a block diagram of an example processor platform 1400 structured to execute the instructions of FIGS. 8-12 to implement the edge service(s) 140, 150 of FIG. 1. The processor platform 1400 can be, for example, a server, a personal computer, a workstation, a self-learning machine (e.g., a neural network), a mobile device (e.g., a cell phone, a smart phone, a tablet such as an iPad™), an Internet appliance, a gaming console, a set top box, a headset or other wearable device, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1012 implements the example telemetry controller 130B, 130C of FIGS. 1 and/or 2, the example orchestrator 142, 152, the example scheduler 144, 154, the example executable 137, 139, the example composition(s) 146, 156, and the example resource(s) 149, 159 of FIG. 1.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by SDRAM, DRAM, RDRAM® and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a USB, a Bluetooth® interface, a NFC interface, and/or a PCI express interface.

In the illustrated example, one or more input devices 1422 are connected to the interface circuit 1420. The input device(s) 1422 permit(s) a user to enter data and/or commands into the processor 1412. The input device(s) 1422 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1424 are also connected to the interface circuit 1420 of the illustrated example. The output devices 1424 can be implemented, for example, by display devices (e.g., an LED), an OLED, an LCD, a CRT display, an IPS display, a touchscreen, etc.), a tactile output device, a printer and/or speaker. The interface circuit 1420 of the illustrated example, thus, typically includes a graphics driver card, a graphics driver chip and/or a graphics driver processor.

The interface circuit 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1426. The communication can be via, for example, an Ethernet connection, a DSL connection, a telephone line connection, a coaxial cable system, a satellite system, a line-of-site wireless system, a cellular telephone system, etc.

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, RAID systems, and (DVD) drives. In this example, the one or more mass storage devices 1428 implements the ES databases 148, 158 and the telemetry data 136B, 136C of FIG. 1.

Example machine executable instructions 1432 represented in FIGS. 8-12 may be stored in the mass storage device 1428, in the volatile memory 1414, in the non-volatile memory 1416, and/or on a removable non-transitory computer readable storage medium such as a CD or DVD. Additionally or alternatively, the resources 149, 159 can include and/or otherwise correspond to at least one of the local memory 1413, the volatile memory 1414, the non-volatile memory 1416, the bus 1418, the interface 1420, the input device(s) 1422, the output device(s) 1424, or the one or more mass storage devices 1428.

From the foregoing, it will be appreciated that example methods, apparatus, and articles of manufacture have been disclosed that improve the distribution of edge computing workloads based on aggregated telemetry data associated with edge services of an edge environment. The disclosed methods, apparatus, and articles of manufacture improve the orchestration in edge clouds, edge environments, etc., by generating and/or otherwise determining timely telemetry data corresponding to at least one of (1) a utilization of resource(s) associated with an edge service or (2) an efficiency with which such resource(s) are able to meet the demands placed on the resource(s). Advantageously, the disclosed methods, apparatus, and articles of manufacture improve how edge services can meet the low-latency and high-bandwidth demands from endpoint devices by distributing edge computing workloads to edge services that have available resource(s), where the available resource(s) can be identified based on telemetry data aggregation techniques disclosed herein. The disclosed methods, apparatus, and articles of manufacture improve the efficiency of using a computing device by allocating edge computing workloads to available resource(s) of the computing device or by directing edge computing workloads away from a stressed or overutilized computing device. The disclosed methods, apparatus and articles of manufacture are accordingly directed to one or more improvement(s) in the functioning of a computer.

Example methods, apparatus, systems, and articles of manufacture to aggregate telemetry data in an edge environment are disclosed herein. Further examples and combinations thereof include the following:

Example 1 includes an apparatus to aggregate telemetry data in an edge environment, the apparatus comprising at least one processor, and memory including instructions that, when executed, cause the at least one processor to at least generate a composition for an edge service in the edge environment, the composition representative of a first interface to obtain the telemetry data, the telemetry data associated with resources of the edge service, the telemetry data including a performance metric, generate a resource object based on the performance metric, the resource object representative of a second interface, the second interface to obtain the performance metric from a first resource of the resources, generate a telemetry object based on the performance metric, the telemetry object representative of a third interface, the third interface to obtain the performance metric from the resource object, and generate a telemetry executable based on the composition, the composition including at least one of the resource object or the telemetry object, the telemetry executable to generate the telemetry data in response to the edge service executing a computing task, the computing task distributed to the edge service based on the telemetry data.

Example 2 includes the apparatus of example 1, wherein the first resource is a hardware resource, and the at least one processor to map the performance metric to a function of the hardware resource, the performance metric determined based on the hardware resource executing the function, map the performance metric to an event generated by the hardware resource, the event corresponding to at least one of a hardware counter or a software counter, generate a resource information object (RIO) interface based on the event, the RIO interface representative of a first command to obtain the performance metric from the hardware resource, and generate a RIO based on the function, the RIO representative of a second command to obtain the performance metric from the RIO interface.

Example 3 includes the apparatus of example 1, wherein the first resource is a hardware resource, and the at least one processor to map the performance metric to a function of a telemetry resource, the telemetry resource representative of a first command to obtain telemetry data from the resource object, the performance metric determined based on the hardware resource executing a computing task, map the performance metric to an application programming interface (API), generate a telemetry information object (TIO) interface based on the API, the TIO interface representative of a second command to obtain a request for the telemetry data from an endpoint environment, and generate a TIO based on the first command, the TIO representative of a third command to obtain the performance metric from the resource object.

Example 4 includes the apparatus of example 1, wherein the first resource is a hardware resource or a software resource, the composition including one or more resource models including a first resource model, and the at least one processor to generate a first resource object by virtualizing the hardware resource or the software resource, generate a first telemetry object representative of one or more commands to invoke the first resource object to obtain a performance metric associated with the hardware resource or the software resource, determine that a second resource object is dependent on the first resource object, and in response to the determination, assign a second telemetry object as dependent on the first telemetry object, the second telemetry object corresponding to the second resource object.

Example 5 includes the apparatus of example 4, wherein the one or more commands include a first command, and the at least one processor to in response to obtaining a second command to obtain the telemetry data from the composition, invoke the first telemetry object to generate a third command to obtain the telemetry data from the first resource object, and in response to obtaining the first command, invoke the first resource object to obtain the telemetry data from the hardware resource or the software resource.

Example 6 includes the apparatus of example 1, wherein the composition is a first composition, the resource object is a first resource object, the telemetry object is a first telemetry object, the resources including a second resource, the telemetry executable is a first executable, and the at least one processor to generate a second resource object and a second telemetry object based on the second resource, in response to determining that the second resource object is dependent on the first resource object, generate a second composition by assigning the second resource object as dependent on the first resource object, and assigning the second telemetry object as dependent on the first telemetry object, and generate a second executable based on the first composition, the second executable to generate the telemetry data.

Example 7 includes the apparatus of example 1, wherein the resource object is a first resource object, the telemetry object is a first telemetry object, the resources include a second resource, the telemetry data including first telemetry data, second telemetry data, and third telemetry data, and the at least one processor to generate a second resource object and a second telemetry object based on the second resource, the second resource object dependent on the first resource object, the second telemetry object dependent on the first telemetry object, generate the second telemetry data by invoking the second telemetry object, in response to generating the second telemetry data, generate the first telemetry data by invoking the first telemetry object, and determine the third telemetry data based on the first telemetry data and the second telemetry data.

Example 8 includes the apparatus of example 7, wherein the performance metric is a first performance metric, the first telemetry data including the first performance metric, the second telemetry data including a second performance metric, and the third telemetry data including a third performance metric, and the at least one processor to determine a first performance metric code based on the first performance metric, a second performance metric code based on the second performance metric, and a third performance metric code based on the third performance metric, and in response to invoking a trigger indicative of the first performance metric and the second performance metric being generated map the first performance metric code to a first memory location storing the first performance metric, map the second performance metric code to a second memory location storing the second performance metric, determine the third performance metric based on the first performance metric and the second performance metric, and in response to mapping the third performance metric code to a third memory location, store the third performance metric at the third memory location.

Example 9 includes a non-transitory computer readable storage medium comprising instructions that, when executed, cause a machine to at least generate a composition for an edge service in an edge environment, the composition representative of a first interface to obtain telemetry data, the telemetry data associated with resources of the edge service, the telemetry data including a performance metric, the instructions to generate the composition by generating a resource object based on the performance metric, the resource object representative of a second interface, the second interface to obtain the performance metric from a first resource of the resources, and generating a telemetry object based on the performance metric, the telemetry object representative of a third interface, the third interface to obtain the performance metric from the resource object, and generate a telemetry executable based on the composition, the composition including at least one of the resource object or the telemetry object, execute the telemetry executable to generate the telemetry data, and in response to distributing a computing task to the edge service based on the telemetry data, execute the computing task.

Example 10 includes the non-transitory computer readable storage medium of example 9, wherein the first resource is a hardware resource, and the instructions, when executed, cause the machine to map the performance metric to a function of the hardware resource, the performance metric determined based on the hardware resource executing the function, map the performance metric to an event generated by the hardware resource, the event corresponding to at least one of a hardware counter or a software counter, generate a resource information object (RIO) interface based on the event, the RIO interface representative of a first command to obtain the performance metric from the hardware resource, and generate a RIO based on the function, the RIO representative of a second command to obtain the performance metric from the RIO interface.

Example 11 includes the non-transitory computer readable storage medium of example 9, wherein the first resource is a hardware resource, and the instructions, when executed, cause the machine to map the performance metric to a function of a telemetry resource, the telemetry resource representative of a first command to obtain telemetry data from the resource object, the performance metric determined based on the hardware resource executing a computing task, map the performance metric to an application programming interface (API), generate a telemetry information object (TIO) interface based on the API, the TIO interface representative of a second command to obtain a request for the telemetry data from an endpoint environment, and generate a TIO based on the first command, the TIO representative of a third command to obtain the performance metric from the resource object.

Example 12 includes the non-transitory computer readable storage medium of example 9, wherein the first resource is a hardware resource or a software resource, the composition including one or more resource models including a first resource model, and the instructions, when executed, cause the machine to generate the first resource model by generating a first resource object by virtualizing the hardware resource or the software resource, generating a first telemetry object representative of one or more commands to invoke the first resource object to obtain a performance metric associated with the hardware resource or the software resource, determining that a second resource object is dependent on the first resource object, and in response to the determination, assigning a second telemetry object as dependent on the first telemetry object, the second telemetry object corresponding to the second resource object.

Example 13 includes the non-transitory computer readable storage medium of example 12, wherein the one or more commands include a first command, and the instructions, when executed, cause the machine to in response to obtaining a second command to obtain the telemetry data from the composition, invoke the first telemetry object to generate a third command to obtain the telemetry data from the first resource object, and in response to obtaining the first command, invoke the first resource object to obtain the telemetry data from the hardware resource or the software resource.

Example 14 includes the non-transitory computer readable storage medium of example 9, wherein the composition is a first composition, the resource object is a first resource object, the telemetry object is a first telemetry object, the resources including a second resource, the telemetry executable is a first executable, and the instructions, when executed, cause the machine to generate a second resource object and a second telemetry object based on the second resource, in response to determining that the second resource object is dependent on the first resource object, generate a second composition by assigning the second resource object as dependent on the first resource object, and assigning the second telemetry object as dependent on the first telemetry object, generate a second executable based on the first composition, and generate the telemetry data based on the second executable.

Example 15 includes the non-transitory computer readable storage medium of example 9, wherein the resource object is a first resource object, the telemetry object is a first telemetry object, the resources include a second resource, the telemetry data including first telemetry data, second telemetry data, and third telemetry data, and the instructions, when executed, cause the machine to generate a second resource object and a second telemetry object based on the second resource, the second resource object dependent on the first resource object, the second telemetry object dependent on the first telemetry object, generate the second telemetry data by invoking the second telemetry object, in response to generating the second telemetry data, generate the first telemetry data by invoking the first telemetry object, and determine the third telemetry data based on the first telemetry data and the second telemetry data.

Example 16 includes the non-transitory computer readable storage medium of example 15, wherein the performance metric is a first performance metric, the first telemetry data including the first performance metric, the second telemetry data including a second performance metric, and the third telemetry data including a third performance metric, and the instructions, when executed, cause the machine to determine a first performance metric code based on the first performance metric, a second performance metric code based on the second performance metric, and a third performance metric code based on the third performance metric, and in response to invoking a trigger indicative of the first performance metric and the second performance metric being generated map the first performance metric code to a first memory location storing the first performance metric, map the second performance metric code to a second memory location storing the second performance metric, determine the third performance metric based on the first performance metric and the second performance metric, and in response to mapping the third performance metric code to a third memory location, store the third performance metric at the third memory location.

Example 17 includes an apparatus to aggregate telemetry data in an edge environment, the apparatus comprising means for composing a composition for an edge service in the edge environment, the composition representative of a first interface to obtain the telemetry data, the telemetry data associated with resources of the edge service, the telemetry data including a performance metric, means for generating a resource object based on the performance metric, the resource object representative of a second interface, the second interface to obtain the performance metric from a first resource of the resources, and a telemetry object based on the performance metric, the telemetry object representative of a third interface, the third interface to obtain the performance metric from the resource object, and means for compiling a telemetry executable based on the composition, the composition including at least one of the resource object or the telemetry object, the telemetry executable to generate the telemetry data in response to the edge service executing a computing task, the computing task distributed to the edge service based on the telemetry data.

Example 18 includes the apparatus of example 17, wherein the first resource is a hardware resource, and further including first means for mapping the performance metric to a function of the hardware resource, the performance metric determined based on the hardware resource executing the function, second means for mapping the performance metric to an event generated by the hardware resource, the event corresponding to at least one of a hardware counter or a software counter, and the means for generating to generate a resource information object (RIO) interface based on the event, the RIO interface representative of a first instruction to obtain the performance metric from the hardware resource, and generate a RIO based on the function, the RIO representative of a second instruction to obtain the performance metric from the RIO interface.

Example 19 includes the apparatus of example 17, wherein the first resource is a hardware resource, and further including first means for mapping the performance metric to a function of a telemetry resource, the telemetry resource representative of a first instruction to obtain telemetry data from the resource object, the performance metric determined based on the hardware resource executing a computing task, second means for mapping the performance metric to an application programming interface (API), the means for generating to generate a telemetry information object (TIO) interface based on the API, the TIO interface representative of a second instruction to obtain a request for the telemetry data from an endpoint environment, and generate a TIO based on the first instruction, the TIO representative of a third instruction to obtain the performance metric from the resource object.

Example 20 includes the apparatus of example 17, wherein the first resource is a hardware resource or a software resource, the composition including one or more resource models including a first resource model, and further including the means for generating to generate a first resource object by virtualizing the hardware resource or the software resource, and generate a first telemetry object representative of one or more instructions to invoke the first resource object to obtain a performance metric associated with the hardware resource or the software resource, and the means for composing to determine that a second resource object is dependent on the first resource object, and in response to the determination, assign a second telemetry object as dependent on the first telemetry object, the second telemetry object corresponding to the second resource object.

Example 21 includes the apparatus of example 20, wherein the one or more instructions include a first instruction, and further including in response to obtaining a second instruction to obtain the telemetry data from the composition, first means for invoking the first telemetry object to generate a third instruction to obtain the telemetry data from the first resource object, and in response to obtaining the first instruction, second means for invoking the first resource object to obtain the telemetry data from the hardware resource or the software resource.

Example 22 includes the apparatus of example 17, wherein the composition is a first composition, the resource object is a first resource object, the telemetry object is a first telemetry object, the resources including a second resource, the telemetry executable is a first executable, and further including the means for generating to generate a second resource object and a second telemetry object based on the second resource, in response to determining that the second resource object is dependent on the first resource object, the means for composing to generate a second composition by assigning the second resource object as dependent on the first resource object, and assigning the second telemetry object as dependent on the first telemetry object, and the means for compiling to generate a second executable based on the first composition, the second executable to generate the telemetry data.

Example 23 includes the apparatus of example 17, wherein the resource object is a first resource object, the telemetry object is a first telemetry object, the resources include a second resource, the telemetry data including first telemetry data, second telemetry data, and third telemetry data, the means for generating is first means for generating, and further including the first means for generating to generate a second resource object and a second telemetry object based on the second resource, the second resource object dependent on the first resource object, the second telemetry object dependent on the first telemetry object, and second means for generating to generate the second telemetry data by invoking the second telemetry object, in response to generating the second telemetry data, generate the first telemetry data by invoking the first telemetry object, and determine the third telemetry data based on the first telemetry data and the second telemetry data.

Example 24 includes the apparatus of example 23, wherein the performance metric is a first performance metric, the first telemetry data including the first performance metric, the second telemetry data including a second performance metric, and the third telemetry data including a third performance metric, and the second means for generating to determine a first performance metric code based on the first performance metric, a second performance metric code based on the second performance metric, and a third performance metric code based on the third performance metric, and in response to invoking a trigger indicative of the first performance metric and the second performance metric being generated map the first performance metric code to a first memory location storing the first performance metric, map the second performance metric code to a second memory location storing the second performance metric, determine the third performance metric based on the first performance metric and the second performance metric, and in response to mapping the third performance metric code to a third memory location, store the third performance metric at the third memory location.

Example 25 includes a non-transitory computer readable storage medium comprising instructions that, when executed, cause at least one processor to at least in response to obtaining a request for execution of a workload from an edge device, discover a plurality of edge service resources associated with at least one edge service in an edge environment, the at least one edge service including first edge service resources of the plurality of the edge service resources, identify the at least one edge service based on first telemetry data obtained from the at least one edge service, the first telemetry data including a performance metric indicating availability of the first edge service resources to execute the workload, distribute the workload to the at least one edge service for execution, and in response to the at least one edge service executing a telemetry model, obtain second telemetry data from the at least one edge service based on the execution of the workload by the at least one edge service, the telemetry model including a first interface to obtain the second telemetry data generated by the first edge service resources.

Example 26 includes the non-transitory computer readable storage medium of example 25, wherein the second telemetry data includes the performance metric, the first edge service resources including a first hardware resource, and the instructions, when executed, cause the at least one processor to generate a resource object based on the performance metric, the resource object representative of a second interface, the second interface to obtain the performance metric from the first hardware resource, and generate a telemetry object based on the performance metric, the telemetry object representative of a third interface, the third interface to obtain the performance metric from the resource object.

Example 27 includes the non-transitory computer readable storage medium of example 26, wherein the first edge service resources include a hardware resource, and the instructions, when executed, cause the at least one processor to map the performance metric to a function of a telemetry resource, the telemetry resource representative of a first instruction to obtain telemetry data from the resource object, the performance metric determined based on the hardware resource executing a computing task, map the performance metric to an application programming interface (API), generate a telemetry information object (TIO) interface based on the API, the TIO interface representative of a second instruction to obtain a request for the telemetry data from an endpoint environment, and generate a TIO based on the first instruction, the TIO representative of a third instruction to obtain the performance metric from the resource object.

Example 28 includes the non-transitory computer readable storage medium of example 25, wherein the first edge service resources include a hardware resource, and the instructions, when executed, cause the at least one processor to map the performance metric to a function of the hardware resource, the performance metric determined based on the hardware resource executing the function, map the performance metric to an event generated by the hardware resource, the event corresponding to at least one of a hardware counter or a software counter, generate a resource information object (RIO) interface based on the event, the RIO interface representative of a first instruction to obtain the performance metric from the hardware resource, and generate a RIO based on the function, the RIO representative of a second instruction to obtain the performance metric from the RIO interface.

Example 29 includes a method to aggregate telemetry data in an edge environment, the method comprising generating a composition for an edge service in the edge environment, the composition representative of a first interface to obtain the telemetry data, the telemetry data associated with resources of the edge service, the telemetry data including a performance metric, the generating including generating a resource object based on the performance metric, the resource object representative of a second interface, the second interface to obtain the performance metric from a first resource of the resources, and generating a telemetry object based on the performance metric, the telemetry object representative of a third interface, the third interface to obtain the performance metric from the resource object, generating a telemetry executable based on the composition, the composition including at least one of the resource object or the telemetry object, executing the telemetry executable to generate the telemetry data, and in response to distributing a computing task to the edge service based on the telemetry data, executing the computing task.

Example 30 includes the method of example 29, wherein the first resource is a hardware resource, and further including mapping the performance metric to a function of the hardware resource, the performance metric determined based on the hardware resource executing the function, mapping the performance metric to an event generated by the hardware resource, the event corresponding to at least one of a hardware counter or a software counter, generating a resource information object (RIO) interface based on the event, the RIO interface representative of a first instruction to obtain the performance metric from the hardware resource, and generating a RIO based on the function, the RIO representative of a second instruction to obtain the performance metric from the RIO interface.

Example 31 includes the method of example 29, wherein the first resource is a hardware resource, and further including mapping the performance metric to a function of a telemetry resource, the telemetry resource representative of a first instruction to obtain telemetry data from the resource object, the performance metric determined based on the hardware resource executing a computing task, mapping the performance metric to an application programming interface (API), generating a telemetry information object (TIO) interface based on the API, the TIO interface representative of a second instruction to obtain a request for the telemetry data from an endpoint environment, and generating a TIO based on the first instruction, the TIO representative of a third instruction to obtain the performance metric from the resource object.

Example 32 includes the method of example 29, wherein the first resource is a hardware resource or a software resource, the composition including one or more resource models including a first resource model, and further including generating the first resource model by generating a first resource object by virtualizing the hardware resource or the software resource, generating a first telemetry object representative of one or more instructions to invoke the first resource object to obtain a performance metric associated with the hardware resource or the software resource, determining that a second resource object is dependent on the first resource object, and in response to the determination, assigning a second telemetry object as dependent on the first telemetry object, the second telemetry object corresponding to the second resource object.

Example 33 includes the method of example 32, wherein the one or more instructions include a first instruction, and further including in response to obtaining a second instruction to obtain the telemetry data from the composition, invoking the first telemetry object to generate a third instruction to obtain the telemetry data from the first resource object, and in response to obtaining the first instruction, invoking the first resource object to obtain the telemetry data from the hardware resource or the software resource.

Example 34 includes the method of example 29, wherein the composition is a first composition, the resource object is a first resource object, the telemetry object is a first telemetry object, the resources including a second resource, the telemetry executable is a first executable, and further including generating a second resource object and a second telemetry object based on the second resource, in response to determining that the second resource object is dependent on the first resource object, generating a second composition by assigning the second resource object as dependent on the first resource object, and assigning the second telemetry object as dependent on the first telemetry object, generate a second executable based on the first composition, and generate the telemetry data based on the second executable.

Example 35 includes the method of example 29, wherein the resource object is a first resource object, the telemetry object is a first telemetry object, the resources include a second resource, the telemetry data including first telemetry data, second telemetry data, and third telemetry data, and further including generating a second resource object and a second telemetry object based on the second resource, the second resource object dependent on the first resource object, the second telemetry object dependent on the first telemetry object, generating the second telemetry data by invoking the second telemetry object, in response to generating the second telemetry data, generating the first telemetry data by invoking the first telemetry object, and determining the third telemetry data based on the first telemetry data and the second telemetry data.

Example 36 includes the method of example 35, wherein the performance metric is a first performance metric, the first telemetry data including the first performance metric, the second telemetry data including a second performance metric, and the third telemetry data including a third performance metric, and further including determining a first performance metric code based on the first performance metric, a second performance metric code based on the second performance metric, and a third performance metric code based on the third performance metric, and in response to invoking a trigger indicative of the first performance metric and the second performance metric being generated mapping the first performance metric code to a first memory location storing the first performance metric, mapping the second performance metric code to a second memory location storing the second performance metric, determining the third performance metric based on the first performance metric and the second performance metric, and in response to mapping the third performance metric code to a third memory location, storing the third performance metric at the third memory location.

Example 37 includes an apparatus to aggregate telemetry data in an edge environment, the apparatus comprising a composition generator to generate a composition for an edge service in the edge environment, the composition representative of a first interface to obtain the telemetry data, the telemetry data associated with resources of the edge service, the telemetry data including a performance metric, an object generator to generate a resource object based on the performance metric, the resource object representative of a second interface, the second interface to obtain the performance metric from a first resource of the resources, and generate a telemetry object based on the performance metric, the telemetry object representative of a third interface, the third interface to obtain the performance metric from the resource object, and an executable controller to generate a telemetry executable based on the composition, the composition including at least one of the resource object or the telemetry object, the telemetry executable to generate the telemetry data in response to the edge service executing a computing task, the computing task distributed to the edge service based on the telemetry data.

Example 38 includes the apparatus of example 37, wherein the first resource is a hardware resource, and further including the object generator to map the performance metric to a function of the hardware resource, the performance metric determined based on the hardware resource executing the function, an interface generator to map the performance metric to an event generated by the hardware resource, the event corresponding to at least one of a hardware counter or a software counter, and generate a resource information object (RIO) interface based on the event, the RIO interface representative of a first instruction to obtain the performance metric from the hardware resource, and the object generator to generate a RIO based on the function, the RIO representative of a second instruction to obtain the performance metric from the RIO interface.

Example 39 includes the apparatus of example 37, wherein the first resource is a hardware resource, and further including the object generator to map the performance metric to a function of a telemetry resource, the telemetry resource representative of a first instruction to obtain telemetry data from the resource object, the performance metric determined based on the hardware resource executing a computing task, an interface generator to map the performance metric to an application programming interface (API), and generate a telemetry information object (TIO) interface based on the API, the TIO interface representative of a second instruction to obtain a request for the telemetry data from an endpoint environment, and the object generator to generate a TIO based on the first instruction, the TIO representative of a third instruction to obtain the performance metric from the resource object.

Example 40 includes the apparatus of example 37, wherein the first resource is a hardware resource or a software resource, the composition including one or more resource models including a first resource model, and further including the object generator to generate a first resource object by virtualizing the hardware resource or the software resource, and generate a first telemetry object representative of one or more instructions to invoke the first resource object to obtain a performance metric associated with the hardware resource or the software resource, and the composition generator to determine that a second resource object is dependent on the first resource object, and in response to the determination, assign a second telemetry object as dependent on the first telemetry object, the second telemetry object corresponding to the second resource object.

Example 41 includes the apparatus of example 40, wherein the one or more instructions include a first instruction, and the telemetry executable to in response to obtaining a second instruction to obtain the telemetry data from the composition, invoke the first telemetry object to generate a third instruction to obtain the telemetry data from the first resource object, and in response to obtaining the first instruction, invoke the first resource object to obtain the telemetry data from the hardware resource or the software resource.

Example 42 includes the apparatus of example 37, wherein the composition is a first composition, the resource object is a first resource object, the telemetry object is a first telemetry object, the resources including a second resource, the telemetry executable is a first executable, and further including the object generator to generate a second resource object and a second telemetry object based on the second resource, in response to determining that the second resource object is dependent on the first resource object, the composition generator to generate a second composition by assigning the second resource object as dependent on the first resource object, and assigning the second telemetry object as dependent on the first telemetry object, and the executable controller to generate a second executable based on the first composition, the second executable to generate the telemetry data.

Example 43 includes the apparatus of example 37, wherein the resource object is a first resource object, the telemetry object is a first telemetry object, the resources include a second resource, the telemetry data including first telemetry data, second telemetry data, and third telemetry data, and further including the object generator to generate a second resource object and a second telemetry object based on the second resource, the second resource object dependent on the first resource object, the second telemetry object dependent on the first telemetry object, and the telemetry executable to generate the second telemetry data by invoking the second telemetry object, in response to generating the second telemetry data, generate the first telemetry data by invoking the first telemetry object, and determine the third telemetry data based on the first telemetry data and the second telemetry data.

Example 44 includes the apparatus of example 43, wherein the performance metric is a first performance metric, the first telemetry data including the first performance metric, the second telemetry data including a second performance metric, and the third telemetry data including a third performance metric, and the telemetry executable to determine a first performance metric code based on the first performance metric, a second performance metric code based on the second performance metric, and a third performance metric code based on the third performance metric, and in response to invoking a trigger indicative of the first performance metric and the second performance metric being generated map the first performance metric code to a first memory location storing the first performance metric, map the second performance metric code to a second memory location storing the second performance metric, determine the third performance metric based on the first performance metric and the second performance metric, and in response to mapping the third performance metric code to a third memory location, store the third performance metric at the third memory location.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. At least one non-transitory computer readable storage medium comprising first instructions to cause at least one processor circuit to at least:
   identify a first resource of an edge service after a request from an endpoint device for the edge service to execute a workload;
   map a performance metric of the first resource to a first function of the first resource, the first function of the first resource to cause the first resource to execute operations to satisfy the performance metric;
   generate a first resource object based on the first function of the first resource, the first resource object to include second instructions to facilitate accessing first telemetry data after execution of the first function by the first resource;
   initiate the edge service to determine the first telemetry data of the first resource;
   generate a second resource object to obtain second telemetry data associated with a second function of a second resource of the edge service, the second resource object to facilitate accessing the second telemetry data from the second resource object after an execution of the second function by the second resource; and
   after a determination that the first resource is dependent on the second resource, generate a resource composition to link the first resource object and the second resource object, the resource composition to include at least one resource model representative of a virtualization of the first resource and the second resource.

2. The at least one non-transitory computer readable storage medium of claim 1, wherein the edge service is a first edge service, and the first instructions are to cause one or more of the at least one processor circuit to:
   disassociate the first resource from the first edge service in response to completion of the workload, the disassociation including decommissioning at least one of the first resource object or the first edge service; and
   associate the first resource with a second edge service.

3. The at least one non-transitory computer readable storage medium of claim 1, wherein the first resource includes a first hardware core of a multi-core hardware processor, the edge service is a first edge service, and the first instructions are to cause one or more of the at least one processor circuit to:
   associate the first hardware core with the first edge service; and
   associate a second hardware core of the multi-core hardware processor with a second edge service.

4. The at least one non-transitory computer readable storage medium of claim 1, wherein the first resource is a hardware resource, the first telemetry data is associated with at least one of a hardware counter or a software counter of the hardware resource, and the first instructions are to cause one or more of the at least one processor circuit to:
   instantiate a resource information object (RIO) based on the first function, the RIO to represent a first command to access a value of the at least one of the hardware counter or the software counter from the hardware resource; and
   instantiate a RIO interface based on the at least one of the hardware counter or the software counter, the RIO interface representative of a second command to access the value of the at least one of the hardware counter or the software counter from the RIO.

5. The at least one non-transitory computer readable storage medium of claim 1, wherein the first instructions are to cause one or more of the at least one processor circuit to:
   generate the second resource object based on the second resource after the determination that the first resource is dependent on the second resource; and
   generate the edge service based on at least one of the first resource or the second resource, the first telemetry data associated with the at least one of the first resource or the second resource.

6. The at least one non-transitory computer readable storage medium of claim 1, wherein the first instructions are to cause one or more of the at least one processor circuit to:
   generate the second resource object based on the second resource, the second resource object associated with a second parameter, the second parameter different from a first parameter associated with the first resource object.

7. The at least one non-transitory computer readable storage medium of claim 1, wherein the first telemetry data includes the performance metric of the first resource, and the first instructions are to cause one or more of the at least one processor circuit to:
 associate a performance metric code and the performance metric;
 associate the performance metric code and a memory location, a value of the performance metric to be stored at the memory location;
 after a storage of the value of the performance metric at the memory location, activate a trigger; and
 after activation of the trigger, cause the edge service to provide the performance metric code to the first resource object, the performance metric code to cause the first resource object to provide, to the edge service, access to the value of the performance metric.

8. The at least one non-transitory computer readable storage medium of claim 7, wherein the first resource is a multi-core hardware processor, and the performance metric is one of a first value of a number of hardware threads of the multi-core hardware processor, a second value to identify a type of accelerator supported by the multi-core hardware processor, a third value of a latency associated with one or more cores of the multi-core hardware processor, or a fourth value of a hardware counter.

9. An apparatus comprising:
 at least one memory;
 machine readable instructions; and
 at least one processor circuit to be programmed by the machine readable instructions to:
  determine a first resource of an edge service in an edge environment after a request from an endpoint device for the edge service to execute a workload, the request to indicate that a type of the first resource is to be utilized to execute the workload;
  map a performance metric of the first resource to a first function of the first resource, the first function of the first resource to cause the first resource to execute operations to satisfy the performance metric;
  generate a first resource object based on the first function of the first resource, the first resource object to include second instructions to facilitate accessing first telemetry data after execution of the first function by the first resource;
  instantiate the edge service to determine the first telemetry data of the first resource;
  generate a second resource object to obtain second telemetry data associated with a second function of a second resource of the edge service, the second resource object to facilitate accessing the second telemetry data from the second resource object after an execution of the second function by the second resource; and
  after a determination that the first resource is dependent on the second resource, generate a resource composition to link the first resource object and the second resource object, the resource composition to include at least one resource model representative of a virtualization of the first resource and the second resource.

10. The apparatus of claim 9, wherein the first resource includes a first hardware core of a multi-core hardware processor, the edge service is a first edge service, and one or more of the at least one processor circuit is to:
 link the first hardware core with the first edge service; and
 link a second hardware core of the multi-core hardware processor with a second edge service.

11. The apparatus of claim 9, wherein the first resource is a hardware resource, the first telemetry data is associated with at least one of a hardware counter or a software counter of the hardware resource, and one or more of the at least one processor circuit is to:
 create a resource information object (RIO) based on the first function, the RIO to represent a first command to access a value of the at least one of the hardware counter or the software counter from the hardware resource; and
 create a RIO interface based on the at least one of the hardware counter or the software counter, the RIO interface representative of a second command to access the value of the at least one of the hardware counter or the software counter from the RIO.

12. The apparatus of claim 9, wherein the first telemetry data includes the performance metric of the first resource, and one or more of the at least one processor circuit is to:
 generate a first association of a performance metric code and the performance metric;
 generate a second association of the performance metric code and a memory location, a value of the performance metric to be stored at the memory location;
 after a storage of the value of the performance metric at the memory location, invoke a trigger; and
 after invocation of the trigger, cause the edge service to provide the performance metric code to the first resource object, the performance metric code to cause the first resource object to provide, to the edge service, access to the value of the performance metric.

13. At least one non-transitory computer readable storage medium comprising first instructions to cause at least one processor circuit to at least:
 identify first telemetry data based on a first resource of an edge service in an edge environment, the first resource selected to execute a workload by the edge service after a request from an endpoint device for the edge service to execute the workload;
 map a performance metric of the first resource to a first function of the first resource, the first function of the first resource to cause the first resource to execute operations to satisfy the performance metric;
 generate a first telemetry object based on the first function of the first resource, the first telemetry object to include second instructions to facilitate accessing the first telemetry data after execution of the first function by the first resource;
 generate an executable file based on the first telemetry object;
 deploy the executable file on the edge environment, the executable file to initiate the edge service to determine the first telemetry data of the first resource;
 generate a second telemetry object to obtain second telemetry data associated with a second function of a second resource of the edge service, the second telemetry object to facilitate accessing the second telemetry data from the second telemetry object after an execution of the second function by the second resource; and
 after a determination that the first resource is dependent on the second resource, generate a resource composition to link the first telemetry object and the second telemetry object, the resource composition to include at least one resource model representative of a virtualization of the first resource and the second resource.

14. The at least one non-transitory computer readable storage medium of claim 13, wherein the edge service is a first edge service, and the first instructions to cause one or more of the at least one processor circuit to:
disassociate the first resource from the edge service after completion of the workload, the disassociation including decommissioning at least one of the first telemetry object or the edge service; and
commission the first resource to a second edge service.

15. The at least one non-transitory computer readable storage medium of claim 13, wherein the first resource is a hardware resource, the first telemetry data is associated with at least one of a hardware counter or a software counter of the hardware resource, and the first instructions to cause one or more of the at least one processor circuit to:
instantiate a telemetry information object (TIO) based on the hardware resource, the TIO to represent a first command to access a value of the at least one of the hardware counter or the software counter from the hardware resource; and
instantiate a TIO interface based on the TIO, the TIO representative of a second command to access the value of the at least one of the hardware counter or the software counter from the TIO.

16. The at least one non-transitory computer readable storage medium of claim 13, wherein the first instructions are to cause one or more of the at least one processor circuit to:
virtualize the first resource, the generation of the first telemetry object based on the virtualization of the first resource;
associate the second instructions of the first telemetry object with the virtualization of the first resource; and
request the first telemetry data from the virtualization of the first resource through the second instructions.

17. The at least one non-transitory computer readable storage medium of claim 13, wherein the first instructions are to cause one or more of the at least one processor circuit to:
generate the second telemetry object based on the second resource after the determination that the first resource is dependent on the second resource; and
generate the edge service based on at least one of the first resource, the second resource, the first telemetry object, or the second telemetry object, the first telemetry data associated with the at least one of the first resource or the second resource.

18. The at least one non-transitory computer readable storage medium of claim 13, wherein the first instructions are to cause one or more of the at least one processor circuit to:
generate the second telemetry object based on the second resource, the second telemetry object associated with a second parameter, the second parameter different from a first parameter associated with the first telemetry object.

19. The at least one non-transitory computer readable storage medium of claim 13, wherein the first telemetry data includes the performance metric of the first resource, and the first instructions are to cause one or more of the at least one processor circuit to:
associate a performance metric code and the performance metric;
associate the performance metric code and a memory location, a value of the performance metric to be stored at the memory location;
after a storage of the value of the performance metric at the memory location, activate a trigger; and
after activation of the trigger, cause the edge service to provide the performance metric code to the first telemetry object, the performance metric code to cause the first telemetry object to provide, to the edge service, access to the value of the performance metric.

20. The at least one non-transitory computer readable storage medium of claim 19, wherein the first resource is a multi-core hardware processor, and the performance metric is one of a first value of a number of hardware threads of the multi-core hardware processor, a second value to identify a type of accelerator supported by the multi-core hardware processor, a third value of a latency associated with one or more cores of the multi-core hardware processor, or a fourth value of a hardware counter.

21. An apparatus comprising:
at least one memory;
machine readable instructions; and
at least one processor circuit to be programmed by the machine readable instructions to:
identify first telemetry data based on a first resource of an edge service in an edge environment, the first resource selected to execute a workload by the edge service after a request from an endpoint device for the edge service to execute the workload;
map a performance metric of the first resource to a first function of the first resource, the first function of the first resource to cause the first resource to execute operations to satisfy the performance metric;
generate a first telemetry object based on the first function of the first resource, the first telemetry object to include second instructions to facilitate accessing the first telemetry data after execution of the first function by the first resource;
generate an executable file based on the first telemetry object;
store the executable file on the edge environment, the executable file to initiate the edge service to determine the first telemetry data of the first resource;
generate a second telemetry object to obtain second telemetry data associated with a second function of a second resource of the edge service, the second telemetry object to facilitate accessing the second telemetry data from the second telemetry object after an execution of the second function by the second resource; and
after a determination that the first resource is dependent on the second resource, generate a resource composition to link the first telemetry object and the second telemetry object, the resource composition to include at least one resource model representative of a virtualization of the first resource and the second resource.

22. The apparatus of claim 21, wherein the first resource is a hardware resource, the first telemetry data is associated with at least one of a hardware counter or a software counter of the hardware resource, and one or more of the processor circuit to:
generate a telemetry information object (TIO) based on the hardware resource, the TIO to represent a first command to access a value of the at least one of the hardware counter or the software counter from the hardware resource; and
generate a TIO interface based on the TIO, the TIO representative of a second command to access the value of the at least one of the hardware counter or the software counter from the TIO.

23. The apparatus of claim 21, wherein the first telemetry data includes the performance metric of the first resource, and one or more of the processor circuit to:
- associate a performance metric code and the performance metric;
- associate the performance metric code and a memory location, a value of the performance metric to be stored at the memory location;
- after a storage of the value of the performance metric at the memory location, activate a trigger; and
- after activation of the trigger, cause the edge service to provide the performance metric code to the first telemetry object, the performance metric code to cause the first telemetry object to provide, to the edge service, access to the value of the performance metric.

24. The at least one non-transitory computer readable storage medium of claim 1, wherein the resource composition is a first resource composition, and the first instructions are to cause one or more of the at least one processor circuit to:
- determine a change in availability of at least one of the first resource or the second resource, the change in availability representative of at least one of the first resource or the second resource being no longer available or becoming available to the edge service; and
- generate a second resource composition based on the change in availability and the first resource composition.

* * * * *